May 5, 1925.
J. J. CONVERY
TIRE MAKING MACHINE
Original Filed Aug. 10, 1914  17 Sheets-Sheet 4
1,536,377
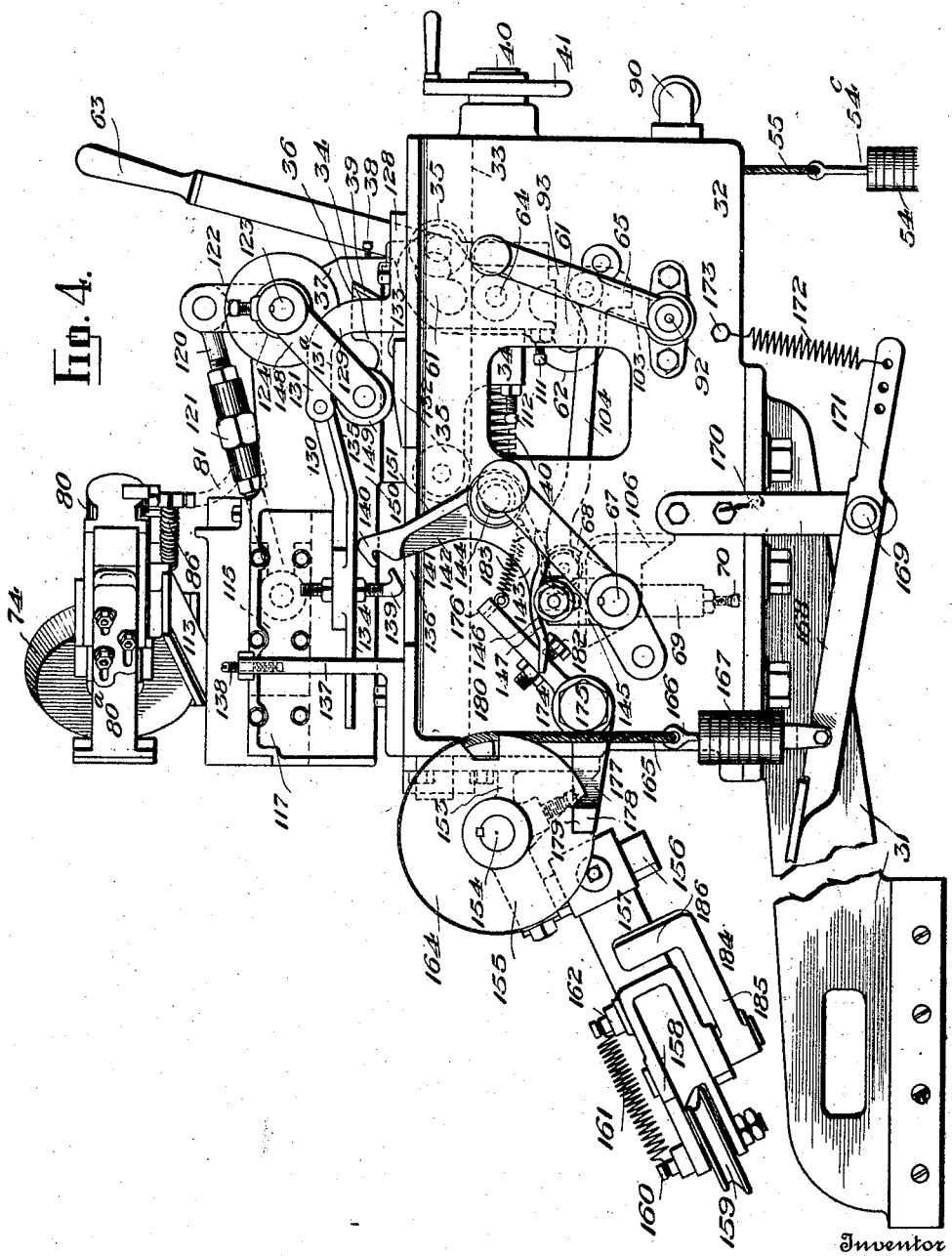
Inventor
— John J. Convery —

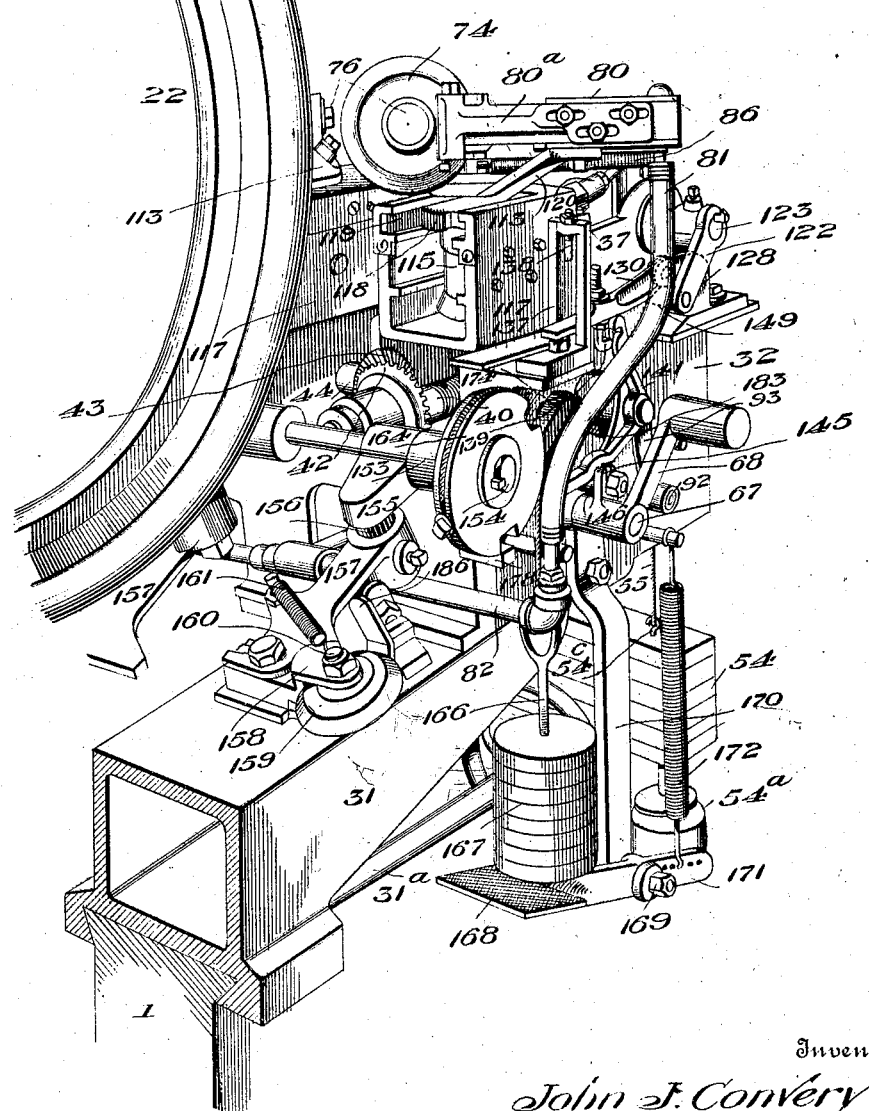

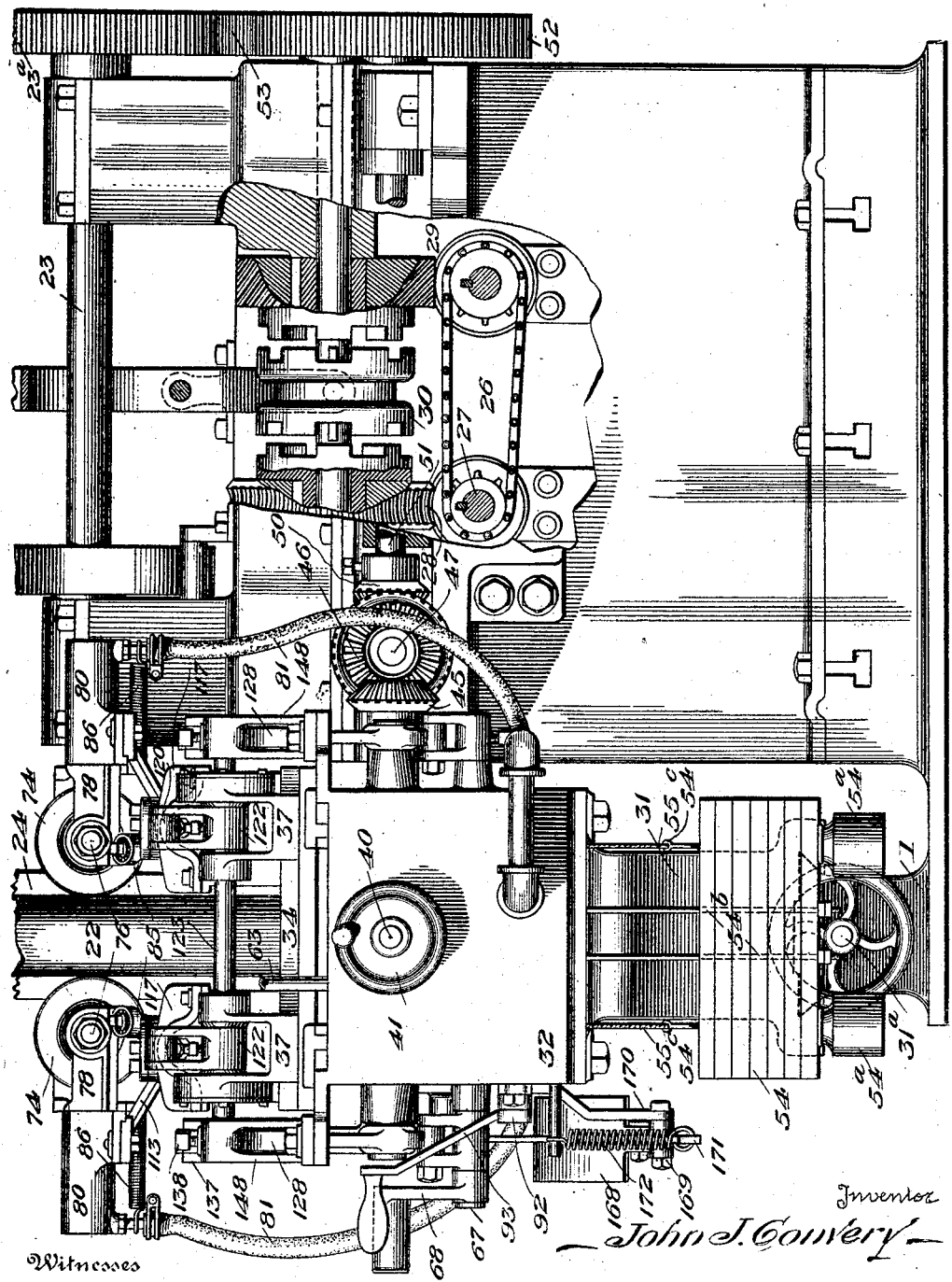

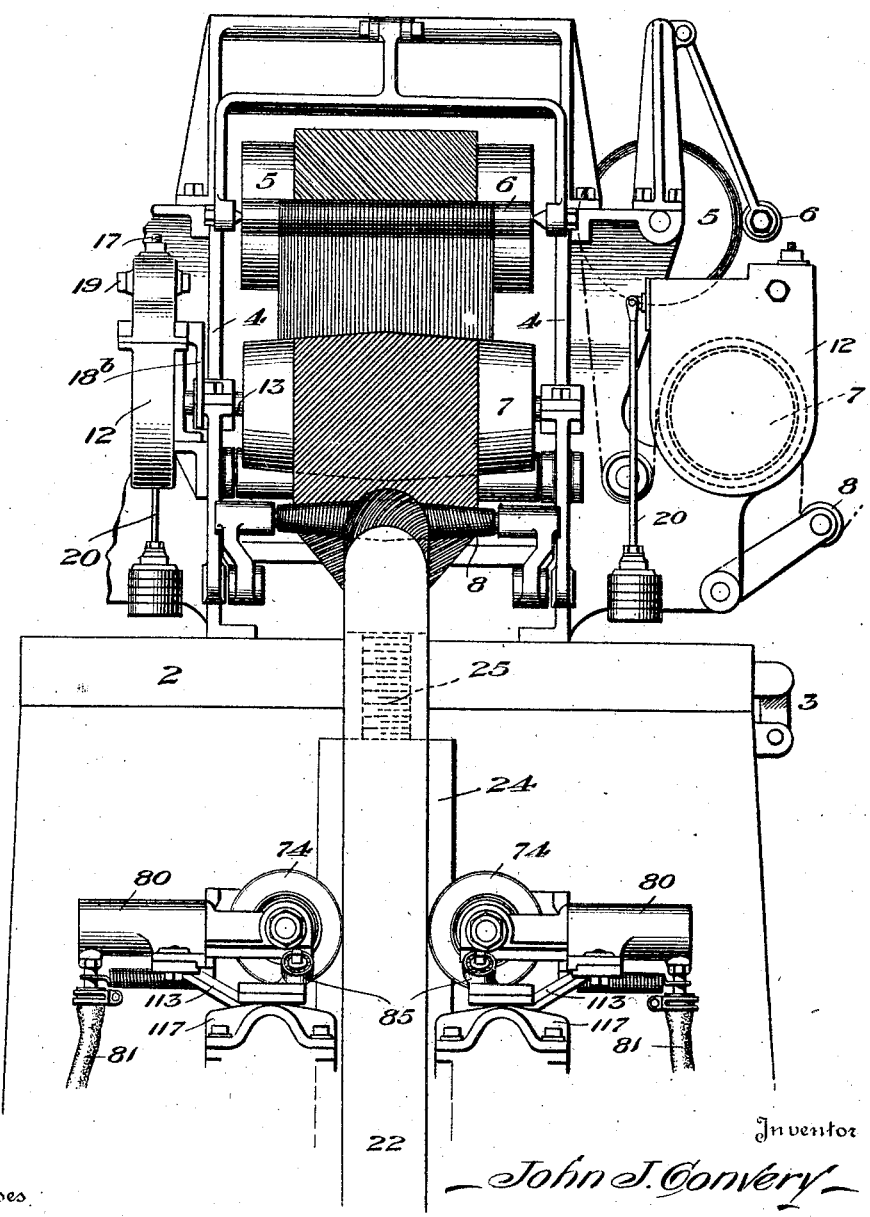

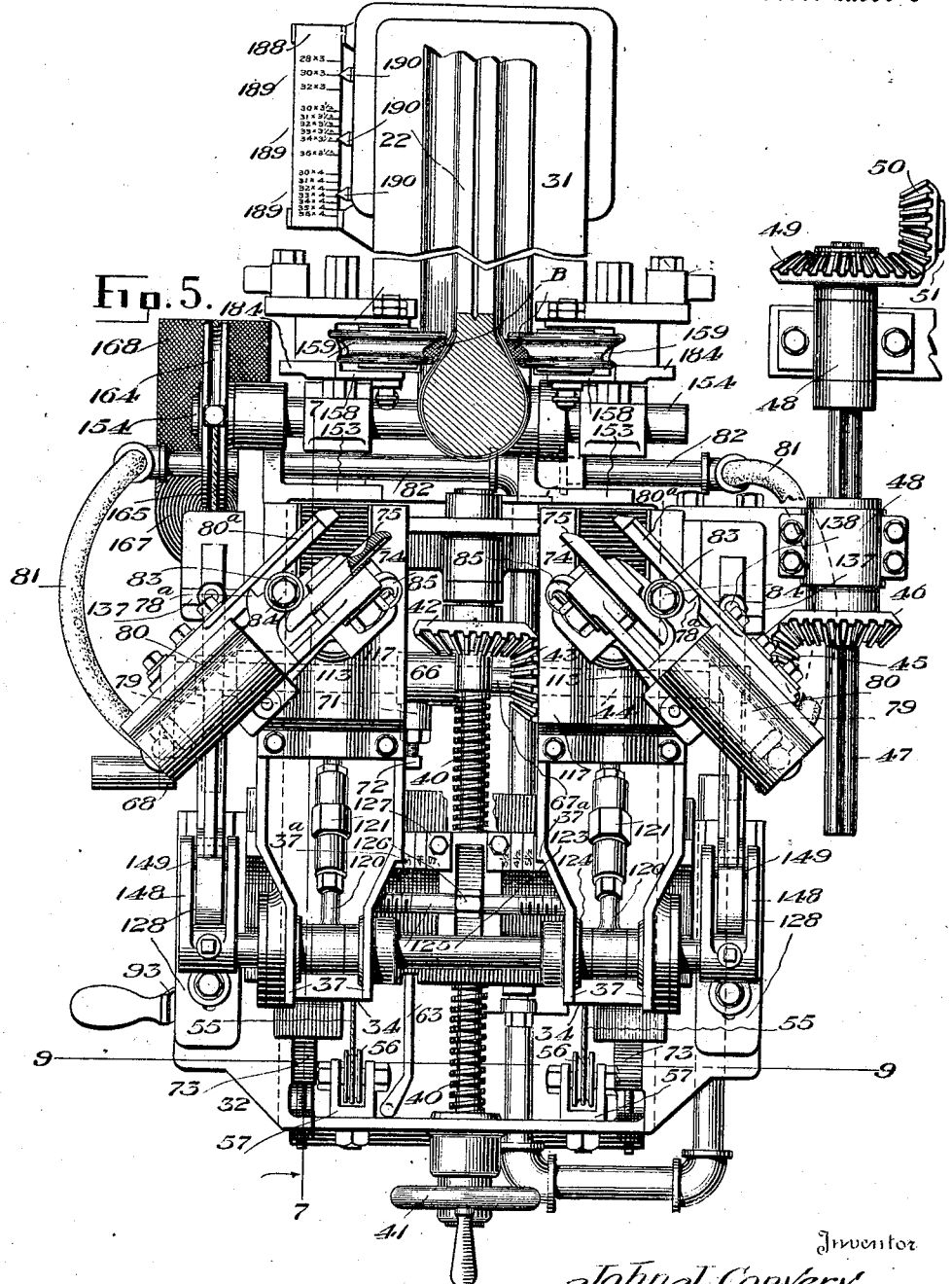

May 5, 1925.  1,536,377
J. J. CONVERY
TIRE MAKING MACHINE
Original Filed Aug. 10, 1914   17 Sheets-Sheet 6
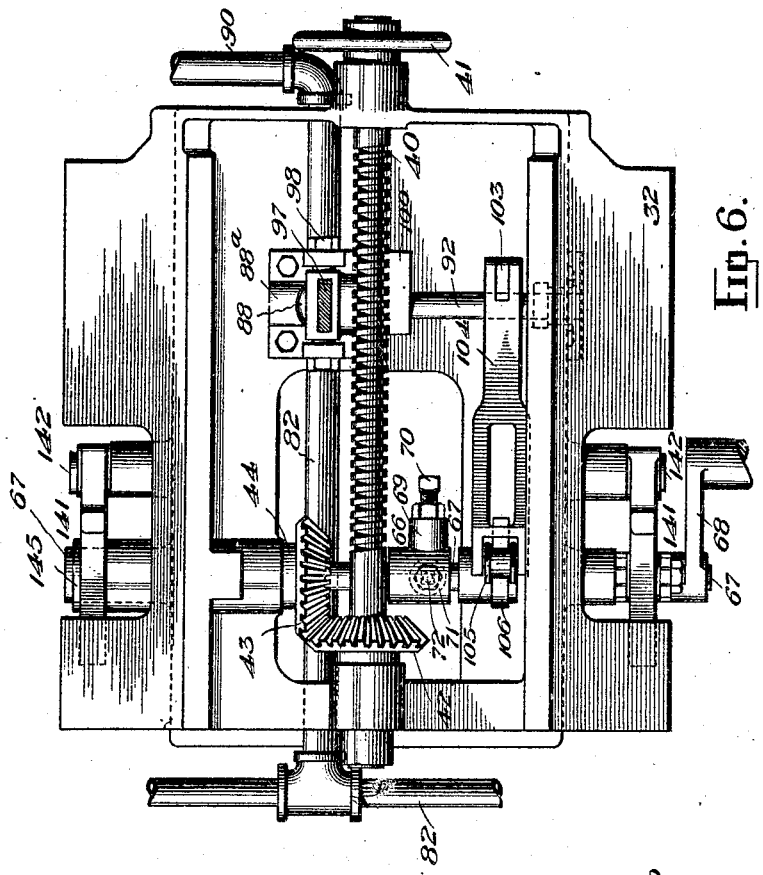
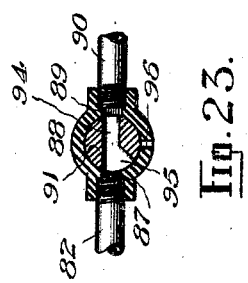
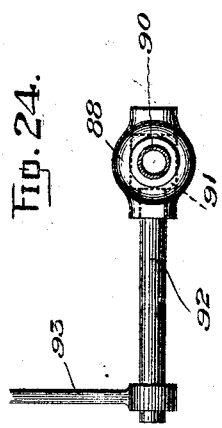
Inventor
John J. Convery
Witnesses May 5, 1925.
J. J. CONVERY
1,536,377
TIRE MAKING MACHINE
Original Filed Aug. 10, 1914   17 Sheets-Sheet 7
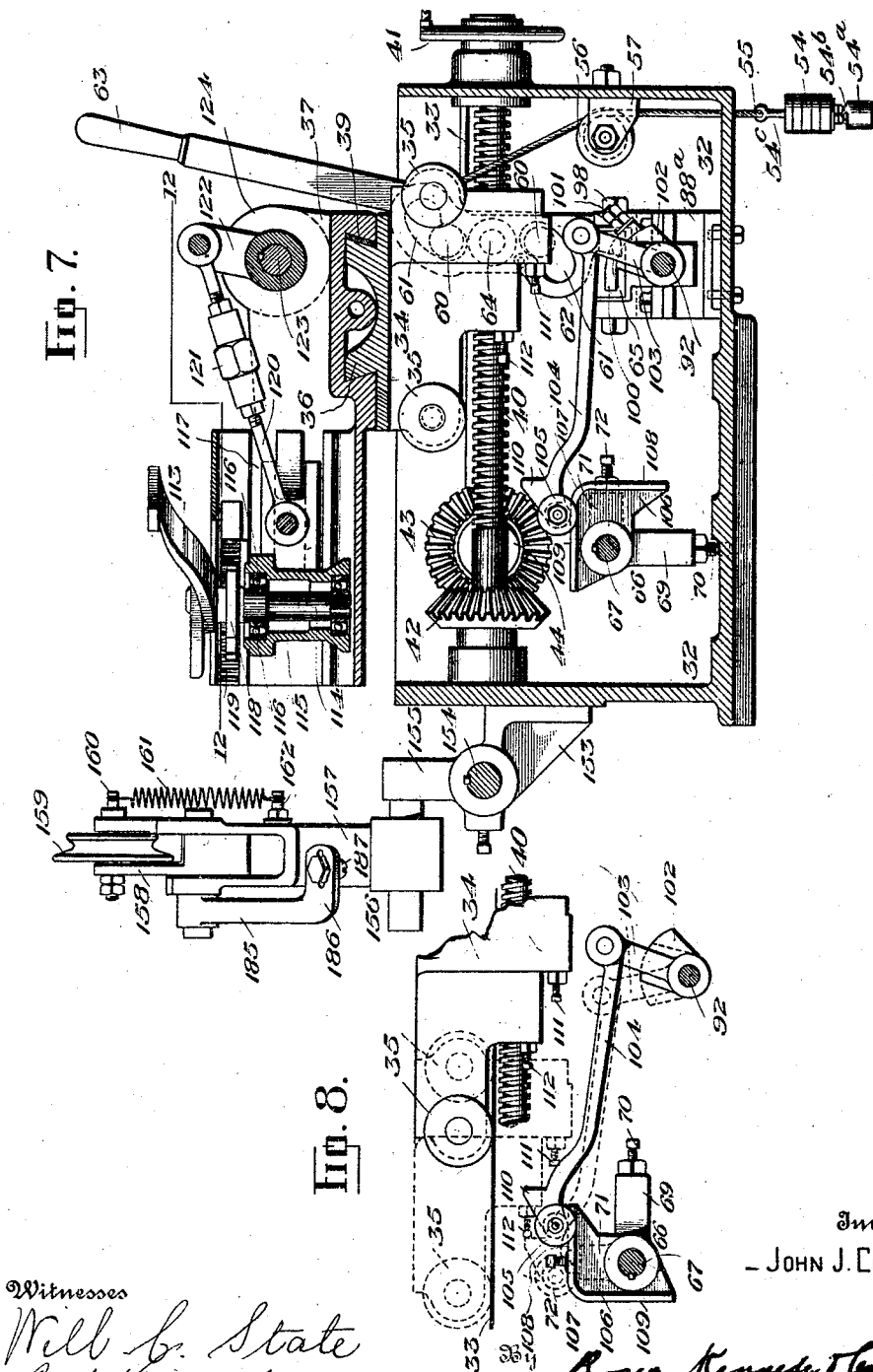
Witnesses
Will C. State
Curt Puentzel
Inventor
John J. Convery.
Rogers, Kennedy & Campbell
Attorneys

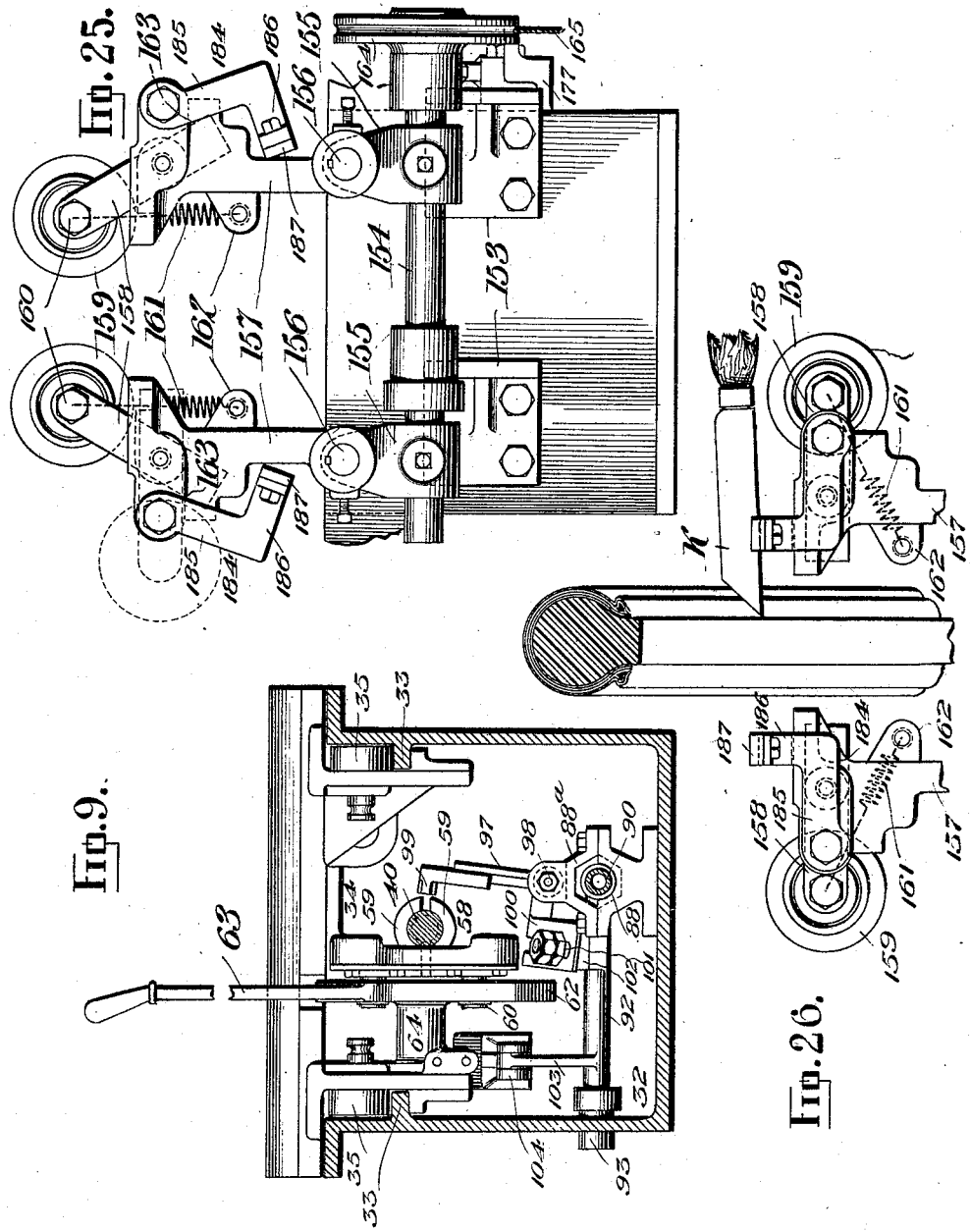

May 5, 1925.  
J. J. CONVERY  
1,536,377  
TIRE MAKING MACHINE  
Original Filed Aug. 10, 1914   17 Sheets-Sheet 9
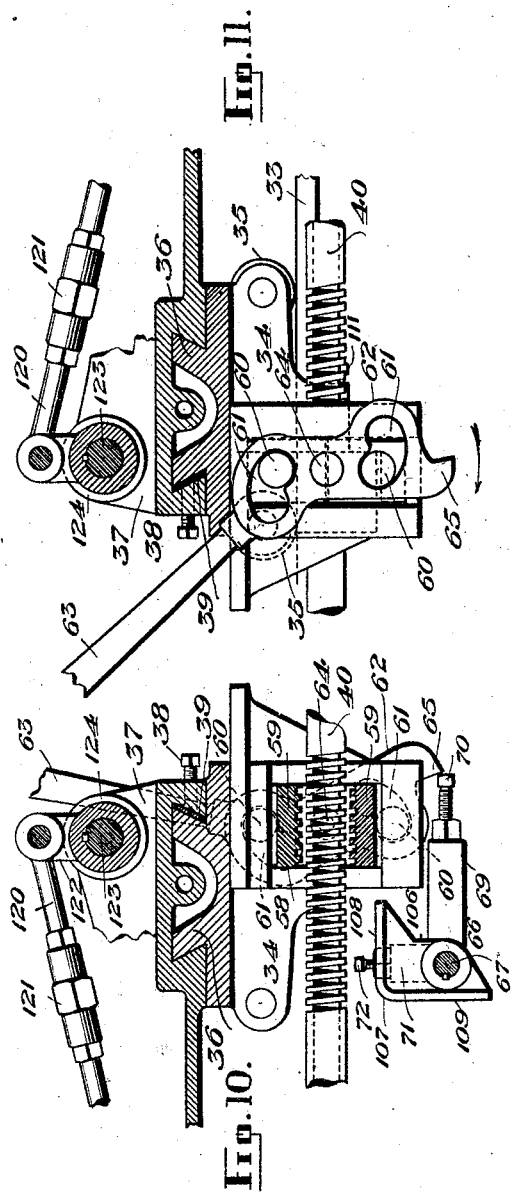
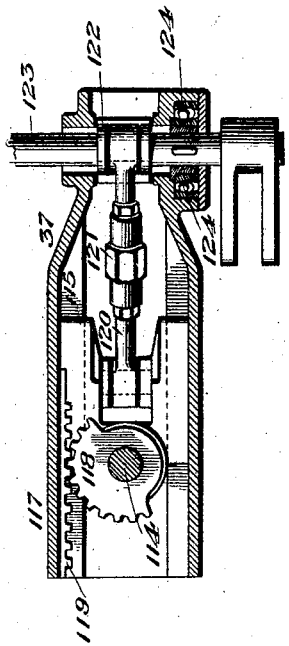
Inventor  
— JOHN J. CONVERY —

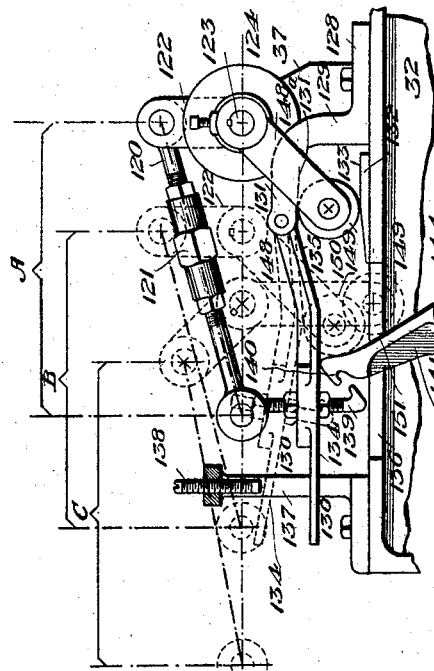

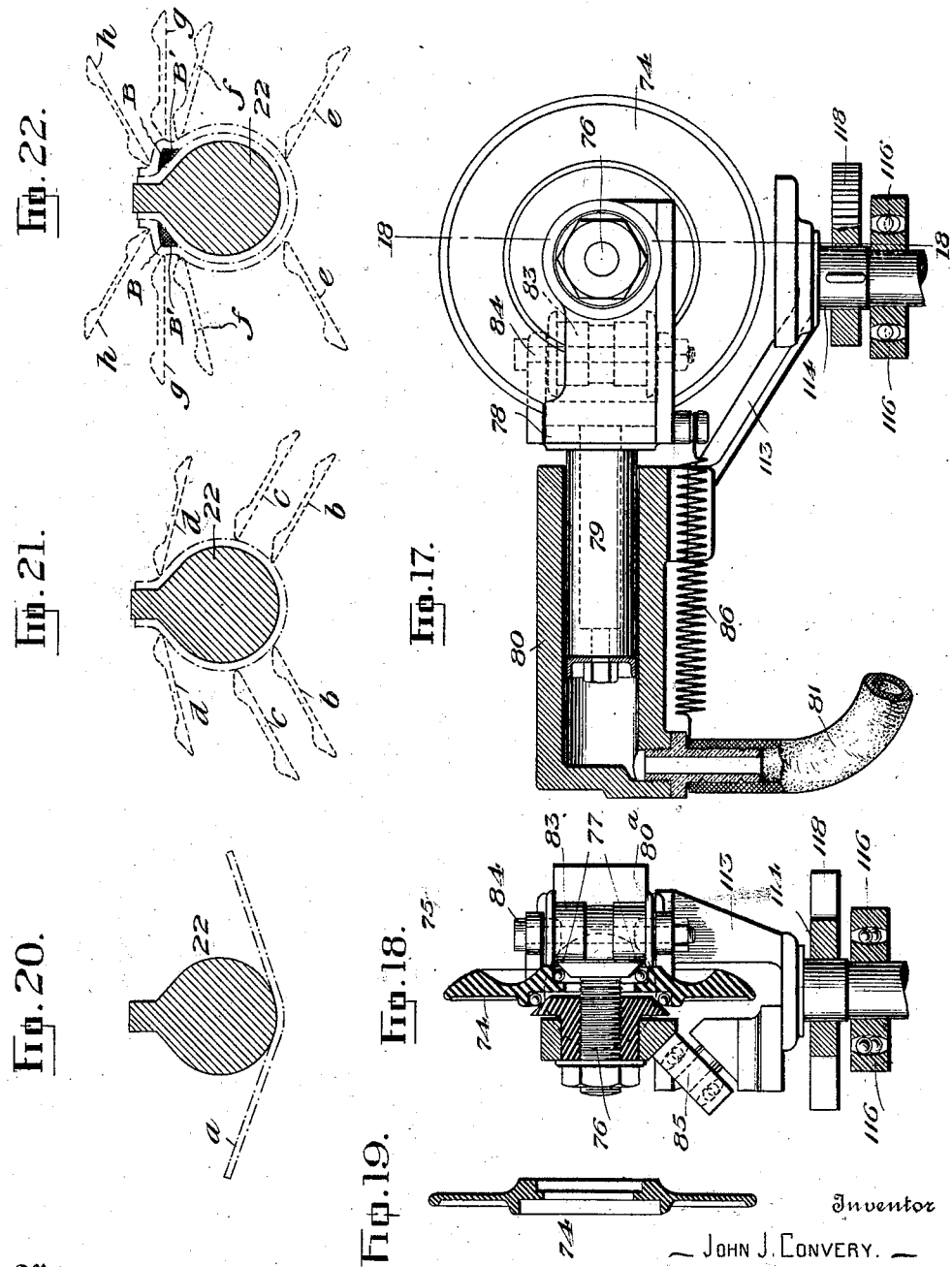

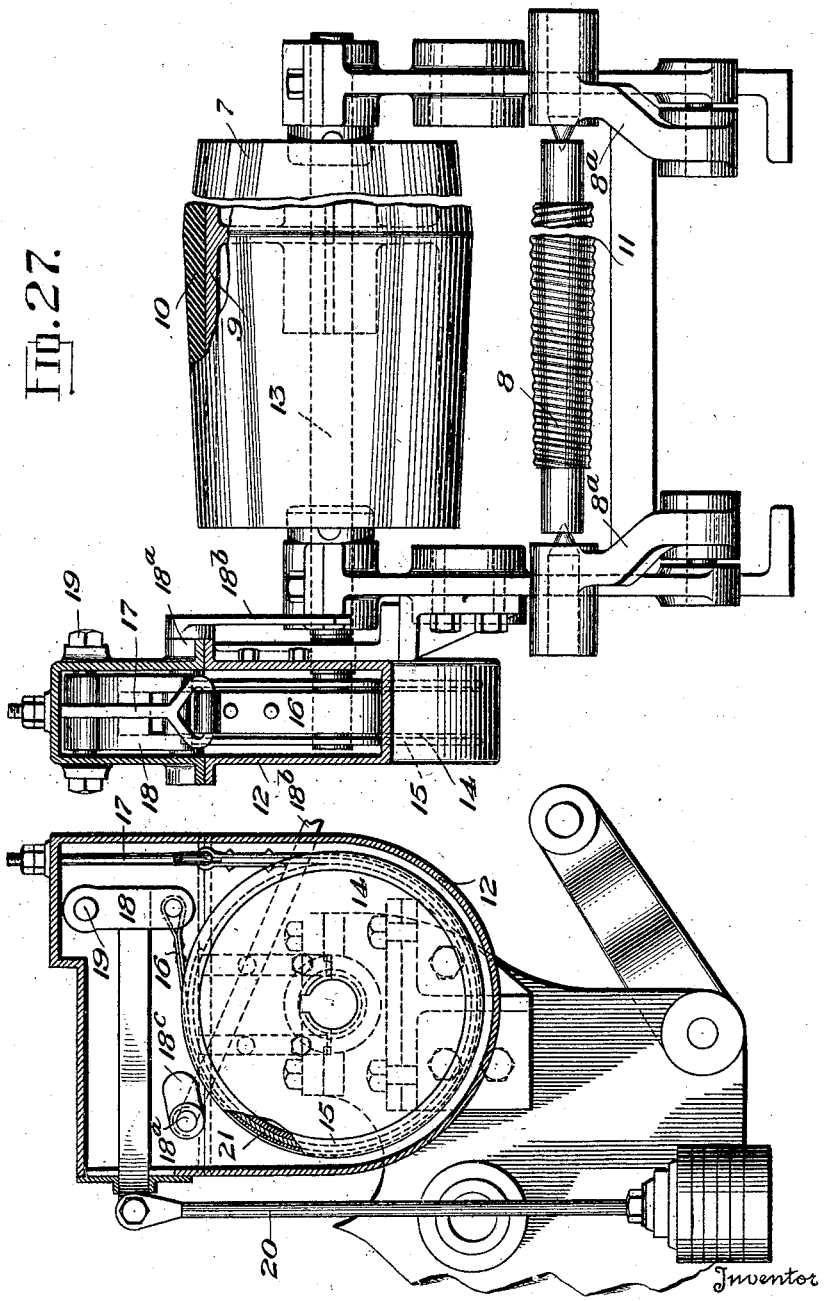

May 5, 1925.  
J. J. CONVERY  
TIRE MAKING MACHINE  
Original Filed Aug. 10, 1914   17 Sheets-Sheet 13
1,536,377
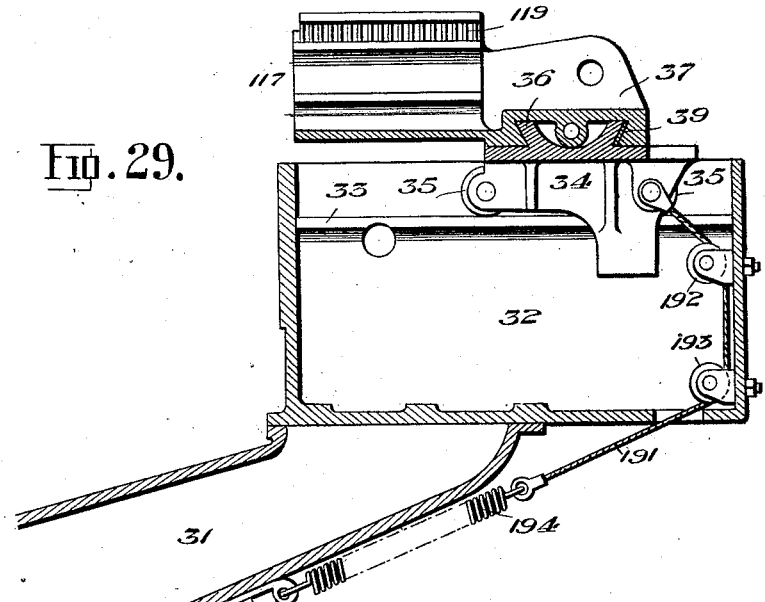
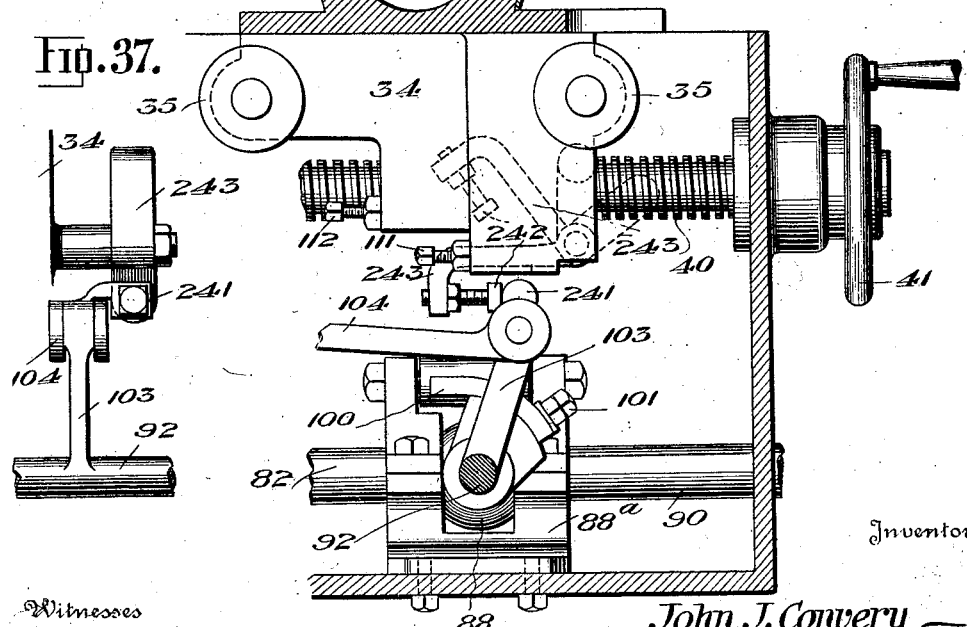
Inventor  
— John J. Convery —

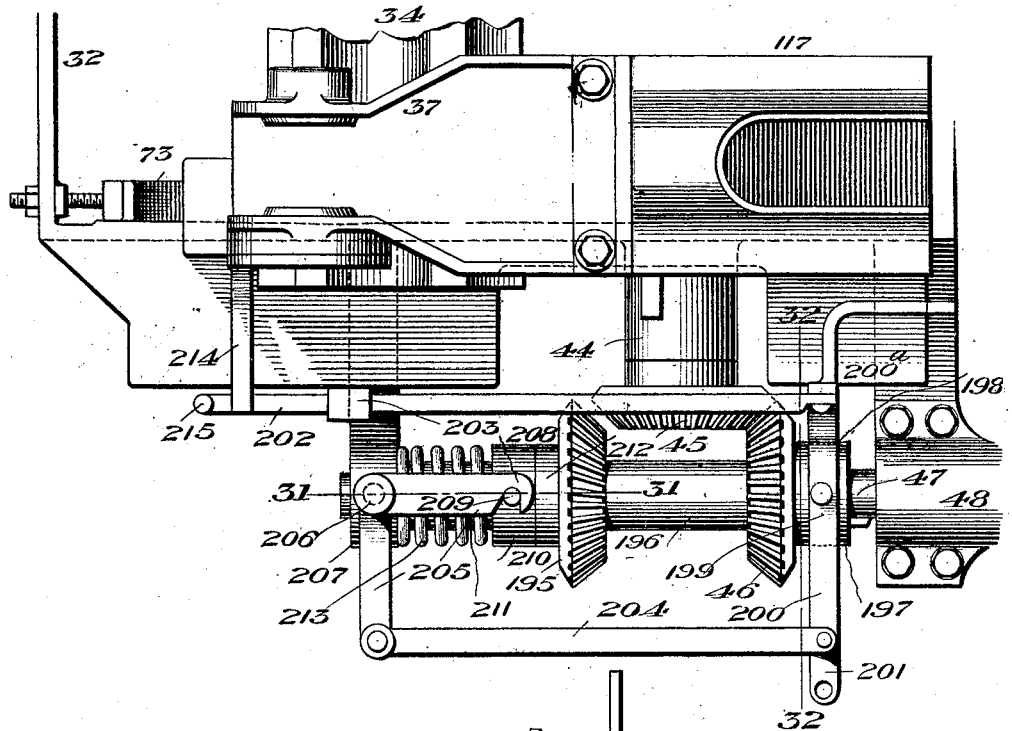
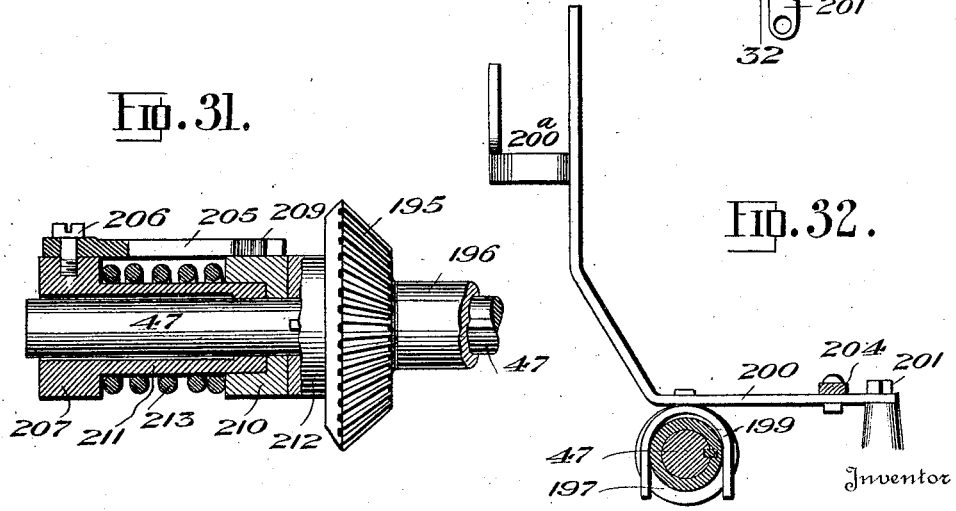

May 5, 1925.  1,536,377
J. J. CONVERY
TIRE MAKING MACHINE
Original Filed Aug. 10, 1914    17 Sheets-Sheet 15

Inventor
_John J. Convery_

By Rogers, Kennedy & Campbell
Attorneys

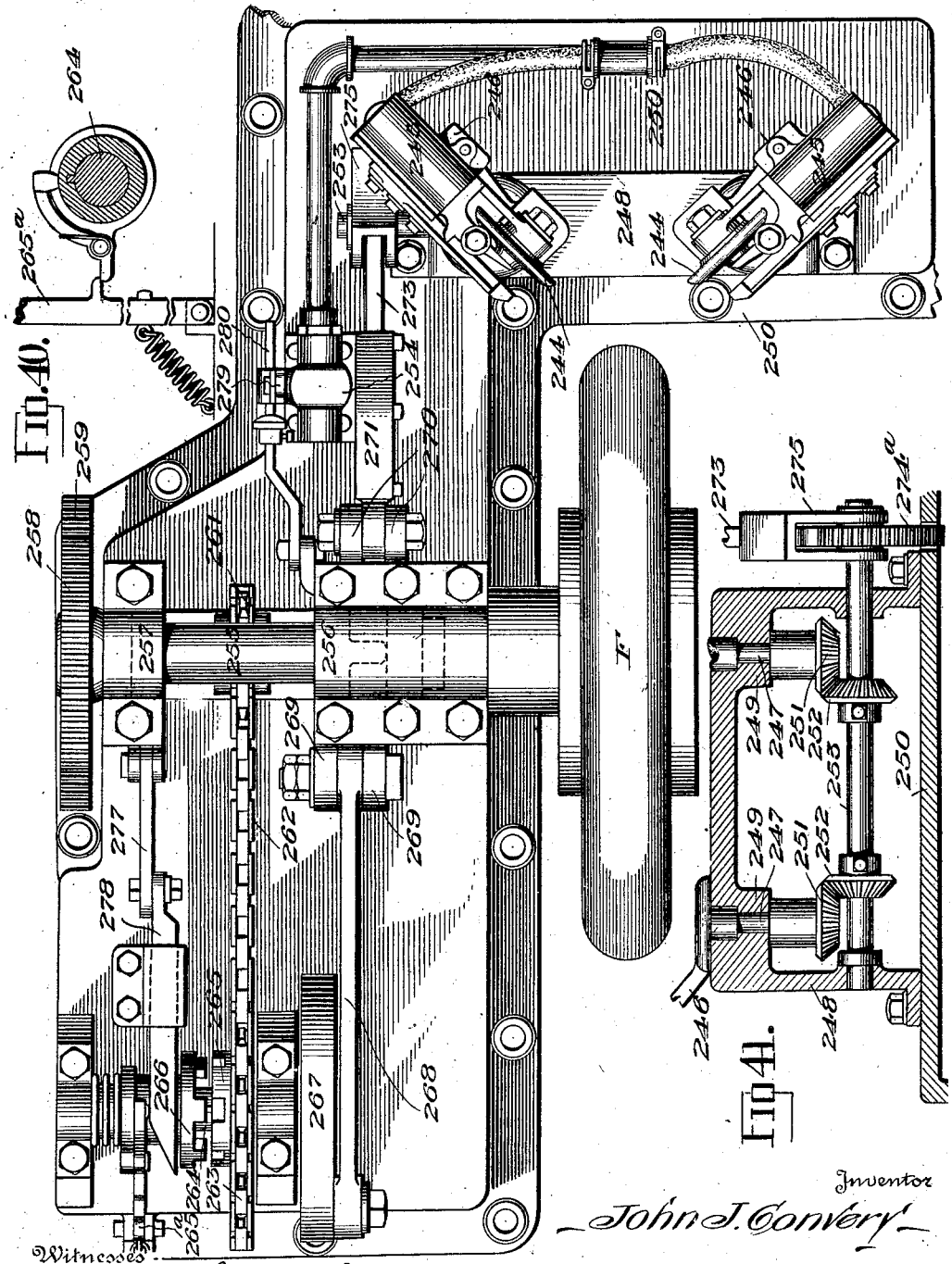

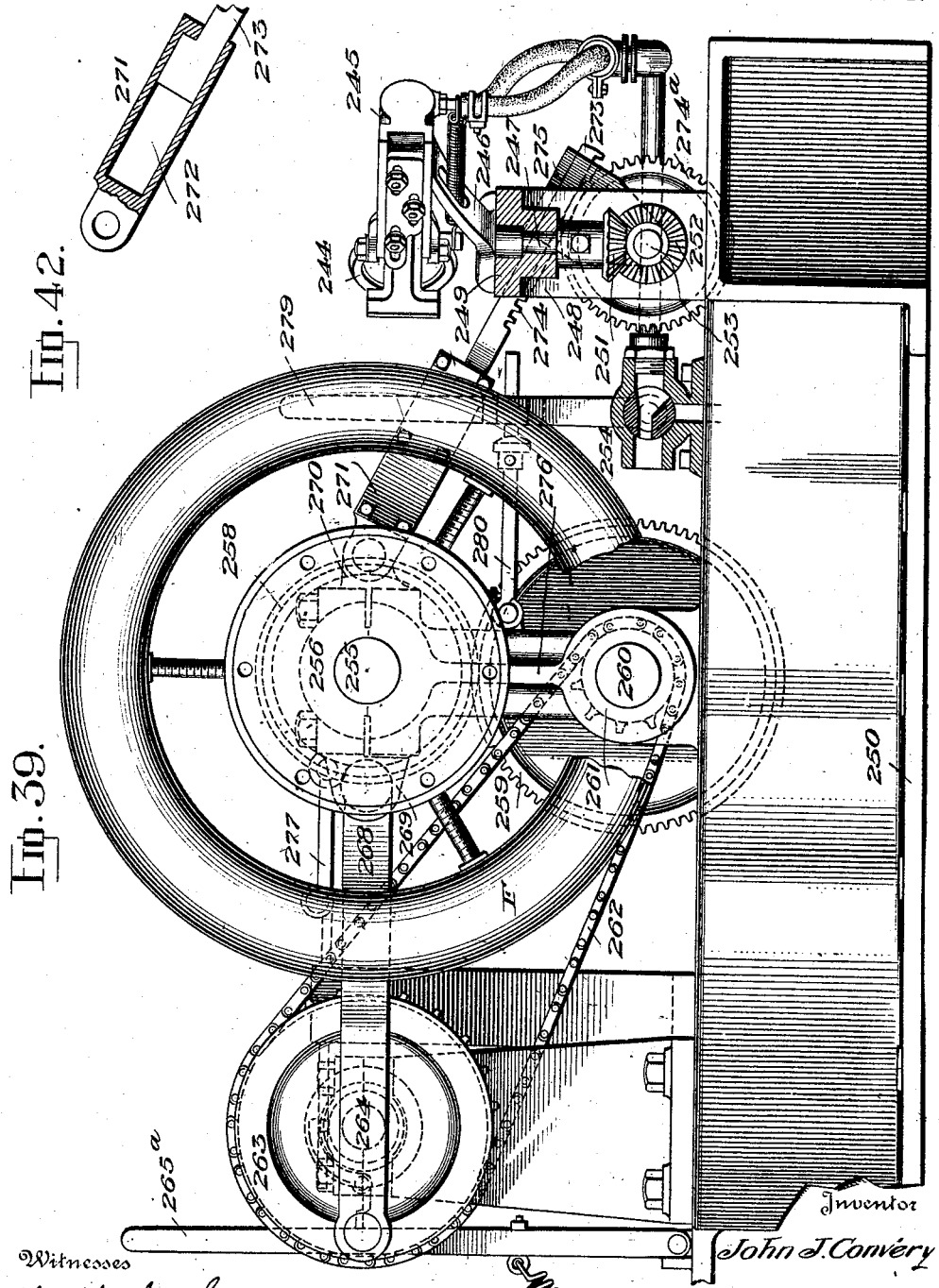

Patented May 5, 1925.

1,536,377

UNITED STATES PATENT OFFICE.

JOHN J. CONVERY, OF AKRON, OHIO, ASSIGNOR TO THE GOODYEAR TIRE & RUBBER COMPANY, A CORPORATION OF OHIO.

TIRE-MAKING MACHINE.

Application filed August 10, 1914, Serial No. 856,020. Renewed August 13, 1923.

*To all whom it may concern:*

Be it known that I, JOHN J. CONVERY, a citizen of the United States, residing at Akron, in the county of Summit and State of Ohio, have invented certain new and useful Improvements in Tire-Making Machines, of which the following is a specification, reference being had therein to the accompanying drawings.

This invention relates to machines for making rubber tires and more particularly to machines for producing the so-called "carcass" from which is formed the outer shoe or casing of a pneumatic tire. This "carcass"—so known in the art—includes a plurality of layers or plies of tire-fabric superposed one upon the other. Where beads are embedded therein, certain of the layers are folded over the same. This "carcass" has the general conformation of the finished shoe or casing.

In this class of machines, there is generally employed a rotatable tire-form or core which has an exterior conforming to that which it is desired to impart to the interior of the completed shoe. The "carcass" is formed upon this core by first positioning a layer of the tire-fabric on the same; then stitching or fabric-pressing rollers are operated thereon to roll this first layer on the core; this is followed by positioning and similarly rolling thereon one or more additional layers of tire-fabric; then beads are placed upon the outermost layer of fabric at a predetermined distance above the trimming point; and, finally, one or more additional layers of fabric are superposed and rolled thereon and folded over the beads.

In forming these "carcasses," it is essential—for the production of a shoe which is substantially perfect and free from defects that would become serious in the use of the completed tire—that the successive layers of the rubber-impregnated fabric shall be accurately positioned and shaped upon the core with avoidance of creases, wrinkles, and air-pockets, and that the product shall be practically uniform and of high grade.

One of the objects of the present invention is to provide a machine by which such a high-grade product may economically and uniformly be made, the machine being so constructed and arranged that it may conveniently be manipulated at all times by a single operator with great speed and efficiency, whereby a "carcass" is produced in approximately half the time that is now usually required for the purpose.

Another object is so to construct the machine and aggroup its components that the operator may conveniently manipulate it from practically a single position and without being obliged to change from that position to operate its different mechanisms.

Another object is to provide an aggroupment of fabric-manipulating mechanisms and instrumentalities which can conveniently be connected to the general stock and core supporting-structures of existing machines and be arranged to co-operate therewith with high efficiency.

Another primary object of the invention is to introduce into such a structure certain features whereby its various mechanisms and instrumentalities may be automatically operated and controlled during the fabric-manipulating operations, and whereby such mechanisms and instrumentalities, after being set in motion, may at a predetermined instant be automatically arrested and restored to starting position.

Another important object is to provide means for accurately positioning certain of the fabric-manipulating devices in predetermined relation to a portion of the tire-form upon which a strip of the tire-fabric had previously been placed and, also, to provide, in some instances, a plurality of such positioning means.

Another object is to provide a machine in which the principal mechanisms and instrumentalities are operated by power as contradistinguished from hand-actuation, with resulting accuracy of operation and uniformity of product, and with consequent reduction in cost and labor.

Another primary object is to provide a construction wherein each fabric-manipulating device shall have an effective movement from its initial engagement with the fabric until it has traversed practically the entire side-surface of the fabric-covered core to shape the fabric thereon and without creases and wrinkles; and, then, after a bead shall have been placed thereon, to have another effective traversing movement not only along the side-surface of the fabric-covered core but, also, over the fabric-covered bead which overlies the previously-applied layer of fabric; both of such traversing movements of the manipulating-device, in their entirety, being automatically effected under power and without necessity of stopping or initiating movement of any of the parts, for either traversing movement, after such parts have once been started.

Another object is to provide a structure in which the movement of certain of the instrumentalities shall be so controlled that the fabric-manipulating devices shall, on the successive layers of fabric, travel along substantially the same paths to effect a more perfect bond between the different layers, which result follows from the fact that pressure is thus exerted on portions of the underlying layers which previously had been touched by said devices; means being also provided for changing the path-travel of the devices so that, on successive layers, they will travel in different paths and, thus, constantly press upon portions of the underlying layers which had theretofore been untouched.

Another object is to provide for varying the character of operation of the automatic devices and, also, the period of their operation, for different sizes and types of product.

A somewhat more specific object is the provision in such a machine of a traveling structure adapted to be positioned in relation to the tire-form or core by effecting an advancing movement thereof under the influence of power-operated means; then causing automatic arresting of such advancing movement; and, finally, effecting (under the influence of power-operated means) the return of the structure to starting position. Thereby, the various fabric-manipulating devices (carried by the traveling structure) are first brought into operating position and, after performing their respective functions, are returned to starting position.

A still further specific object is to provide, in connection with such a traveling and positioning structure, additional instrumentalities for positioning said fabric-manipulating devices in and out of active relation to the tire-form, and combining with these instrumentalities means for varying the time of operation of such positioning-instrumentalities at the will of the operator.

A still further specific object of the invention is to provide novel and conveniently-operated means for accurately placing beads upon the sides of the fabric-covered core whereby, by reason of such accuracy in positioning the beads, the subsequent operations of the fabric-manipulating devices on the superposed fabric will insure the production of a carcass of uniform and exact dimensions and shape.

A still further specific object is to provide convenient and novel edge-trimming mechanism, and means for juxtaposing it to the tire-form.

Certain other important objects and advantages will be manifest from the drawings, hereto annexed and as will hereinafter be referred to.

The invention resides broadly in the several features of construction, in the aggroupment of elements, and in the general co-operating relation of the same, all as exemplified in the constructions hereinafter set forth, and the scope of application of which will be pointed out in the appended claims.

In the accompanying drawings, forming a part of this disclosure, I have illustrated, by way of example, certain embodiments of the invention and the utilization of the same for producing tire-carcasses; but it is to be understood that my invention contemplates other embodiments and utilizations which employ the underlying principles thereof, and that in herein exemplifying concrete embodiments of the invention, these shall not be regarded as indicative of the scope of the claims herein annexed.

In the drawings:

Figure 1 is a view in perspective of a tire-making machine constructed in accordance with the principles of the invention and exemplifying a practical embodiment thereof;

Figure 2 is a view in front elevation of the machine, the stock-supporting structure being omitted and the fabric-manipulating devices being shown in their shifted position;

Figure 3 is a fragmentary view, also in front elevation of the upper portion of the machine, including said stock-supporting structure;

Figure 4 is a view in side elevation looking from the left of Fig. 2;

Figure 5 is a view in plan, with parts of the stock-supporting structure omitted, the bead-placing mechanism being shown in its upper or operating position;

Figure 6 is a fragmentary view, also in plan, with the presser-sustaining and positioning carriage omitted, and showing a part of the carriage-actuating mechanism;

Figure 7 is a fragmentary view, in vertical longitudinal section, on the line 7—7, Fig. 5, with the stock-supporting structure and tire-core omitted;

Figure 8 is a fragmentary view in sectional elevation, showing in full and dotted lines, respectively, two positions of the presser-sustaining carriage, the means for automatically varying the extent of the advancing movement thereof in relation to the tire-form, and the means for automatically actuating the air-valve operating-mechanism;

Figure 9 is a view in vertical transverse section on the line 9—9, Fig. 5;

Figures 10 and 11 are fragmentary views in vertical section disclosing the clamping-nut for connecting the carriage to the feed-screw, and showing means for effecting automatic disengagement of said clamping-nut from the feed-screw;

Figure 12 is a fragmentary view in horizontal longitudinal section on the line 12—12, Fig. 7;

Figures 13, 14, 15 and 16 are fragmentary views in elevation and in section, respectively, and somewhat diagrammatic, illustrating certain active and inactive positions of certain mechanism-controlling parts and whereby the angular relation of the fabric-manipulating devices may be varied;

Figure 17 is a view in vertical section (and on an enlarged scale) of one of the fabric-manipulating devices which, in this instance, is shown as a roller;

Figure 18 is a fragmentary view in vertical transverse section on the line 18—18, Fig. 17, of the fabric-manipulating roller;

Figure 19 is a view in vertical section of a modified form of fabric-manipulating roller;

Figures 20, 21 and 22 are diagrammatic views showing, in section, the tire-form or core and, in dotted lines, the different positions of the fabric-manipulating rollers in pressing and shaping the fabric around the tire-form and (in Fig. 22), around the beads;

Figure 23 is a fragmentary view in section of the air-valve forming a part of the presser-actuating mechanism;

Figure 24 is an elevational view of the valve-operating mechanism;

Figure 25 is a view in elevation of the bead-placing mechanism;

Figure 26 is a fragmentary view in elevation of the fabric-trimming mechanism;

Figures 27 and 28 are views in front and side elevation, and partly in section, of the tension roller (forming a part of the stock-supplying structure) and the means for braking its rotative movement;

Figure 29 is a fragmentary view, in vertical longitudinal section of a modified form of power-operated carriage-returning mechanism;

Figure 30 is a fragmentary view, in top plan, of another modified form of power-operated carriage-returning mechanism;

Figure 31 is a fragmentary view, in longitudinal section on the line 31—31, Fig. 30;

Figure 32 is a fragmentary view, in transverse section, on the line 32—32, Fig. 30;

Figure 36 is a fragmentary view in vertical longitudinal section of mechanism for automatically opening the air-valve;

Figure 37 is a similar view of a detail thereof; and

Figures 38 to 42 are views in plan, side elevation and in detail of a modified form of machine, wherein the core-supporting structure moves in relation to a relatively stationary fabric-manipulating structure.

In the drawings, corresponding reference-characters are employed to indicate corresponding parts throughout the several views.

Figure 33:
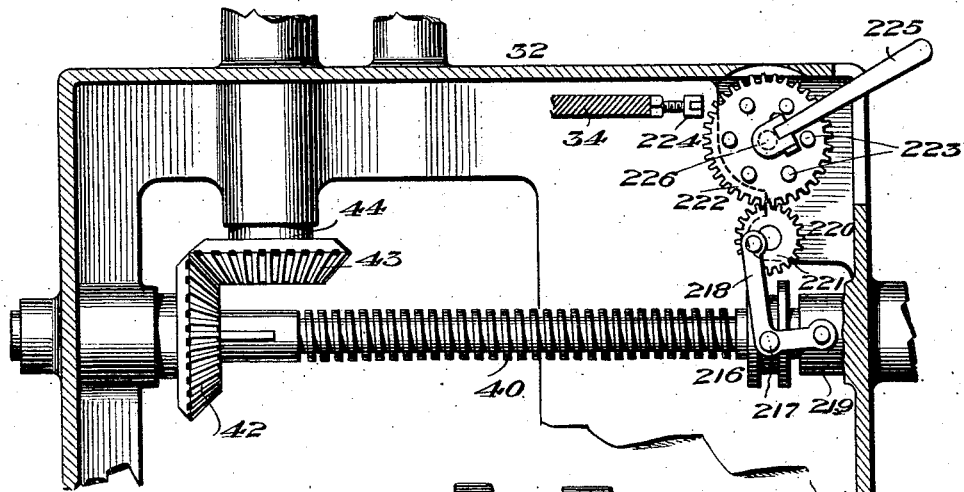
Figure 33 is a fragmentary view, in longitudinal horizontal section, of a feed-screw shifting device for varying the paths of travel of the fabric-rollers.

*General supporting structure.*—The several mechanisms and devices, hereinafter described, are preferably sustained by a general supporting-structure which includes a frame or base 1 of any desired form and dimensions.

*Stock-support.*—Upon the base 1 is mounted a rotary table or head 2, with means, such as the locking-device 3, for preventing its movement. Upstanding from the head are standards 4. Upon these are mounted a plurality of sets of stock-supporting members, including a stock-carrying roll 5, cloth-carrying roll 6, a tension-roller or roll 7, and a fabric-guide roller or roll 8. This structure supports a stock of tire-fabric and facilitates its subsequent use. By reason of the fact that the head is rotatable, one or another set of these rollers or rolls may be brought into position to supply a strip of tire-fabric to fabric manipulating devices, presently to be described.

As the general arrangement of this stock-support forms no part of the present invention, and as the function of each of the different rollers and parts in this class of machines is well understood, a detailed description thereof is deemed unnecessary. The form of the tension-roller 7 and the manner of controlling it, and the form of the guide-roller 8 have, however, been improved by me and such improvement resides in the following: The roller 7 comprises a cylindrical body-portion 9 and, in this instance, a crown-portion 10, of rubber or other material, encompassing the body-portion. The body and crown-portions could be integral, if preferred. The guide-roller 8, supported on the brackets 8ª, is correspondingly crowned to present a central diametral enlargement at 11.

By crowning these two rolls, the subsequent operation of withdrawing the strips of fabric therefrom is greatly facilitated: The object of the crowned surfaces is to direct the fabric and relieve unnecessary side-stretching thereof while the middle portion is being stretched when the fabric is being drawn off the stock-roll.

In order to retard the rotative movement of the roller 7,—for a purpose presently to be explained—I provide a brake-device which includes the following: Mounted on one of the standards 4 is a casing 12 into which extends a shaft 13 on which the tension-roller 7 is mounted. Fast on the end of this shaft and within the casing is a drum 14 provided with circumferential side-flanges 15. A brake-band 16 encompasses the drum and is secured at one end to an eye-pin 17 extending through the top of the casing and bearing nuts to permit adjustment. The other end of the brake-band is secured to a lever 18, fulcrumed at 19, and which extends through the side of the casing. From the outer end of the lever depends a weight-carrying piece 20. The operation of this device is such that there will be normally developed sufficient friction between the band 16 and the drum 14 to cause the roller 7 to be braked in its rotative movement. Between the brake-band 16 and the surface of the drum is a strip of rawhide or other suitable wearing-material 21 upon which the band acts.

This device will effect any desired stretch of or stress in the fabric. Stretching of the fabric produces a certain stress therein. This device is adapted to control both requirements. By increasing the weight on the carrying-piece 20, the amount of stretch may be increased, or desired stress also similarly effected. Fulcrumed at 18$^a$ is a lever 18$^b$ which carries a lifter 18$^c$ adapted to engage the underside of the lever 18 when it be desired to relieve the friction on the drum 14, and whereby free movement of the roller 7 is permitted. The nuts on the eye-pin 18 permit adjustment thereof and, through the brake-band, effect a changing of position of the lever 18 whenever required.

*Core-supporting structure.*

Any suitable form of structure may be employed to support a core or tire-form 22; but, in the present embodiment, I elect to utilize that herein illustrated, as being conveniently and effectively operated. This comprises a shaft 23 (driven by mechanism presently to be described) carrying a hub 24 provided with radial arms 25. The core or tire-form corresponds on its exterior surface to the interior of a pneumatic tire-shoe upon which the carcass is to be formed. In this instance, the core-supporting structure is relatively stationary.

*Driving-mechanism.*—Sustained by the the supporting-structure is a driving-mechanism common to the various actuatable devices hereinafter described, and which includes a main drive-device 26 suitably mounted in the frame and which includes a driving member 27 driven from a suitable source of power.

The drive-device 26 is mechanically connected to low and high speed devices 28 and 29, respectively, which in turn similarly are mechanically connected to the core-driving shaft 23. A clutch-device 30 is provided for the purpose of clutching either the high speed or the low-speed device to the main drive-device 26. Thereby the tire-form may be driven at low speed or at a high rate, as desired, and in conjunction with the various parts of mechanisms presently to be described.

*Fabric-manipulating mechanism structure.*

*Presser sustaining and positioning carriage.*—Arranged in juxtaposition to the tire-form and preferably sustained by the main-frame, is a "carcass"-forming structure which includes the following mechanisms and instrumentalities, and between which and the core-support there is relative movement; and this contemplates means for effecting the same.

Mounted on or formed as a part of the base 1 is a bracket or base-plate 31. This bracket may be adjusted in relation to the tire-form or core by any suitable means. In this instance, a shaft 31$^a$, threaded into a nut (not shown) carried by the bracket may be utilized for effecting such adjustment.

Sustained by this bracket is a carriage-supporting frame 32 which is preferably rectangular and of box-form. Attached to or formed with the longitudinal sides of the frame are tracks 33 adapted to be traversed by a presser-supporting and positioning carriage 34. Upon the carriage, at opposite sides, are rollers 35 adapted to travel on the tracks and thereby facilitate movement of the carriage which they support. This carriage comprises a body-portion provided with a dove-tail rib 36 upon which are mounted two brackets or trunnion-members 37. The brackets are normally spaced relatively to each other but such spaced relation may be changed at the will of the operator by shifting one toward or away from the other by a device presently to be explained. To maintain them in proper positions of adjustment, a set-screw 38 is threaded into the bracket and engages a wear-strip 39 interposed between the bracket and the dove-tail rib 36. These brackets or trunnion-members constitute shaft-supporting elements, as will be presently explained.

*Carriage-actuating mechanism.*—Movement of the carriage on its tracks and, thus, in relation to the axis of rotation of the tire-form—that is toward and away from it—may be effected in any suitable manner and for purposes of positioning the parts and instrumentalities carried thereby in relation to the tire-form. In this instance, and by way of example, I have shown carriage-actuating mechanism which includes a threaded-shaft or feed-screw 40 suitably journaled in the front and rear portions of the carriage-supporting frame 32. The outer end of the feed-screw, extending outside of the carriage-supporting frame, is, preferably and as shown, provided with a hand-wheel 41, whereby it may be turned manually in one direction to traverse the carriage forwardly toward the tire-form and, thus, produce an advancing movement thereof in relation to the form; and, also, turned in the opposite direction to cause the carriage to have a movement away from the tire-form and, thus, produce a receding movement thereof in relation to the form. In some instances, and as contemplated in the present embodiment, means may also be provided for power-actuating the feed-screw in either direction. To this end, and for power-driving the carriage for its advancing movement, the feed-screw is provided adjacent its inner end with a bevel-gear 42 meshing with a corresponding gear 43 fast on a transverse shaft 44 suitably journaled in the carriage-supporting frame and carrying at its outer end a bevel-gear 45 meshing with a corresponding gear 46 feathered for sliding movement on a longitudinal shaft 47 journaled in brackets 48—48 and carrying at its inner end a bevel-gear 49. This meshes with a corresponding gear 50 fast on a transverse shaft 51 which, at its opposite end, carries a gear-wheel 52 adapted to mesh with and be driven by a gear-wheel 53, with which also meshes a core-drive-gear 23ª, wherefore, the core or tire-form receives motion in synchronism with the advancing movement of the carriage. It will be understood that when the carriage is connected to the feed-screw (by mechanism presently to be described) it will be rotated, to effect the advancing movement of the carriage, by motion transmitted to it from the main drive-device 26. When the feed-screw is actuated manually, the gear 50 (which is slidably mounted on its shaft) may be disconnected from the gear 49.

As already suggested the present embodiment contemplates effecting a receding movement of the carriage by power-actuated mechanism; and this may be of any preferred form. I have, however, found to be convenient and effective a type of carriage-actuating mechanism which includes a motor in the form of one or more weights, or sets of weights, 54 and 54ª, operated by flexible elements or cables 55 attached at suitable points to the carriage and passing over rollers 56 journaled in brackets 57 mounted on the inside wall of the carriage-supporting frame 32. In this instance, I have shown two sets of weights: The one set, 54, is slidably suspended on weight-hangers 54ᵇ which depend from the carriage-supporting frame 32 and are apertured to receive eye-pieces 54ᶜ which, at their lower ends, are adapted to carry the weights 54ª and which, at their upper ends, are connected to the flexible elements.

When the carriage starts on its advancing movement, it will first raise the weights 54ª which, after being elevated a short distance, will engage the weights 54 and raise these. By this arrangement, the carriage, during its initial advancing movement, is not caused to lift the entire mass of the two sets of weights; but, after it has reached a predetermined point, both sets of weights will have been raised. This mechanism is such that, when the carriage is disconnected from the feed-screw (as will be presently explained) and is thus released, the mass of weights will effect a movement of the carriage away from the tire-form and thereby position certain devices and instrumentalities, carried by the carriage, out of operating engagement with the tire-form, as will be hereinafter described. Obviously, the set 54 will, in descending, first come to rest and the second set, 54ª, will then effect a completion of the receding movement of the carriage.

From the foregoing, it will be understood, that I have thus provided power-driven mechanism, as well as manually-operated means, for effecting the advancing movement of the carriage toward the tire-form and, also, that I have provided power-actuated means (as well as manually-operated means) for effecting the receding movement of the carriage. These movements of the carriage are produced, first, to position the aforementioned devices and instrumentalities in operating relation to the tire-form and, then, to effect the withdrawal of such devices and instrumentalities away therefrom, and all by power-actuated mechanisms adapted to make the machine, in these respects at least, automatic in its action.

It is now in order to describe the instrumentalities whereby the carriage may be connected to and disconnected from the feed-screw. While such means may be of any desired form, I prefer, in the present embodiment, to employ the following: Encircling the feed-screw is a clamp-nut 58 comprising two parts 59—59 slidably mounted in ways in the carriage 34 and movable toward and from each other and, thus, into and out of engagement with the screw. Each part of the clamp-nut is provided with a projecting-stud which carries a roller 60. Each roller is arranged in a slot 61 formed in the lower enlarged portion 62 of a carriage-feed control-lever 63 which preferably extends above the plane of the carriage, as shown. This control-lever moves on a fulcrum 64 formed on the carriage 34 and occupying a position between the slots 61 in the lever. The axis of the lever and its slots are so arranged relatively that when the lever is moved in a direction away from the tire-form, the two parts of the clamp-nut will be moved toward each other and, thus, into engagement with the feed-screw and, when moved in the opposite direction, the two parts of the nut will be moved away from each other and, thus, out of engagement with the feed-screw. By this means, the carriage may be connected to the feed-screw at the will of the operator and manually, whereupon the carriage may be given an advancing movement in at least two ways, namely, manually as by turning the hand-wheel 41, and by power transmitted to the feed-screw through the gears, shafts, etc., from the main driving mechanism, already described.

It will also thus be seen that both the core-support and this presser-supporting carriage may be actuated by power and whereby their relation with respect to each other may be changed for purposes presently to be explained.

Moreover, the carriage may be given a receding movement in relation to its normal or starting position by power-actuated mechanism.

*Carriage-arresting mechanism.* — When the presser-supporting-carriage reaches a predetermined position in its advancing movement—and this position may be varied at the will of the operator in a manner presently to be explained—it is desirable to provide for automatically arresting such movement: In the present instance, this is conveniently accomplished by disconnecting the carriage from the driving mechanism. To this end, means are provided for automatically disengaging the clamping-nut from the feed-screw whereupon further advance thereby of the carriage ceases. In the present instance and by way of example, I provide the following as constituting an automatic carriage-arresting mechanism: The enlarged portion 62 of the control-lever 63 is provided with an abutment-portion 65 which is adapted to be engaged by a device (now to be described) disposed in proximity to the limits of travel of the carriage, and whereby the lever will be moved on its fulcrum 64 in the direction indicated by the arrow, Fig. 11, and thereby shift it to the position indicated in Fig. 10. Any appropriate lever-actuating device may be employed; but, in the present embodiment, I have shown this as including a stop-device which comprises a two-armed member 66 keyed on a control-member positioning-shaft 67 journaled in the sides of the carriage-supporting-frame 32. This shaft has one end extended through the left side of the frame and has fast thereon a member-shifting lever 68. The stop-member 66 carries a long arm 69 in which is threaded an adjusting-screw 70, and a short arm 71 in which is also threaded an adjusting-screw 72. One or the other of these adjusting-screws is adapted to be engaged by the abutment 65 of the control-lever 63. By means of the lever 68, the position of these adjusting-screws may be changed and, in this way, the time at which the advance movement of the carriage is arrested may be predetermined and, also, varied, since such arresting action will be effected sooner when the stop-arm 69 occupies a horizontal position (as shown in Fig. 10) than when the stop-arm 71 is in the horizontal position, as shown in Fig. 7. The adjusting-screws 70 and 72 permit fine adjustment, whereby the instant of arresting the movement of the carriage may be adjusted with all the nicety that may be essential.

As soon as the carriage is disconnected from the feed-screw, it will (under the action of the motor-device 54) be returned to normal position and, thus, be given its receding movement away from the tire-form.

Naturally, this receding movement of the carriage is effected with considerable momentum; hence, it is desirable to provide means for arresting its receding travel and also for absorbing the shock resulting therefrom. To this end, an adjustable buffer-member or bumper 73 is disposed on the carriage-supporting frame and this is impinged against by the rear-portion of the carriage. By this device, the starting position of the carriage may be varied, as will hereinafter be explained.

*Fabric-pressing devices.*—Mounted on the carriage, movable therewith, and positionable thereby in relation to the tire-form, are fabric-manipulating devices which, in this instance, are primarily designed as fabric-pressing members or pressers. By way of example, and as a preferred form of device, these are herein illustrated as fabric-rollers 74. As shown particularly in Fig. 17, each of these rollers is, preferably, of a particular design: It is round on its periphery and presents on one side and adjacent such periphery a fabric-folding surface 75 which is angulated in relation to its inner face and for a purpose more particularly hereinafter explained. Each of the rollers is mounted on a horizontal stub-shaft 76, and ball-bearings 77 are embodied therein to permit high-speed rotation thereof. The stub-shaft 76 is disposed in a slidable head-member or projecting-carriage 78 forming the outer end of a piston 79 which operates in a pressure-cylinder 80. To this cylinder is supplied a pressure-fluid (such as compressed-air, steam, etc.) through a flexible pipe 81 connecting with piping 82 and which, in turn, is supplied with fluid under pressure from a suitable source. To facilitate the movement of the head 78, a bearing-roller 83 (journaled on a vertical axis 84) is in rolling engagement therewith. On the opposite side of the head another anti-friction roller 85 is disposed in rolling engagement therewith. It will, of course, be understood that when a pressure-fluid (be it compressed air, or of other form) is introduced into the cylinder 80, the piston is actuated and this actuates, thrusts or projects the head and its roller 74 outwardly. This structure includes the described power-operated means for actuating and initially positioning the presser-roller in relation to the tire-form, as will be more particularly explained farther on.

It is also desirable to provide power-operated means for returning the roller (and its supporting head) to normal position: An effective instrumentality for this purpose is a spring 86 which at one end is connected to the head and at the other to the pneumatic cylinder 80.

When the roller-supporting head is projected outwardly, the spring is tensioned so that, when the air-pressure within the cylinder is released, the tensioned spring returns it to normal position.

There are, preferably, a pair of these fabric-pressing rollers arranged in spaced relation, and this relation may be varied, if desired, in a manner presently to be explained.

In this instance, means are preferably provided not only for limiting the projected movement of the fabric-roller but, also, for varying the extent of such movement, at the will of the operator: To this end, there is adjustably connected on the cylinder 80 a side-guide-member 80$^a$ adapted to be engaged by a stop-lug 78$^a$ carried by the head 78. The guide is longitudinally adjustable on the cylinder so that the outward movement of the head and fabric-roller may be limited at any predetermined point. In this way, the initial positioning of the fabric-rollers in proximity to the tire-form may be varied at the will of the operator so that, when the carriage begins its advancing movement, the instant that the rollers are thereby positioned in engagement with the tire-form may be advanced or delayed, as may be desired. This provides means for enabling the fabric-rollers to cover a greater or less surface-area of the tire-form whenever this be required.

These fabric manipulating devices are adapted to be positioned in respect to the tire-form, in part by the carriage and, in part, by other instrumentalities and devices hereinafter to be described. The carriage is, therefore, a presser-supporting and positioning structure. The pressing-rollers are manipulated with respect to the rotating tire-form and engage the sides of the successive layers or plies of fabric previously stretched around the same and roll these layers down upon the form, upon each other, and upon and around inserted beads. It will be understood, therefore, that the presser-members 74 are pressure-operated and that the action of these fluid-pressure-operated presser-devices is to effect a positioning of the presser-rollers in operative relation to the tire-form additional to, but independent of, the positioning thereof effected by the movement of the carriage. As already explained, the carriage operates (in part) to position these fabric-manipulating rollers either toward or away from the tire-form, according to whether it is being advanced toward the same, or moved away therefrom. These pressure-devices accomplish an additional positioning of the rollers and, moreover, maintain them resiliently in contact, or in contacting relation, with the fabric-covered form. The springs 86, on the other hand, effect, as a power-operating, or pressure, device. a receding movement of the pressing-rollers away from the form, and they are, thus, positioning-devices, also.

As already mentioned, means are provided for supplying pressure-fluid to the cylinders and for effecting operation of these pressure-devices: The flexible pipe 81, which is connected to each pneumatic cylinder 80, is supplied from the pipe 82 which communicates with an outlet-opening 87 in a two-way air-valve 88. Leading to a valve-inlet-opening 89 is a pipe 90 connected to an air-supplying device (not shown) and which maintains a constant air-pressure at the air-valve 88, in a manner well understood. The two-way air-valve, as shown in Figs. 23 and 24, comprises a body-portion (mounted in a bracket 88$^a$ on the carriage-supporting frame 32) and a valve-stem 91 forming an extension of a transverse valve-controlling shaft 92 journaled in the carriage-supporting frame and by which the valve is operated. Fast on the shaft, outside of the supporting-frame, is a valve-control-lever 93 by which the valve is manually actuated. Means for automatically rocking the shaft 92 and, thus, for automatically operating the valve, are also provided and such means will be described in detail farther on. The valve-stem 91 is provided with a channel 94 adapted to establish communication (as seen in Fig. 23) between the inlet-opening 89 and outlet-opening 87, and is enlarged, as at 95, so that, when the stem is turned, the enlarged portion of the channel will register with an escape-opening 96 in the valve. When the stem is in the position shown in Fig. 23, the air is free to pass from the point of supply to the pneumatic cylinders 80 to project the fabric-pressing rollers 74 toward the tire-form and simultaneously tension the springs 86. If, however, the stem 91 is turned so that it closes the inlet-opening 89, communication is then between the pneumatic-cylinder and the atmosphere through the passage 94 and escape-opening 96. The air will then be permitted to escape from the cylinders 80 and allow the springs 86 to draw the fabric-rollers away from the tire-form.

*Carriage feed preventing device.*—When the control-lever 93 is in the position shown in Fig. 4, the valve is open to passage of pressure-fluid to the cylinders, whereupon they will be supplied therewith and project the fabric or pressing-rollers toward the form. As will be explained more in detail in connection with the general operation of the machine, the valve is opened in this manner in advance of the movement, by the operator, of the carriage feed-control-lever 63. In other words, the pressing-rollers are projected toward—but not into contact with—the fabric on the tire-form prior to starting the advancing movement of the carriage. This is so that the pneumatic devices may initially position the pressing-rollers in relation to the tire-form in advance of the instant that the carriage is started to position the rollers in actual contact with the fabric. The rollers being preliminarily positioned by the pressure-fluid, the carriage (moving slowly) effects a gentle contacting of the rollers with the fabric, whereupon the pressure-fluid maintains them resiliently against the fabric during the fabric-pressing operation.

In order to insure this desirable order of operations of these mechanisms, I have, in the present embodiment, provided a safety device whereby the advancing movement of the carriage cannot be effected until after the rollers have been positioned by the pneumatic devices. To this end, an actuatable member 97 is disposed upon a fulcrum 98 which is sustained by the bracket 88ª mounted on the bottom-portion of the carriage-supporting frame 32, and which is provided with a nose 99 adapted to occupy the position shown in Fig. 9 when the clamp-nut is engaged with the feed-screw, but which is designed to be moved into a position between the two parts 59 of the clamping-nut 58. The member 97 is in mechanical effect a bell-crank-lever and is connected to a positioning-element 100 which is slotted to receive the stem of a screw 101 carried by an arm 102 on the valve-controlling shaft 92. When the valve is closed, the nose 99 will occupy a position between the parts of the clamping-nut; but it is adapted to be moved out of that position when the valve-controlling shaft 92 is rotated to open the valve. The clamping-nut is then free to be engaged with the feed-screw so that the carriage can be started on its advancing movement.

*Automatic air cut-off.*—As already described, the advancing movement of the carriage is arrested at a predetermined point in its travel. In the present embodiment, I also arrange for the automatic closing of the air-valve in predetermined relation to the stopping of the presser-supporting and positioning carriage, so that the air-supply to the pneumatic cylinders is thereby cut off, the escape-port 96 is opened, and the air from the cylinder is permitted to escape therethrough. Preferably, the parts are so related that the air-valve will be operated somewhat in advance of the automatic arresting of the advancing movement of the carriage. This is for the reason that it is desirable to cause the fabric-rollers to be moved away from the tire-form in advance of the return movement of the carriage because, as soon as the carriage has been stopped by the disengagement of the clamping-nut from the feed-screw, the carriage is, by the carriage-return motor 54, promptly returned to starting position. Were the pressing-rollers still in contact with the tire-form, such prompt return could not readily be accomplished and there would also be danger of the rollers injuring the fabric by being dragged over the same in a direction opposite to their normal pressing travel thereover.

This automatic closing of the air-valve is accomplished by the following mechanism: Fast on the valve-controlling shaft 92 is an arm 103, and to the upper end of this is pivoted an abutment-carrying-arm 104. On the end of this arm 104 is mounted a small roller 105 which rests upon an arm-positioning element 106 fast on the control-member positioning-shaft 67 adjacent the stop-device 66. As shown in Figs. 7, 8 and 10, the positioning element 106 is provided with an angular cam-surface 107, one portion (108) of which is farther removed from its axis—the shaft 67—than the portion 109. When the surface-portion 108 occupies a horizontal position, shown in Fig. 8, the arm 104 is maintained in a higher plane than when the surface-portion 109 occupies a horizontal position, shown in Fig. 7. The positioning-element 106 is, therefore, capable of being actuated to dispose one or the other of the surface-portions 108 and 109 so as to position the arm 104 at different heights. This arm 104 is provided with an abutment-portion 110, and the particular vertical position of the abutment-portion is determined by the position at which the arm 104 has been disposed by the positioning-element 106. This abutment is designed to be arranged in the path of certain engaging portions of the carriage and which, in this instance, are formed by two adjustable stop-screws 111 and 112 threaded into the forward portion of the carriage, as shown in Figs. 7 and 8. When the arm 104 is in its lower position, that shown in Fig. 7, the abutment-portion 110 will be engaged by the lower stop-screw 111. In this instance, the abutment-portion occupies a position below the path of movement of the stop-screw 112. When, however, the arm 104 is elevated, in the manner already explained, the abutment-portion 110 will thereby be disposed in a higher plane and, thus, in the path of travel of the upper stop-screw 112. By reason of the fact that this stop-screw 112 is arranged on the carriage in a position in advance of the stop-screw 111, the latter will not then reach an engaging position with the abutment 110. It will be noted that the surface-portions 108 and 109 are particularly related to the stop-arms 69 and 71 of the automatic carriage-stopping mechanism, in that the stop-arm 69 is arranged in position to be engaged by the abutment-portion of the control-lever 63 when the arm 104 is resting upon the surface 108 to position the abutment-portion 110 so as to be engaged by the stop-screw 112; and that the stop-arm 71 is disposed in position to be engaged by the abutment-portion 65 of the carriage-control-lever 63 when the arm 104 rests upon the surface 109 to permit the stop-screw 112 to engage the abutment-portion 110. In other words, these mechanisms are so related that the automatic cutting off of the air to the pneumatic devices will be effected in predetermined relation to the instant of the automatic disconnection of the clamping-nut from the feed-screw and, thus, to the automatic arrest of the advancing movement of the carriage. The roller 105 traverses the surfaces 108 and 109 as the element 106 is turned on the axis formed by the shaft 67 and thereby positioned to present one or another of these surfaces in active position.

By the mechanism described, the carriage is permitted to have a long and short travel; and, according to whether the carriage is making a long or a short movement, the cutting off of the air-supply to the pneumatic devices is delayed or advanced. But, in any event, this automatic cutting off of the air-supply is preferably effected in advance of the arrest of movement of the carriage, for the reasons already explained.

When the control-lever 68 is in the position shown in Fig. 4, the stop-arm 69 is in position to be engaged by the abutment-portion 65 of the carriage-control-lever 63 to arrest the carriage for its short travel. Likewise, the surface-portion 108 of the element 106 is in the horizontal position to cause the abutment-portion 110 of the arm 104 to be presented for engagement by the stop-screw 112, whereby the air is cut off automatically in predetermined relation to the arrest of the short travel of the carriage. When, however, the lever 68 is moved toward the left, Fig. 4, it effects a rotative movement of the shaft 67 and positions the carriage-stopping device 68 for the long-travel of the carriage so that the stop-arm 71 thereon will be in the path of travel of the carriage-controlling lever 63 to actuate it and cause arrest of the long travel of the carriage. Moreover, the air cut-off device 106 will simultaneously be operated to position the abutment-portion 110 so as to be engaged by the stop-screw 111, whereby the air is automatically cut off in predetermined relation to the arrest of the long travel of the carriage. The short travel of the carriage, with proportional operation of the fabric-pressing rollers, occurs where the pressing-rollers operate to roll the first layer or layers of fabric upon the tire-form. The long travel occurs after beads have been placed in proper position upon the fabric and the successive layers of fabric which overlie the beads are being pressed upon and over the same.

The stop-screws 70 and 72 on the carriage-stopping member 68 are threaded to permit a fine adjustment so that the instant of arrest of the carriage thereby may be somewhat varied. Likewise, the adjustable stop-screws 111 and 112, carried by the carriage and which abut against the portion 110 of the lever 104, are also threaded to permit fine adjustment for varying the instant of cutting off the air to the pneumatic devices.

*Presser-shifting mechanism.*—Hereinabove, I have described how the fabric-pressing members or fabric-rollers 74 are positioned in two different ways in operative relation to the tire-form; first and initially, by the pressure-devices in projecting or thrusting them forward and toward the form and then withdrawing them therefrom, and, secondly, by the carriage (during its advancing and receding movements) in disposing the pressing-members in and out of engagement with the form. In the present embodiment, I have provided additional means for effecting their further positioning at certain stages of the pressing operation; and this third method of positioning contemplates, first, the bodily shifting of the pressing-members along the surface of the form additional to any movement effected thereon by the pneumatic devices and, secondly, the changing of the degree of their angular relation in the form-surface and, thus, to each other: To this end, each of the pneumatic cylinders 80 is mounted on a bracket 113 which is provided with a downwardly-projecting pivot-stud 114 (Figs. 7, 17 and 18) adapted to turn in an auxiliary carriage or presser-sustaining cross-head 115. The stud 114 constitutes a vertical axis for the bracket 113 and, to facilitate its rotative movement, it is mounted in ball-bearings 116 in said crosshead. Each of the cross-heads is slidably mounted in guide-ways formed in the forward portions 117 of the brackets or trunnion-members 37. Each pivot-stud 114 carries a toothed wheel 118 which meshes with a rack 119 fixed to the adjacent wall of the bracket-portion 117. In consequence, when the cross-head 115 is shifted in its guideways, the wheel 118 and, therewith, the bracket 113, will be turned on the vertical axis, formed by the pivot-stud, to change the angle of the pressing-roller 74 relatively to the surface of the tire-form. To actuate the cross-heads and, thereby, the pressing-rollers, each cross-head is connected by an operating-rod 120—provided with a turnbuckle 121 to lengthen or shorten the same— to an arm 122 which is fast on a rock-shaft 123. This shaft is common to the two cross-head connecting rods and is journaled in bearings 124 upstanding from the brackets 37. When the shaft 123 is rocked counterclockwise, (Fig. 4) the cross-heads 115 will be shifted in their guide-ways away from the axis of the shaft. Such movement of the cross-heads in one direction bodily moves the bracket 113 and, thus, effects bodily movement of the pressing-members 74 radially along the surface of the tire-form. Moreover, this movement, as already explained, rotates the brackets on their vertical axes to turn the pressing-members so that their angular relation to the form is also changed. In other words, the bodily shifting movement of the brackets moves the pressing-members bodily along the surface of the fabric on the form—the pressing-members being resiliently held thereagainst by the pneumatic devices—and each is at the same time rotated on a vertical axis. The instant of movement of the cross-heads is predetermined, and is accurately controlled by instrumentalities presently to be explained.

For tires of different dimensions, means are provided, in the present embodiment, whereby the spaced relation of the pressing-rollers 74 may accurately be changed. This is conveniently accomplished by transversely adjusting the brackets or trunnion-members 37, and this operation positions the structures which support the pressing-rollers: Such adjustment is effected by a bracket-adjusting spindle 125 (Fig. 5), provided at its ends with right-hand and left-hand screw-threads extending into each of the brackets. To effect a rotative movement of the spindle, it is provided, centrally, with a nut-formation 126 with which may be engaged a wrench or other suitable implement. Below the brackets 37 is disposed a graduated plate 127, marked with the different size-dimensions of tires. The brackets 37 are provided with lugs 37$^a$ which are adapted to register with the graduations on the plate. By this means, the operator may accurately adjust the brackets to insure a proper spacing of the pressing-rollers 74 in relation to the tire-form.

The means above referred to for controlling the instant and extent of movement of the cross-heads 115 and thus, for controlling a certain portion of the movement of each of the pressing-rollers and their angular positioning, contemplates the following: The rock-shaft 123 which governs the angles of these pressing-rollers is held against turning during a portion of the advancing movement of the carriage 34, and then, during another portion of that movement, is caused to be rocked counterclockwise: To this end, a two-membered cam-bracket 128 is mounted on each side of the carriage-supporting frame adjacent the ends of the rock-shaft 123 (when it is in normal position), and consists of a stationary-portion or member 129 and an elongated pivoted portion or member 130 attached thereto. The stationary-member includes an overhanging-section 131, and this overlies a stationary-block 132 provided with a roller-engaging-surface 133. The pivoted cam-member 130 includes a relatively straight surface 134 and an inclined surface 135. A section of the top of the carriage 34, beyond the end of the block 132, is cut away to provide a clearance-space 136. Adjacent the free end of the pivoted member 130 and straddling the same is a bracket 137 mounted on the top of the carriage. Through the top of this bracket is threaded an adjusting-screw 138. The pivoted member 130 has an oscillating movement on its fulcrum and this movement is limited by the adjusting-screw 138. The extent of such movement can, by the screw, be varied, as will be readily understood, and in this way, the angle of the member 130— and, particularly, its inclined surface 135— may be changed. This oscillating movement may, at certain stages of the operation of the machine, be prevented: To this end, the pivoted member 130 carries a hook-element 139 adjustably mounted in the same. This hook-element is adapted to be engaged by the hooked-end 140 of a combined locking and cam-device or member 141. This device includes two members 142 and 143; it is fulcrumed at 144 on the side of the supporting-frame 32; and it is adapted to be actuated in the following manner: Fast on the shaft 67 and in the same vertical plane as the member 143 is a short arm 145 carrying a roller 146 adapted to engage the under surface 147 of the member 143.

When the parts are in the position shown in Fig. 13, the roller-carrying arm 145 occupies a substantially horizontal position and out of engagement with the locking device 141 which, by gravity, rocks on its fulcrum and into engaging position with the hook 139 carried by the cam-member 130. When, however, the shaft 67 is, by the controlling-lever 68, rocked in a clockwise direction, the roller-carrying arm 145 will thereby be positioned under the normally overlying member 143 and cause the locking-device to be rocked clockwise out of holding engagement with the hook 139 (Fig. 14). This, then, allows the cam-member 130 to rise and engage the adjusting-screw 138.

The cam-bracket, including the portions or members 130 and 131, in conjunction with the block 132, constitute a controlling-device for governing the rocking movement of the shaft 123.

Means carried by the rock-shaft and co-operating with this controlling-device are provided for governing the extent of turning movement of the shaft, and include pendant arms 148, there being one fast on each end of the rock-shaft and carrying at its lower end a roller 149. This roller is designed to move in a cam-way 150 formed between the roller-engaging surfaces of the block 132 and the under surface 131$^a$ of the cam-bracket. The roller has two different, predetermined lengths of travel, and these are governed by the position of the locking-device or cam-member 141 and the cam-member 130. There is a set of these parts on each side of the carriage; hence, it will be understood that in the following description both sets are referred to.

If the locking-device 141 is in the position indicated in Fig. 13, and, thus, in locking engagement with the cam-member 130 so that the latter can have no elevating movement, the roller 149 will, when the carriage begins its advancing movement, roll along the inclined surface 135 of the member 130 and initiate a rocking of the shaft 123, resulting in a counterclockwise movement of the arm 122, and a thrusting movement of the connecting-rod 120 which transmits such motion to the connected cross-head and shifts the latter and, in turn, effects a bodily shifting of the pressing-roll along the fabric-covered parts of the tire-form. It will be understood, therefore, that as the roller tracks on the surface 135, rocking of the shaft 123 and proportional actuation of the train of parts between it and the pressing-roller are effected, so that the latter will have been shifted to a degree of angularity determined by the extent of rocking of the shaft 123: This is indicated by the dotted-line position of the arm 122, rock-shaft 123, etc., in Fig. 13. After the roller leaves the surface 135 and tracks on the surface 134, there is no rocking of the shaft 123 and, hence, no angular change of the pressing-rollers. If it be desired to effect an angular positioning of the pressing-rollers while the roller 149 is traversing the surface 134, this can be effected by changing the adjustment of the hook-element 139. This may, for the purpose of identification herein, be termed the "under-bead operation."

If the locking-device be in the position illustrated in Fig. 14, the cam-member 130 is free to move on its fulcrum and have its forward end elevated, as shown in dotted lines in said figure. Therefore, as the roller 149 moves in the cam-way 150, it will engage the inclined surface 135 of the cam-member 130 and tend to rock it upwardly on its fulcrum so that the surface 135 will be raised from the position shown in full lines in Fig. 14, to one to give the required inclination, as controlled by the screw 138, as shown in dotted lines therein. The roller 149 will traverse the surface 135 and engage an abutment or cam-surface 151 of the locking-device 141 upon which it will ride downwardly into the clearance-space 136 and, at the same time, cause the arm 148 to be rocked from the inclined position shown in full lines at the right of Fig. 14 to the substantially vertical position shown in dotted lines about centrally of the figure. This results in a rocking of the shaft 123 with consequent forward thrust of the rod 120. This shifts the cross-heads 115 and, as a result, effects both a bodily shifting movement and a rotative movement (on vertical axes) of the pressing-rollers 74.

The relative normal position of the rock-shaft 123, the vertical axis of each pressing roller, and the position of the end of the actuating-rod 120 are indicated by the dot-and-dash lines connected by brace A, Figs. 14 and 16.

During the movement of the carriage. the distance indicated by the dot-and-dash lines connected by the brace B (in Fig. 14), and which indicates the second stage of movement of the rock-shaft 123 and the arm 122—and during which the roller 149 will have impinged against the abutment-surface 151 of the locking-device 141, and the cam-member 130 will have been elevated against the adjusting screw 138—the cross-head 115 will have been shifted the indicated relative distance between the dot-and-dash lines connected by the brace B (in Fig. 16), and the pressing-rollers will have been rotated from the angle indicated by the dot-and-dash line X (Fig. 16) to the angle indicated by the dot-and-dash line Y (same figure), and which is somewhat inclined to the line X. In the next stage of movement of the parts, the roller 149 will have ridden down the abutment-surface 151 of the locking-device 141 and effected a quick movement of the cross-head which is transmitted to the fabric-roller. The relative positioning of the rock-shaft 123 and the cross-head 115, as indicated by the dot-and-dash lines connected by the brace C (Fig. 14), will have resulted in a relative movement thereof equal to that indicated by the dot-and-dash lines connected by the brace C in Fig. 16, and with the result that each pressing-member will have been shifted bodily along the surface of the fabric-covered tire-form to that extent and, also, will have been rotated on its vertical axis to an angle indicated by the dot-and-dash line Z, Fig. 16. That is to say, each pressing-roller will have been bodily shifted, (after it had engaged the fabric-covered surface of the form) a distance equal to that between the right-hand dot-and-dash line (Fig. 16) and the left-hand dot-and-dash line in said figure. During this bodily movement, the rollers will have been shifted from an angular position indicated by the line X to that indicated by the line Z. During these movements, the pressing-rollers will have traversed the surface of the fabric up to the bead, then out and over the fabric-covered bead, and then along a small portion of the core beyond the bead to insure a complete rolling of the fabric down to the "toe" of the bead. The accelerated motion of the parts effected by the roller 149 when it engages the abutment 151 occurs while the fabric-roller is traveling over the bead. This may, for the purpose of identification herein, be termed the "over-bead operation".

It is to be understood that, in a large measure, the cam-surface 135 determines the angle of movement of the pressing-rollers. Hence, when the member 130 is locked against movement caused by the roller 149 engaging said surface, it will, by reason of the fact that it is then somewhat inclined to the horizontal, operate to force the roller downwardly to some extent and this will result in each pressing-roller being bodily shifted and also rotated on its vertical axis to a corresponding extent. By adjusting the screw 138 and, thus, changing the angle which the cam-member 130 must assume, a corresponding change is effected on the bodily and angular movements of the pressing-member. The surface 133 of the block 132 guides the roller 149 and thereby controls the initial angle of the fabric-roller relatively to the fabric-covered core.

It will, of course, be understood that the roller 149 will—due to the advancing movement of the carriage and the fact that this roller is supported thereon while the bracket 128 is mounted on the supporting-frame 32—be traveling in the first portion of the cam-way 150 during the initial movement of the carriage.

The cam-way 150 thus presents a substantially horizontal portion—which operates to prevent more than a slight turning of the rock-shaft 123 (and, thus, movement of the parts connected therewith) during one stage of travel of the carriage 34—and beyond it is a vertical cam-way—formed by the surface 151 of the locking-member 141—which permits the roller to descend to effect a rocking of the shaft during another stage of the carriage's travel. When the parts are in the position illustrated in Fig. 13, the travel will be in only what I have just referred to as the horizontal portion of the cam-way during the advancing movement of the carriage for one operation. By reason of the slight inclination of the surface 135, the roller will be slightly forced downward, and this will effect a corresponding rocking of the shaft 123 with consequent shifting of the cross-heads to effect a similar angular positioning of the presser-rollers relatively to the tire-form. This is for the "under-bead" operation. When, however, the parts are in the position illustrated in Fig. 14, the roller 149 will traverse not only the so-called horizontal portion of the cam-way 150, but, when it reaches and impinges against the abutment and cam-surface 151, it will be depressed and effect a more substantial rocking of the shaft 123 with consequent actuation of the cross-heads and a corresponding angular adjustment of the pressing-rollers. It will, of course, be understood that during this last-described operation—which is the "over-bead" operation—the carriage is permitted to have a long travel before its movement is automatically arrested; hence, the rocking of the shaft is pronounced so that, when the pressing-rollers have reached the limit of their fabric-traversing movement, their position will then be relatively remote from their starting point; and, moreover, they will have been rotated about their vertical axes at a substantial angle to their original position. Hence, during the operation of the machine, as the carriage travels a predetermined distance before its movement is arrested, the rock-shaft controlling-roller 149 will have traversed the horizontal cam-way and, also, the vertical cam-way formed by the abutment-surface 151. It is to be understood that these distances of travel and extents of angle may be varied, as may be desired.

For straight-side tires, when it is not desired to have the fabric-rollers go around the bead, it would not be necesary to pivot the cam-member 130 for movement, since in this instance, the fabric-roller could stop at the peak of the bead. The same effect is accomplished in the present embodiment by locking the member 130 against movement and removing the abutment-surface 151.

In the present embodiment, I have provided for changing the initial starting position of the carriage. This may be desirable for different reasons. In any event, it may become necessary to change the initial starting position of the roller 149 in the cam-way 150 in order that it may have a longer travel therein before its movement is affected to produce a change in the angular relation of the fabric-rollers to the tire-form. One means of accomplishing this result is to make the bumpers 73 adjustable so that, when the carriage impinges thereagainst, its position may be predetermined by this bumper according to its adjustment. As shown in Fig. 15, for instance, the adjusting of the bumper, to permit the carriage to move farther away from the tire-form, will result in positioning the roller 149 farther back in its cam-way 150, as shown in dotted lines in said Fig. 15. In this way, a longer portion of the surface 131ª of the cam-member 131 will be traversed by the roller 149 as it moves forward toward the tire-form, so that it will not engage and be influenced in its movement by the surface 135 of the cam-member 130 quite as soon as shown, for instance, in Figs. 13 and 14. As a result, the fabric-rollers will traverse the surface of the tire-form to a greater extent without angular change; and in some forms of tires this may be desirable. Substantially the same result may be accomplished, without disturbing the relative length of receding movement of the carriage in reference to the tire-form, by adjusting each cam-member 131 longitudinally on the carriage-supporting frame 32; and, to this end, it is adjustably mounted thereon.

From the foregoing, it will be seen that the cam-brackets 128, etc., constitute a simple but very efficient device for controlling the angular positioning of the fabric-rollers in relation to the tire-form; and, moreover, that they are capable of a nicety of adjustment, both great and small, whereby the machine may readily be adapted to operate for widely different shapes of tire-carcasses.

Should it be necessary or desired to change the initial angle of the fabric-rollers, this may be accomplished, in one way, by actuating the turn-buckles 121.

It will, of course, be obvious that the automatic returning of the carriage to starting position, after it has been released from the feed-screw, will effect an automatic return of the various parts which it actuates to their normal positions. In other words, as soon as the clamp-nut is disengaged from the feed-screw, the carriage return-mechanism effects a receding movement of the carriage. This results in the shaft-controlling roller 149 retraversing the cam-ways, etc., already described, and the rocking of the shaft 123 clockwise. This causes the cross-heads to be retracted and, in consequence, the presser-sustaining brackets 143 are bodily reshifted to normal position and, at the same time, rotated on their axes 114. This operation restores the pressing-rollers to normal position in respect to their angular and other relations to the tire-form.

*Bead-placing mechanism.*—I have, in the foregoing, described the mechanisms and instrumentalities employed for forming the initial layer or layers of fabric upon the tire-form, and I have described, somewhat, the operations of folding the successive layer or layers of fabric over the beads. In the present embodiment, I have included mechanism for placing the beads, and this I will now describe: Mounted on the rear wall of the carriage-supporting frame 32 are brackets 153 in which is journaled a shaft 154 rotated by means, presently to be described, for positioning certain parts mounted thereon. Fast on the shaft are brackets 155 each formed with an outstanding arm 156. Secured upon this arm is a standard 157. Pivoted on the free end of the standard is a bifurcated arm 158 which carries a bead-placing roller 159. To the stub-shaft 160 on which the roller 159 is mounted is connected a spring 161 which is also attached to a boss 162 formed on the standard. The bifurcated arm 158 abuts against a portion 163 of the standard and is maintained thereagainst by the spring 161 which is arranged in vertical alinement with the axis 160 of the roller 159, as viewed in Fig. 25. The parts are, thus, so disposed and the action of the spring 161 is such that each roller 159 may effectually be maintained in the position indicated in said Fig. 25. In this instance, the two rollers 159 are in spaced relation. They occupy this relation, however, only while placing the beads B upon the fabric-covered core. After they have performed their function, they may be shifted into an inactive position, indicated by dotted lines at the left of Fig. 25.

These bead-placing devices, at opposite sides of the tire-core, occupy the vertical position, indicated in Figs. 5, 7 and 25, only while the beads are being placed upon the fabric-covered core. Normally, they occupy an inactive position remote from the tire-core, as indicated in Fig. 4. To facilitate the positioning of these bead-placing devices, means are provided, first, for elevating them to their active position, as shown in Fig. 7, for instance, and for returning them to their inactive position, as shown in Fig. 4. The elevating means includes the following instrumentalities: On the left-hand end of the shaft 154 is keyed a grooved roller or wheel 164 to which is attached a flexible weight-carrier 165, at the lower end of which is attached an eye-piece 166. Upon this is mounted a weight 167. Pivotally attached to the lower end of the piece 166 is a foot-lever 168 fulcrumed at 169 on a bracket 170 attached to the side of the supporting-frame 32. To an extension 171 of the foot-lever, one end of a shock-absorbing spring 172 is attached, the other end thereof being secured, as at 173, to the side of the supporting-frame 32. It will be understood that, when the operator depresses the lever 168, it will effect a rotative movement of the grooved wheel 164 and thereby elevate the bead-placing devices into a substantially vertical position. In this operation, the weight 167 acts as a motor to aid in rotating the grooved wheel. During this operation also, the tension of the spring 172 is relieved.

The means just described permit the bead-placing devices to be elevated into an active position, while the weight of the devices will, when they are released, by means now to be described, automatically return the devices to their inactive position. Such releasing means includes a holding-element 174 fulcrumed at 175 and comprising two integral arms 176 and 177, the latter being provided with an angular extension 178. This angular extension is adapted to engage in recesses or incuts 179 and 180 in the grooved wheel 164. As shown in Fig. 4, this extension occupies a position in the recess 179 and serves to hold the bead-placing structure in the position illustrated. When the foot-lever 168 is depressed to raise the structure to its active position, the holding-element 174 is rocked on its fulcrum, and the extension 178 rides along the inclined surface 181 of the recess 179 on the periphery of the grooved wheel 164 until it drops into the recess 180, and in which position it will hold the bead-placing structure in its elevated, active position.

In order to permit the bead-placing structure to return to normal position, means are provided for automatically releasing the same: To this end, the arm 176 of the holding-element carries a headed screw 182 intermediate of its ends and occupying a position in the path of movement of the roller-carrying arm 145: In consequence, when the shaft 67 is rotated by the control-lever 68 to position the carriage-stop and air cut-off mechanisms in position to perform their automatic-arresting operations for the over-bead operation, already described, the roller on the arm 145 will engage the abutment-head 182 on the arm 176 and rock the holding-element 174 so as to displace the extension 178 from the recess 180, the grooved roller 164 with the shaft 154 and the bead-placing devices then beginning their return movement to inactive position. The outer end of the arm 176 has attached to it a spring 183 which tends normally to rock the holding-element 174 clockwise; hence, it will cause the extension 178 to enter the recesses 179 and 180 as soon as the grooved roller has rotated to position either of said recesses opposite the extension.

It will now be seen that there is a co-operation between the means for positioning the aforementioned arresting mechanisms and the means for returning the bead-placing devices to inactive position: This is to facilitate the operation, and also to insure the disposition of the bead-placing devices out of active position after the beads have been properly positioned upon the fabric-covered core, and before the succeeding operation of forming the successive layer or layers of fabric over the beads.

By this bead-placing mechanism, the beads may be accurately and quickly placed in position, with the result that a uniform product, in this respect as well as in other respects, is insured.

It will have been noted that the shaft 67 is an instrumentality having a plurality of important functions; first, it positions the carriage-stop-member 68 for the short or long travel of the carriage; secondly, it similarly positions the air-cut-off member 106; thirdly, it actuates the locking-device 141; and fourthly, it effects a release of the bead-placing structure so that it may drop to an inactive position.

*Trimming mechanism.*—After the different layers of tire-fabric have, by the means described, been formed on the tire-form, certain finishing operations are then in order. These contemplate the trimming of the rough edges of the layers of fabric after they have been rolled or shaped around the form, and, in the present embodiment, include the following structure: Pivoted on the standard 157, forming a part of the bead-placing devices, is a knife-holder 184. This comprises a body-portion 185 and an angular portion 186 upon which is secured a grooved element 187 in which a knife K, of appropriate form and construction, is adapted to be sustained, as shown in Fig. 26. Each of these knife-holders has an active and an inactive position. The inactive position is that shown in Figs. 4 and 7, in which instance, the holder is laid back against the standard 157. When in the active position, illustrated in Fig. 26, the bead-placing rollers 159 are moved into the position illustrated therein and the knife-holders are positioned as shown, namely, in juxtaposition to the sides of the tire-form. By means of these, the knife may be held steady and manipulated by the operator to trim the edges of the fabric, beyond the beads, evenly and at the desired line.

*General operation.*—The following explanation will suffice to make clear the operation of the various mechanisms and devices of the machine and the order in which they occur:

In Figs. 20, 21 and 22, the manner in which the different layers or plies of fabric and the beads are placed upon the form, and also some of the different positions which the fabric-rollers 74 assume during the rolling operations, are shown diagrammatically:

In the usual manner, cement is first applied to the tire-form, whereupon a strip of fabric (which is to form the innermost layer or ply and as supplied from the stock-supporting structure, already described) is stretched around the form so that its sides project away from the form, as indicated at $a$, Fig. 20. While the fabric is thus being applied to the form, the latter is rotated at comparatively slow speed by the driving-mechanism.

The layer having thus been applied, the form is then clutched to the high-speed drive-shaft whereby the form is rotated at a higher rate of speed.

The carriage arresting-mechanism and the automatic air cut-off mechanism being in position for the under-bead operation—during which the carriage makes its short travel—the air-valve controlling-lever 93 is then operated to open the air-valve and permit pressure-fluid to be supplied to the pneumatic devices which, in turn, project the fabric-rolls 74 toward but not entirely in contact with the fabric-covered tire-form.

The carriage-controlling lever 63 is then operated to connect the clamping-nut 58 to the feed-screw 40, whereupon the carriage 35 begins its advancing movement and, during the initial part of such movement, positions the pressing-rollers 74 into contact with the fabric-covered tire-form, with which they are thereafter resiliently maintained during the subsequent operation of pressing the fabric upon the form. The carriage continues its advancing movement until the valve-closing stop-nut 111 on the carriage engages the abutment-portion 110 of the arm 104, whereupon, by the continued movement of the carriage, this arm is pressed forward and thereby rocks the shaft 92 to close the air-valve against further passage of the fluid to the pneumatic devices and to open the port 96 therein to permit escape of the pressure-fluid from the pneumatic devices, whereupon the pressing-rollers, under the action of the presser-returning springs 86, are retracted and, thus, positioned out of contact with, and away from, the fabric-covered core. This operation being completed, and the carriage still continuing its advancing movement, the abutment-portion 65 of the carriage control-lever 63 engages the stop-arm 69, as shown in Fig. 10, to effect disengagement of the clamping-nut from the feed-screw, whereupon the carriage stops and, being thus released from the feed-screw, is automatically returned to normal position by the weight-motor 54, such return movement being arrested by the carriage engaging the buffer 73. The initial portion of the advancing movement of the carriage will, as already described, position the fabric-rollers in contact with the fabric-covered form as indicated at $b$, Fig. 21. As the carriage advances toward the tire-form, the so-called horizontal portion of the cam-way 150 prevents rocking of the shaft 123 to any material extent, so that the cross-heads are not thereby actuated; hence, the relative angularity of the fabric-rollers will not have been changed while they are moving from the position indicated at $b$, Fig. 21, to the position indicated at $c$ therein, but the constant air-pressure within the cylinders 80 causes the rollers to exert a uniform but resilient cushion-pressure against the fabric and, following the contour of the rotating form, rolls the projecting sides of the fabric down upon the form until the fabric-rollers reach the position indicated at $d$, Fig. 21, whereupon the air-supply to the pressure-devices is automatically cut off and, succeeding this, the advancing movement of the carriage 34 is automatically arrested. During the advancing movement of the carriage, and while the fabric-rollers are moving from the point indicated at $c$ to the point indicated at $d$, Fig. 21, the rock-shaft 123, arm 148, and cross-head 113 will have been actuated to the position indicated in dotted lines, Fig. 13, and which actuation will have resulted in the fabric-rollers being bodily shifted and rotated on their vertical axes so that they will assume the angular position indicated at $d$, Fig. 21. In passing from the $c$-position to the $d$-position, the angular surfaces 75 of the fabric-rollers will have been effective in positioning the fabric preliminary to its being pressed by the engaging peripheries of the rollers. These angular surfaces 75 are, however, more effective in a later stage of the operation. During the return movement of the carriage, as accomplished by the weight-motor 54, the presser-positioning instrumentalities are automatically returned to normal position, as already explained.

In operating upon tire-forms of some designs, it may not be necessary or desirable to effect a change of angularity of the fabric-rollers with respect to the form between the $b$-position and the $c$-position of the rollers, as indicated in Fig. 21; but, for a different shape of form, for instance, it may some times be desirable to effect a change of angularity between these two points. This is accomplished by adjusting the hook-member 139 carried by the cam-member 130: This will either raise or lower the effective surface 135 of the member 130, as the case may be. When given a more substantial downward inclination than is indicated in Fig. 13, for instance, a more decided rocking of the shaft 123 will be effected and, in consequence, a proportional change in the angular relation of the fabric-rollers to the tire-form will be accomplished. It will be understood that any such adjustment made in connection with the member 139 in no way affects any previously-made adjustment for the over-bead operation, since such adjustment is effected by independent means which includes the adjusting-screw 138; hence, for the under-bead and over-bead operations, the degree of angularity may be varied, for one, without affecting the other.

The operation thus far described may be repeated as successive layers of fabric are rolled down upon the form and until the desired initial number thereof have been applied. As usual, these successive layers or plies of fabric will have been treated in the customary manner to render them sticky or tacky so that they will adhere together and to the beads B when they are formed or rolled upon the fabric-covered form.

The beads are then placed, in any suitable manner, upon the outermost of the previously-applied layer of fabric, as shown in Fig. 5, whereupon the bead-placing devices are, by the elevating means already described, raised into proper operative juxtaposition to the beads so that the grooves of the rollers 159 will engage the beads. The core-drive is then again set in operation and the rollers 159 will press the beads upon the fabric-covered form and position them accurately and firmly, it being understood that the sticky or tacky condition of the surface will cause the beads to adhere thereto.

The next operation is successively to place an additional strip, or additional strips, of fabric upon those first placed upon the form and also over the beads B, as indicated in Fig. 22. Before starting this operation, however, the control-lever 68 is operated to position the carriage-arresting mechanism for the long travel, and so that the abutment-portion 110 of the arm 104 will be raised into the path to be engaged by the long-travel valve-operating stop 111, and the arm 71 of the carriage-arresting member 66 is positioned to engage the abutment-portion 65 of the carriage-control-lever 63. In thus positioning the automatic valve-operating and carriage-arresting mechanisms, the roller-carrying arm 175 will have engaged the headed-screw 182 and rocked the holding-member 174 so as to disengage it from the grooved wheel 164 to release the same and permit the bead-placing structure to drop, by gravity, into its inactive position. The roller-carrying arm 175, continuing its arc of movement, will also actuate the locking-device 141 so as to disengage it from the hook 139 on the cam member 130, as shown in Fig. 14. The shaft 123 is then free to have a pronounced rocking movement so that it and the cross-heads will have been actuated, as already described, to the extent indicated by brace C, Fig. 14, during the advancing movement of the carriage. Succeeding the operation of the control-lever 68, as just described, the air-valve-lever 93 is again operated to open the valve and permit the fabric-rollers 74 to be projected into a position preliminary to their engagement with the fabric-covered core. Then the carriage-control-lever 63 is again operated to connect the clamping-nut to the carriage feed-screw, whereupon the carriage begins its second advancing movement for the over-bead operation. In this instance, while the rollers 149 at each side of the machine are traveling in the cam-ways 150—during which the rock-shaft 123 will have been given a slight rocking movement, since the rollers 149 traverse the cam-surfaces 135 of the cam-member 130 which had, by the roller, been raised to the dotted-line-position shown in Fig. 14—the fabric-rollers 74 will have changed their initial angular position, and have been moved by the carriage along the surface of the tire-form, from the position indicated at $e$, Fig. 22, to the position indicated at $f$ therein, and at which point it will be opposite the surfaces $B^1$ of the bead B. The carriage still continues its advancing movement and this causes the rollers 149 to engage and traverse the abutment-surfaces 151 on the locking-devices 141, and whereby the rock-shaft and its connected parts will be actuated into the position indicated by brace C, Figs. 14 and 16. During this operation, the fabric-rollers will have been bodily shifted and their angular position changed; first to the position indicated at $g$, Fig. 22, and, finally, to the position indicated at $h$ therein, the $h$-position of the fabric-rollers then corresponding with the brace C position indicated in Figs. 14 and 16, and in which the line Z indicates the relative angular position of the fabric-roller to the tire-form, and which corresponds to the $h$-position indicated for the fabric-roller in Fig. 22. In other words, the initial, $e$-position of the fabric-roller, indicated in Fig. 22, corresponds to the line X-position, Fig. 14; the succeeding $g$-position of the fabric-roller, as indicated in Fig. 22, corresponds to the line Y-position, Fig. 14; and, as already stated, the final, $h$-position of the fabric-roller, as indicated in Fig. 22, corresponds to the line Z-position, Fig. 14.

As soon as the rollers reach the $h$-position, aforementioned, the air-valve operating-stop 111 engages the abutment 110 and, by pushing the arm 104 forward, effects the closing of the valve, cuts off supply of the pressure-fluid to the pneumatic devices, permits exhaust therefrom, and allows the fabric-rollers, under the action of the springs 86, to return to initial position.

Then, the long-travel carriage-stop 71 engages the abutment-portion 65 of the carriage-control-lever 63 to disengage the clamp-nut from the feed-screw and arrest the advancing movement of the carriage which, then being released, is automatically returned to normal position by the carriage-return motor 54, and during such return, the presser-positioning devices are returned to their normal positions.

While these movements of the fabric-rollers 74 are being effected, they are, of course, maintained against the fabric by the air-pressure in the cylinders 80 and are thereby similarly maintained while following the contour of the beads so that they may also roll or shape the fabric over these beads.

While the fabric-rollers are pressing the fabric around the beads, the fabric has a tendency to fold back onto the roller. By providing the angular fabric-folding surface 75 on each roller, this will tend to position this portion of the fabric in advance of the engagement therewith of the effective forming peripheries of the rollers.

The fabric-rollers are actuated radially with reference to the tire-form by the pneumatic-devices; they swing on an axis to change their angular relation to the core; they are shifted bodily to change their engaging position by the cross-heads and rock-shaft; and they position and apply the fabric over the bead.

These operations are continued until the desired number of layers or plies of fabric have been applied over as well as under the beads.

After the final layer of fabric has been applied, the bead-placing structure is again elevated into the position shown in Fig. 7— the bead-engaging rollers 159 being displaced away from the form—and the knife-holders 185 positioned in proximity to the surface of the fabric-covered tire-form, after which the knife or other cutting instrument K is positioned on the holder. The core-drive is then set in motion, and the knife is manipulated by the operator so that its cutting edge will sever the rough edges of the fabric. Then the knife-holders are thrown back and the bead-placing structure released to drop by gravity back into its inactive position. By reason of the fact that it will have attained some momentum and, thus, would ordinarily jar the parts, the spring 172, attached to the end of the foot-lever 168, is utilized to absorb such jar and shock.

The "carcass" is then complete and the form may be removed from the machine.

Different sizes of tire-forms or cores may obviously be applied to the core-support, already described, for the production of "carcasses" of different sizes. The various parts of the machine may then be adjusted so that the operations hereinbefore described may take place with respect thereto. By the adjusting spindle 121, the brackets 37 and, thus, the cross-heads and fabric-rollers 74 may be adjusted relatively, as already explained.

As hereinbefore explained, the bracket 31 is preferably made adjustable in relation to the tire-form or core: This adjustment is made for different diameters of tires and, as already described, is effected by the adjusting-shaft 31ᵃ. In order that such adjustment may be accurately accomplished by the operator, a graduated-plate 188 is mounted at the side of the base 1 and, as shown, is provided with a plurality of groups of tire-dimensions 189. Adapted to register with a graduation of each group is a series of pointers 190 carried by the bracket 31:

It will be understood that when the bracket is shifted, the pointers will thereby be moved in relation to the graduated plate and so that a particular pointer may be caused to register with the graduation indicating the selected dimension of the tire for which the "carcass" is to be made. These dimensions preferably bear a definite relation to the point at which the change of angular relation of the manipulating-devices to the tire-core (when passing over the bead) is effected.

Modifications.

*Carriage return mechanism.*—I have hereinbefore described one form of power-actuated mechanism for effecting the receding movement of the carriage after being automatically released at the end of its advancing movement: This includes a motor in the form of weights 54 suitably connected to the carriage 34. Another effective form of mechanism which I may utilize is a motor, in the form of a spring as shown in Fig. 29: This includes, preferably, two flexible elements or cables 191—only one appearing in the drawing—suitably attached to the rear of the carriage and passing over sheaves or rollers 192 and 193. The other end of each of these elements is connected to a spring 194 suitably attached to a portion of the bracket 31: It will be understood that as the carriage makes its advancing movement, the springs will be tensioned so that, when the carriage is released, the springs will (as a power-operating means or pressure-device) automatically return the carriage to starting position.

In lieu of either of these forms of power-operating mechanism for effecting the receding movement of the carriage, I may employ means which, by being mechanically connected to a portion of the mechanism which effects the advancing movement of the carriage, will cause it to effect a receding movement thereof:

As shown in Figs. 30 to 32, this modification of carriage-actuating-mechanism contemplates the mounting on the longitudinal shaft 47 of a bevel-gear 195, opposite the bevel-gear 46, and movable on the shaft so as alternately to be shifted into mesh with the bevel-gear 45 on the transverse shaft 44. In this instance, the gear 46 is also slidable upon the shaft 47 so that it may be disengaged from the gear 45 when the gear 195 is engaged therewith. Any suitable means for shifting the gears 46 and 195 may be utilized. In this instance, the same is illustrated, by way of example, as comprising a sleeve 196 which encompasses the shaft 47, is feathered thereon, and connects the gears 46 and 195. A hub 197 of the gear 46 is provided with a groove 198 in which works a yoke 199. To the latter is attached a shifter 200 fulcrumed at one end, at 201, on the supporting-frame 32. Pivotally connected to its opposite end is an operating arm 202 which, in turn, is supported at its forward end in a bracket 203. Also pivotally connected to the shifter 200 and paralleling the operating-arm 202 in an actuating-arm 204. Pivoted to this arm is a bell-crank-lever 205 fulcrumed, at 206, on a collar 207 secured to the carriage-supporting frame 32. This bell-crank-lever is provided with a hook 208 adapted to engage a stud 209 that is carried by a collar 210 slidable on a hub 211 of the collar 207 adapted to engage a hub 212 of the gear 195. Interposed between the collars 207 and 209 and encircling the hub 211 is a spring 213.

In this instance, I may employ a solid nut (not shown) instead of the clamp-nut 58 for connecting the carriage to the feed-screw 40, and dispense with the carriage-controlling-lever 63. When it is desired to start the carriage for its advancing movement, the operator moves the operating-arm 202 longitudinally, and this actuates the shifter 200 to engage the gear 46 with the gear 45. The carriage is then effectively connected to the carriage-driving-mechanism and will move forward until its forward end engages an extension 200ᵃ on the shifter 200 which is thereby swung on its fulcrum 201 to disengage the gear 46 from the gear 45. In this way, the advancing movement of the carriage is accomplished and, then, automatically arrested. The movement of the shifter 200, in the manner just described, causes the actuating-arm 204 to disengage the bell-crank-lever 205 from the stud 209, whereupon the spring 213 becomes active to move the gear 195 into mesh with the gear 45. This will then rotate in the reverse direction and, through the train of instrumentalities connecting it to the carriage-feeding screw, effect a reverse rotation thereof and cause the carriage to be returned to starting position. In order to effect an automatic arresting of the receding movement of the carriage, as thus produced, the latter carries a lug 214 which engages a handle 215 upstanding from the operating-arm 202. Thereby, the operating-arm 202 is moved in the direction of the receding travel of the carriage and swings the shifter 200 on its fulcrum. This disengages the gear 195 from the gear 45 and positions the connected gears 46 and 195 in a position neutral to the gear 45. When the operator moves the arm 202 to start the parts in operation, the swinging of the bell-crank-lever upon its fulcrum effects its engagement with the stud 209, which action compresses the spring 213 so that, when the collar 210 is subsequently released from the engagement with the bell-crank-lever, the spring will become active to position the gear 195 in engagement with the gear 45. In this way, the receding movement of the carriage is accomplished and, then, automatically arrested.

Figure 34:
Figure 34 is a view of a detail thereof.

*Path changing device.*—It is a feature of my invention, though not an essential one, that the fabric-manipulating rollers shall, upon the successive layers of fabric, travel the same circumferential paths. In consequence, the line of pressure of each roller is, generally speaking, practically the same for each succeeding path; that is to say, the pressure, as it is imposed upon the layer being pressed, is directed through the underlying layers along the same line. In some instances, however, I may find it advantageous to change this line of pressure so that, upon each succeeding layer of fabric, it will be different from that which prevailed during the rolling on the previous layer or layers. Various means for accomplishing this change may be utilized. As an example, I may arrange to shift the initial point of engagement of each of the fabric-rollers with the fabric of the second layer, say, so that each path of travel thereon will be intermediate of those previously traveled by the roller on the underlying layer. Such shifting of the initial point of engagement may be effected, for instance, by changing the relative position of the feed-screw 40, whereby the carriage (when it begins its advancing movement) will position the fabric-rollers into engagement with the fabric to be rolled at points intermediate of the paths previously traveled by the rollers on the underlying fabric. Then, by repositioning the feed-screw for the third layer, the paths would practically aline with those on the first layer but be out of alinement with those on the second layer. In this way, the fabric-manipulating devices will constantly press upon portions of the layers of fabric which had previously been untouched. Such longitudinal shifting of the feed-screw may be accomplished by mounting it for a sliding movement in its bearings and feathering the gear 42 thereon. As shown in Figs. 33 and 34, I have provided means for effecting such shifting both manually and automatically: To this end, the forward end of the feed-screw carries a collar 216, and, in a groove therein is disposed a roller-carrying stud 217. The stud is carried by a bell-crank-lever 218 which is fulcrumed on a bracket 219 mounted on the carriage-supporting frame. Adjacent to the bracket 219 is a second bracket 220, and upon this is rotatably mounted a pinion 221 with which meshes a gear 222 also rotatably mounted on the bracket 220. The lever 218 is attached eccentrically to the pinion 221. The gear 222 carries a series of studs 223. These are adapted to be engaged by a latching-device 224 adjustably mounted on the end of the carriage. As the carriage moves backward during its receding movement, the latching-device 224 will engage with that stud on the gear 222 which is in its path, and, as the carriage continues its receding movement, it will effect a rotative movement of the gear and cause rotation of the pinion 221. This will rock the bell-crank-lever 218 on its fulcrum and move the collar 216 and thereby shift the feed-screw longitudinally. Thus, means for automatically positioning the feed-screw by the carriage is provided so that as it returns to starting position it will shift the feed-screw longitudinally and, during the next succeeding receding movement, return the feed-screw to normal position. In other words, during each alternate returning movement of the carriage, the feed-screw will be shifted and, then, reshifted. If it be desired to effect a manual shifting of the feed-screw, this may be accomplished by a hand-lever 225 which is pivoted on a stub-shaft 226 of the gear 222 and adapted to be moved by the operator so as to engage one or another of the studs 223. In this way, the gear, the pinion 221, and the parts operated thereby may be moved (in the manner already explained for the automatic operation) for manually shifting the feed-screw. The gear and pinion are so proportioned and the series of studs 223 are so spaced on the gear that the pinion 221 will be given a half revolution at each actuating movement of the gear by the carriage. If, however, it be desired to effect a finer adjustment of the feed-screw so that the fabric-rollers will, in traversing the outermost layer, be caused to travel a plurality of paths intermediate of the paths on the preceding layer, the proportions of the gear and pinion and the spacing of the studs thereon, etc., can be changed to produce this result.

Figure 35:
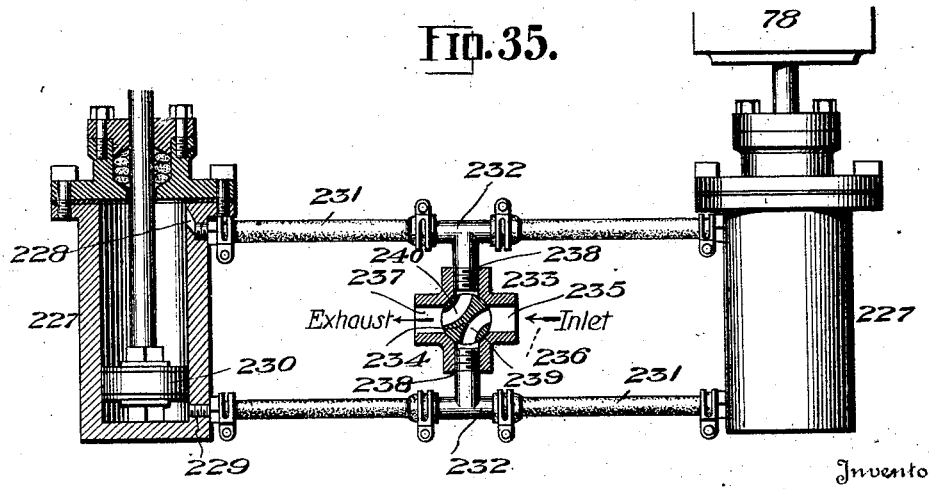
Figure 35 is a view in elevation, partly in section, of a modified form of pressure-operated device for the fabric-manipulating devices.

*Double acting pneumatic device.*—In the embodiment hereinbefore described, by way of example, the presser-rollers are adapted to be projected in one direction by fluid-pressure-devices and returned by spring-pressure-devices. As a modification of this form of structure, I may arrange to project and return the pressing-rollers by fluid-pressure-devices only, and, thus, dispense with the spring-pressure-devices. To this end and as shown in Fig. 35 I provide, for each fabric-roller, a pneumatic-cylinder 227 with two ports 228 and 229 arranged at opposite sides of a piston-head 230 which slides in the cylinder. Leading to these ports are flexible-pipes 231 which are connected to pipes 232 that in turn communicate with a valve 233. Therein rotates a stem 234 forming an extension of the valve-controlling-shaft 92 that is adapted to be actuated in the manner already explained in connection with the previously-described embodiment. The valve is also provided with an inlet-port 235 communicating with a pipe 236 that leads to a suitable source of pressure-fluid and which maintains a constant air-pressure at the valve. The valve is also provided with an exhaust-port 237, and with two additional ports 238 leading into the pipes 232. The valve-stem is provided with two curved channels 239 and 240 adapted to register alternately with the intake-port 235 or to be out of register therewith for closing the valve against flow of the pressure-fluid. When the valve is open, the flow of the fluid-pressure will, for instance, be through the inlet-port 235, along the channel 239, out of the port 238, through the pipes 231 and 232, through the port 229, and into the cylinder to thrust the fabric-roller outward. When the stem is rotated to close the passage of fluid through the channel 239, the channel 240 will then be brought into register with the intake-port 235 and with the other port 238. The flow is, then, from the valve to the port 228 and into the cylinder to return the fabric-roller. The movement of the stem to register the channel 240 with the intake-port 235 will position the channel 239 so that it will register with the exhaust-port 237 to permit exhaust of the fluid-pressure from the end of the cylinder controlled by the port 229. When the channel 240 is turned out of register with the inlet-port 235, it will similarly be brought into register with the exhaust-port 237 to permit exhaust from the side of the cylinder controlled by the port 228. Preferably and as shown, the flexible pipes 231 lead from two portions of the pipe 232 so that the two pneumatic-cylinders may be operated simultaneously. By this means, I provide fluid-pressure-mechanism for positioning the presser-rollers into operating relation with the tire-form and for repositioning them. The valve is, in this instance, opened and closed, manually and automatically, in the same manner as hereinbefore explained in connection with the single-acting pneumatic-devices.

*Automatic valve opener.*—I have hereinbefore described means for automatically closing the air-valve when the carriage is approaching the end of its advancing movement, and whereby the flow of pressure-fluid to the pneumatic devices is cut off. In some instances, it may be desirable to arrange for automatically opening the valve during the receding movement of the carriage, for instance. Such automatic opening of the valve would cause the fabric-rollers to be projected by the pneumatic devices into position to engage the fabric-covered core when the carriage starts on its next succeeding advancing movement. This would avoid the necessity of the operator having manually to open the valve by the controlling-lever 93. As an example of an automatic-device for accomplishing this result, I have, in Figs. 36 and 37, shown the arm 103 (fast on the valve-controlling shaft 92) as provided with an off-set lug 241. This is adapted to be engaged by a headed-member 242 adjustably secured in one portion of a bell-crank-lever 243 pivoted, for instance, on the inside of the carriage 34. It will be understood that as the carriage approaches its starting point, during its receding movement, the member 242 will impinge against the off-set lug 241 and move the arm 103 to rock the valve-controlling-shaft 92 clockwise (Fig. 36) to open the valve and permit flow of the pressure-fluid to the pneumatic-cylinders. If, for any reason, it be desired not to effect the automatic opening of the valve when the carriage is returning to normal position, the bell-crank-lever may be rocked up into the dotted-line position indicated in said Fig. 36 to dispose the headed-member 242 out of engaging position with the lug 241. When this automatic valve-opening-device is employed, I may dispense with the carriage-feed-preventing-device, already described.

*Traveling core-support.*—In the machine, as first hereinbefore described, I contemplate effecting a change of relation between the tire-core-structure and the fabric-manipulating-structure by mounting the fabric-rollers upon a carriage, such as the carriage 34, so that it and the rollers will have advancing and receding movements toward and away from the tire-core-structure, there being mechanism (operating during the movements of the carriage) for changing the degree of angularity of the fabric-rollers in relation to the tire-core. In that instance, the tire-core-structure is relatively stationary and the fabric-manipulating structure travels in relation thereto. It is within the principles of my invention, however, to effect a change of relation between these structures by making the fabric-manipulating-structure relatively stationary and effecting a movement of the tire-core-structure in relation thereto. An example of this modification is illustrated in Figs. 38 to 42. In this instance, the fabric-manipulating-devices (including fabric-rollers 244, pneumatic-cylinders 245, etc.) are supported upon brackets 246, each adapted to be rotated on a vertical axis formed by a vertical shaft 247 suitably journaled in uprights 248 on a bracket 249 adjustably mounted upon a base 250. Each shaft 247 carries on its lower end a bevel gear 251 meshing with a similar gear 252 fast on a horizontal shaft 253 that is suitably journaled in the uprights 248 and adapted to be driven in a manner presently to be described. The shaft 253 is common to the two sets of gears 251 and 252 which operate the vertical shafts 247.

The pneumatic-cylinders 245 are supplied with fluid-pressure in the manner already described in connection with the pneumatic-cylinders 80, and the flow of the fluid-pressure is controlled by an air-valve 254, which is manually and automatically operated in the manner presently to be explained. It will be understood that the pneumatic-devices, under the influence of the pressure-fluid introduced thereinto, will project the fabric-rollers 244 into an initial position to be engaged by a fabric-covered core or form F when the same is moved into engaging position therewith, in the manner now to be explained:

The core F is connected to a shaft 255 suitably mounted in journals 256 and 257. The shaft 255 carries at its opposite end a gear 258 meshing with a larger gear 259 carried by a core-drive-shaft 260. This shaft may receive motion from driving-mechanism (similar to that hereinbefore described) for effecting rotative movement of the tire-core F.

This shaft carries a sprocket-wheel 261 adapted to drive (through a sprocket-chain 262) a larger sprocket-wheel 263 loose on a shaft 264. The sprocket-wheel is formed with one member 265 of a clutch-device, the other member 266 of which is keyed on the shaft 264. Fast on the opposite end of the shaft 264 is a crank-member 267. To this is pivotally attached an actuating-arm or pitman 268 pivotally attached to a lug 269 on the journal 256. Similarly attached to a lug 270 on the journal opposite the lug 269 is a rack-carrying box-member 271. The box-member is formed with a chamber 272 adapted to receive the headed-end of a rack-arm 273 which, on one edge, is provided with a rack 274. The rack-arm is adapted to have a sliding movement in a rack-guide 275, preferably supported on the shaft 253 and adapted to engage a toothed-wheel 274ª fast on said shaft. By this means, the shaft 253 is given a rotative movement which is transmitted, through the gears 251 and 252, to the vertical shafts 247 to rotate them and, thus, effect a rotative movement of the fabric-rollers 244 on their vertical axes formed by the shafts 247. Thereby the angular relation of the fabric-rollers with reference to the tire-core may be changed. When the shaft 264 is clutched to the sprocket-wheel 263, as by the operating lever 265ª, the crank 267 will be operated to actuate the pitman 268 and this actuates the rack-arm 273, as just described.

The journals 256 and 257 are preferably sustained by a swinging-frame or core-supporting carriage 276 which fulcrums on the shaft 260 and has a movement predetermined by the extent and character of motion of the pitman 268. When the carriage 276 is actuated by the pitman, as just described, it transmits its movement to the box-member 271. Initially, the headed-portion of the rack-arm 273 will move in the chamber 272 until it engages the inner wall thereof, whereupon motion of the box-member is transmitted to the rack-member 273 and this in turn effects rotative movement of the wheel 274, thereby to rotate the shafts, gears, etc., as already explained, for moving the fabric-rollers on their vertical axes. By reason of the fact that the carriage 276 fulcrums on the shaft 260 to which the gear 259 is attached, and that the shaft 255 on which the gear 258 is mounted is supported by the carriage, the swinging movement of the carriage will maintain the gears 258 and 259 in mesh.

It will now be seen that, after the pneumatic-devices have been operated to project the fabric-rollers toward the tire-core, the movement of the carriage 276, under the action of the train of parts connected thereto, will position the tire-core into engagement with the fabric-rollers and then move the core so that its surface will be traversed by the fabric-rollers, the latter being resiliently maintained thereagainst by the air-pressure in the cylinders. By the time that the crank-member 267 has completed a portion of its revolution, say a half, the fabric-rollers will have been caused to traverse the surface of the fabric-covered core and completed their pressing operation. The remaining portion of movement of the crank 267 will return the carriage 276 to starting position. As this carriage approaches its starting position, an arm 277 carried thereby will operate a clutch-shifter 278 and disengage the clutch-device. This provides for automatically arresting movement of the core-supporting-carriage 276. Under the action of crank 267 (when the shaft 264 is clutched to the sprocket 263) the carriage has a cycle of movement, first to position the tire-core into engagement with the projected fabric-rollers and, then, so that such rollers may traverse the surface of the fabric on the core, after which it is returned to starting position and, there, arrested.

In this instance, therefore, the tire-core-structure, carried by the carriage, will automatically be given a cycle of travel in relation to the fabric-manipulating-structure.

Before the shaft 264 is clutched to the sprocket 263 to initiate the cycle of movement of the carriage 276, the operator would open the air-valve 254 manually by means of an operating-lever 279 to actuate the pneumatic-devices. Means may also be provided for automatically closing the air-valve about the time that the carriage 276 completes its receding movement. To this end, the carriage carries an arm 280 adapted to engage and operate the valve-operating lever 279 and release the fabric-rollers so that they may be returned to normal position by the presser-returning springs, already described. These operations are similar to those explained in connection with the first-mentioned embodiment.

The construction, as thus contemplated, provides for a practical machine in which the tire-core-structure has predetermined movements in respect to a relatively stationary fabric-manipulating structure, and in which is included automatic means for controlling operation of certain of the mechanisms thereof. In this machine, there may also be incorporated certain of the devices, mechanisms, etc., described in connection with said first-mentioned embodiment.

While the machine, as herein constructed, is primarily designed for making tire "carcasses"; yet it may also be utilized for rolling other parts and elements of which a tire is constituted; such, for instance, as the tread, etc.

From the disclosure herein made, it will be seen that I have devised a "carcass"-making machine which is well adapted to achieve the several objects and ends in view. The structure, as a whole, is exceedingly simple and compact in form, is capable of producing these "carcasses" with great rapidity and accurately, with a resultant superior product in which the superposed layers or plies of fabric are evenly and uniformly laid; every "carcass" is uniform with another; the operations, after the machine is started, are automatic; and different sized tires may be formed upon the same machine merely by making slight adjustments conveniently effected.

As many changes can be made in the construction and as many widely different embodiments of the invention can obviously be made without departing from its spirit, it is intended that all matter contained in the foregoing description and shown in the accompanying drawings shall be interpreted as illustrative and not in a limiting sense; hence, the particular language employed in the appended claims is intended to cover the generic as well as the specific features of the invention.

What I claim is:

1. A tire-making machine including a tire-core structure, a fabric-manipulating structure, power-operated means for effecting an advancing movement of one of the structures in relation to the other, power-operated means for effecting a receding movement of the advanced structure away from the other, fabric-pressing members carried by one of said structures and having an engaging relation with the other, and power-operated means for actuating said pressing-members both toward and away from the core structure.

2. A tire-making machine including a tire-core structure, a fabric-manipulating structure, power-operated means for effecting an advancing movement of one of the structures in relation to the other, power-operated means for effecting a receding movement of the advanced structure away from the other, fabric-pressing members carried by one of said structures and having an engaging relation with the other, and power-operated means for actuating said pressing-members including mechanism for automatically advancing said members in one direction, and mechanism for automatically effecting a receding movement thereof.

3. A tire-making machine including a tire-core structure, a fabric-manipulating structure, power-operated means for effecting an advancing movement of one of the structures in relation to the other, power-operated means for effecting a receding movement of the advanced structure away from the other, fabric-pressing members carried by one of said structures and having an engaging relation with the other, power-operated means for actuating said pressing-members including mechanism for automatically advancing said members in one direction, mechanism for automatically effecting a receding movement thereof, and means for changing the degree of relative angularity of said members during their advancing movement.

4. A tire-making machine including a support, a pressing-member positioning-structure thereon, a tire-form structure mounted adjacent the support, power-operated means for changing the relation between said structures whereby advancing and receding movements of one of the structures toward and away from the other are positively effected, a fabric-pressing instrumentality carried and positionable by the advancing structure in definite relation to the other structure and means for automatically actuating the instrumentality both toward and away from the form and independently of the structure.

5. A tire-making machine including a support, a pressing-member positioning-structure thereon, a tire-form structure mounted adjacent the support, power-operated means for changing the relation between said structures whereby advancing and receding movements of one of the structures with respect to the other are positively effected, means for automatically effecting an arresting movement of the advancing structure in predetermined relation to the other, a fabric-pressing instrumentality carried and positionable by the advancing structure in definite relation to the other structure, and means for automatically actuating the pressing instrumentality both toward and away from the form, such automatic movement being accomplished in addition to the advancing and receding movements of the positioning structure.

6. A tire-making machine including a support, a pressing-member positioning-structure thereon, a tire-form structure mounted adjacent the support, power-operated means for changing the relation between said structures whereby advancing and receding movements of one of the structures with respect to the other are positively effected, means for automatically effecting an arresting movement of the advancing structure in predetermined relation to the other, a fabric-pressing instrumentality supported on one of the structures in definite relation to the other structure, and means operating in definite synchronism with the relation-changing means for actuating the instrumentality in relation to the form.

7. A tire-making machine including a support, a pressing-member positioning-structure thereon, a tire-form structure mounted adjacent the support, power-operated means for changing the relation between said structures whereby advancing and receding movements of one of the structures with respect to the other are positively effected, means for automatically disconnecting the moving structure from the power-operating means and thereby effecting an arresting of movement of the advancing structure in predetermined relation to the other, a fabric-pressing instrumentality carried and positionable by the advancing structure in definite relation to the other structure, means automatically actuated during the advancing movement of the positioning structure for definitely moving said pressing instrumentality in relation to the form structure, and means operating independently of the core structure for controlling such movement of the instrumentality and whereby movement of that instrumentality is effected within predetermined and definite limits.

8. A tire-making machine including a support, a pressing-member positioning-structure thereon, a tire-form structure mounted adjacent the support, power-operated means for changing the relation between said structures whereby advancing and receding movements and, also, an angular movement of one of the structures with respect to the other are positively effected, means for arresting movement of the receding structure at a predetermined point, a fabric-pressing instrumentality supported on one of the structures in definite relation to the other structure, and means operating independently of the form structure for controlling the angular movement of the pressing instrumentality and whereby such movement is effected within definite limits.

9. A tire-making machine including a support, a pressing-member positioning-structure thereon, a tire-form structure mounted adjacent the support, power-operated means for changing the relation between said structures whereby advancing and receding movements and, also, an angular movement of one of the structures with respect to the other are positively effected, means for arresting movement of the receding structure at a predetermined point, a fabric-pressing instrumentality carried and positionable by the advancing structure in definite relation to the other structure, and means operating independently of the form structure for controlling the angular movement of the pressing instrumentality and whereby such movement is effected within definite limits.

10. A tire-making machine including a support, a pressing-member positioning-structure thereon, a tire-form structure mounted adjacent the support, power-operated means for automatically changing the relation between said structures whereby a receding movement of one of the structures in respect to the other is positively effected, means for automatically arresting movement of the structures at a predetermined point in relation to the other, a power-operated fabric-pressing instrumentality positionable by the advancing structure in definite relation to the other structure, and means for automatically moving the instrumentality in any of a plurality of directions in relation to the core.

11. A tire-making machine including a support, a pressing-member positioning-structure thereon, a tire-form structure mounted adjacent the support, power-operated means for changing the relation between said structures whereby a receding movement of one of the structures is positively effected, and a pressure-fluid-operated fabric-pressing instrumentality carried by said positioning-structure and positionable thereby in predetermined relation to the tire-form structure.

12. A tire-making machine including a support, a pressing-member positioning-structure thereon, a tire-form structure mounted adjacent the support, power-operated means for changing the relation between said structures whereby a receding movement of one of the structures is positively effected, means for arresting movement of the structure in predetermined relation to the other, and a pressure-fluid-operated fabric-pressing instrumentality carried by said positioning-structure and positionable thereby in predetermined relation to the tire-form structure.

13. A tire-making machine including a support, a pressing-member positioning-structure thereon, a tire-form structure mounted adjacent the support, power-operated means for changing the relation between said structures whereby a receding movement of one of the structures is positively effected, means for arresting movement of the structure in predetermined relation to the other, a pressure-fluid-operated fabric-pressing instrumentality carried by said positioning-structure and positionable thereby in predetermined relation to the tire-form structure, and means for effecting an initial positioning of said instrumentality irrespective of its positioning as effected by said positioning-structure.

14. A tire-making machine including a support, a pressing-member positioning-structure thereon, a tire-form structure mounted adjacent the support, power-operated means for changing the relation between said structures whereby a receding movement of one of the structures is positively effected, means for arresting movement of the structure in predetermined relation to the other, a pressure-fluid-operated fabric-pressing instrumentality carried by said positioning-structure and positionable thereby in predetermined relation to the tire-form structure, means for effecting an initial positioning of said instrumentality irrespective of its positioning as effected by said positioning-structure, and means operating during the movement of said positioning-structure for effecting a movement of said instrumentality independent of the action of initial positioning means.

15. A tire-making machine including a support, power-operated means for effecting advancing and receding movements of said support, a fabric-pressing member on and movable with the support, a tire-form juxtaposed to the pressing-member and upon which tire material may be superposed, power-operated means for pressing said member toward and into contact with the form, and means operating independently of the form for limiting movement of the pressing-member, whereby a substantially uniform stretching of said material may be accomplished.

16. A tire-making machine including a support, power-operated means for effecting advancing and receding movements of said support, a fabric-pressing member on and movable with the support, a tire-form juxtaposed to the pressing-member, and power-operated means for thrusting said member toward the form.

17. A tire-making machine including a support, power-operated means for effecting advancing and receding movements of said support, a fabric-pressing member on and movable with the support, a tire-form relatively associated with the pressing-member, and fluid-operated means for thrusting the member toward the form and for maintaining the same with a predetermined pressure in contact therewith.

18. A tire-making machine including a support, power-operated means for effecting advancing and receding movements of said support, a fabric-pressing member on and movable with the support, a tire-form juxtaposed to the pressing-member, power-operated means for pressing said member toward and resiliently maintaining the same in contact with the form, and means for shifting the position of the member on its support in relation to the form, such motion being distinct from that of its pressing movement.

19. A tire-making machine including a tire-form, a support movable in relation thereto, power-operated means for moving said support, fabric-manipulating devices carried by the support and positionable thereby in relation to the tire-form, power-operated means for moving said devices toward the tire-form independent of the positioning movement of the support, power-operated means for returning said devices to normal position, and power-operated means for returning the support to normal position.

20. In a tire-making machine, a tire-form, a support movable in relation thereto, means for effecting an advancing movement of the support in relation to the form, presser-members mounted on the support, means for projecting the presser-members toward the tire-form to effect their initial positioning, and means for varying the extent of movement of said presser-members for their initial positioning movement.

21. A tire-making machine including a tire-form, a support movable in relation thereto, fabric-manipulating devices carried by the support and positioned thereby in relation to the tire-form, means for effecting a receding movement of the support away from the tire-form, and adjustable means for changing the initial starting position of the support in relation to the form, including an adjustable device adapted to be engaged by the support as it approaches the limit of its receding movement.

22. A tire-making machine including a tire-form, a support movable in relation thereto, fabric-manipulating devices carried by the support and positioned thereby in relation to the tire-form, means for effecting a receding movement of the support away from the tire-form, and adjustable means for changing the initial starting position of the support in relation to the form, including an adjustable bumper adapted to be engaged by the support as it approaches the limit of its receding movement.

23. A tire-making machine including a tire-form, a support movable in relation thereto, fabric-manipulating devices carried by the support and positioned thereby in relation to the tire-form, means for effecting a receding movement of the support away from the tire-form, adjustable means for changing the initial starting position of the support in relation to the form, and means for effecting an initial positioning of the fabric-manipulating devices, such initial positioning with respect to the tire-form depending upon the starting position of the support.

24. A tire-making machine including a tire-form, a support movable in relation thereto, fabric-manipulating devices carried by the support and positioned thereby in relation to the tire-form, means for effecting a receding movement of the support away from the tire-form, adjustable means for changing the initial starting position of the support in relation to the form, means for effecting an initial positioning of the fabric-manipulating devices, such initial positioning with respect to the tire-form depending upon the starting position of the support, and means for varying the initial positioning of said devices whereby their initial contact with the form may be varied.

25. A tire-making machine including a tire-form, a support juxtaposed thereto, fabric-manipulating devices engageable with and traveling upon fabric on said form, and means operative constantly and automatically for effecting travel of the fabric-manipulating devices in the same and unvaried path for successive layers of fabric.

26. A tire-making machine including a tire-form, a support juxtaposed thereto, fabric-manipulating devices engageable with and traveling upon fabric on said form, means for effecting travel of the fabric-manipulating devices in the same path for successive layers of fabric and means operative at the will of the operator for automatically changing the path of travel of said devices on different alternate layers of the fabric.

27. In a tire-making machine, a support, presser-members mounted on the support, means for moving the presser-members to effect their initial positioning, and means for varying the extent of movement of said presser-members during their initial positioning movement including an adjustable guide juxtaposed to the presser member and adapted to be engaged thereby during the outward thrust movement of the member.

28. In a tire-making machine, a tire-form, a support movable in relation thereto, means for effecting an advancing movement of the support in relation to the form, presser-members mounted on the support, means for moving the presser-members toward the tire-form to effect their initial positioning, and means for varying the extent of movement of said presser-members during their initial positioning movement including an adjustable guide juxtaposed to the presser-member and adapted to be engaged thereby during the outward thrust movement of the member.

29. A tire-making machine including a tire-form, a support juxtaposed thereto, fabric-manipulating devices engageable with fabric on the tire-form, and means for automatically varying the period of contact of said devices with the fabric on the form.

30. A tire-making machine including a tire-form, a support juxtaposed thereto, fabric-manipulating devices engageable with fabric on the tire-form, means for automatically varying the period of contact of said devices with the fabric on the form, and means for actuating said devices into and out of contact with the support.

31. A tire-making machine including a tire-form, a support juxtaposed thereto, fabric-manipulating devices engageable with fabric on the tire-form, means for automatically varying the period of contact of said devices with the fabric on the form, and power-operated means for actuating said devices into and out of contact with the support.

32. A tire-making machine including a tire-form, a support juxtaposed thereto, fabric-manipulating devices engageable with fabric on the tire-form, means for automatically varying the period of contact of said devices with the fabric on the form, means for actuating said devices into and out of contact with the support, and means for automatically changing the angular relation of the devices in respect to the form.

33. A tire-making machine including a tire-form, a support juxtaposed thereto, fabric-manipulating devices engageable with fabric on the tire-form and sustained by the support, means for actuating the devices in respect to the form, means for automatically varying the period of contact of said devices with the fabric on the form, and means for effecting an accelerated movement of the fabric-manipulating devices during their contact with the fabric.

34. A tire-making machine including a tire-form, a support juxtaposed thereto, fabric-manipulating devices engageable with fabric on the tire-form and sustained by the support, means for actuating the devices in respect to the form, means for automatically varying the period of contact of said devices with the fabric on the form, and means for effecting first a slow and then an accelerated movement of the fabric-manipulating devices during their contact with the fabric.

35. A tire-making machine including a tire-form, a support adapted to travel toward and away from the form, automatic means for effecting movement of the support toward and away from the form, fabric-pressing members carried by the support, and automatic means independent of the form for controlling the position of said members in relation to the form during both travels of the support.

36. A tire-making machine including a support, a tire-form, power-operated means for effecting movement of the support toward and away from the tire-form, element-sustaining members mounted on the support in juxtaposition to the form, slidable presser-sustaining elements on said members, presser-devices carried by said elements and engagingly related to the tire-form, means for rotating said presser-devices, and means for actuating said element-sustaining members whereby the presser-devices are given an angular positioning movement in relation to the form simultaneously with their rotative movement.

37. A tire-making machine including a support, a tire-form, power-operated means for effecting movement of the support toward and away from the tire-form, transversely spaced element-sustaining members mounted on the support in juxtaposition to the form, presser-sustaining elements on said members, presser-devices carried by said elements and engagingly related to the tire-form, means for rotating said presser-devices, and means for actuating said element-sustaining members whereby the presser-devices are automatically given an angular positioning movement in relation to the form simultaneously with their rotative movement.

38. A tire-making machine including a support, a tire-form, power-operated means for effecting movement of the support toward and away from the tire-form, transversely spaced element-sustaining members mounted on the support in juxtaposition to the form, slidable presser-sustaining elements on said members, presser-devices carried by said elements and engagingly related to the tire-form, means for rotating said presser-devices, and means for actuating said element-sustaining members whereby the presser-devices are given an angular positioning movement simultaneously with their rotative movement.

39. A tire-making machine including a support, a tire-form, power-operated means for effecting movement of the support toward and away from the tire-form, transversely spaced element-sustaining members mounted on the support in juxtaposition to the form, slidable presser-sustaining elements on said members, presser-devices carried by said elements and engagingly related to the tire-form, means for rotating said presser-devices, and means for actuating said element-sustaining members whereby the presser-devices are given an angular positioning movement in relation to the form simultaneously with their rotative movement.

40. A tire-making machine including a support, a tire-form, power-operated means for effecting movement of the support toward and away from the tire-form, element-sustaining members mounted on the support in juxtaposition to the form, slidable presser-sustaining elements on said members, presser-devices carried by said elements and engagingly related to the tire-form, means for bodily rotating said presser-devices, means for actuating said element-sustaining members whereby the presser-devices are given an angular positioning movement in relation to the form simultaneously with their rotative movement, and means for varying the movement of said sustaining members whereby the degree of their relative angularity may be varied.

41. A tire-making machine including a support, a tire-form, power-operated means for effecting movement of the support toward and away from the tire-form, transversely spaced element-sustaining members mounted on the support in juxtaposition to the form, slidable presser-sustaining elements on said members, presser-devices carried by said elements and engagingly related to the tire-form, means for bodily rotating said presser-devices, means for actuating said element-sustaining members whereby the presser-devices are given an angular positioning movement in relation to the form simultaneously with their rotative movement, and means for varying the movement of said sustaining members whereby the degree of their relative angularity may be varied.

42. A tire-making machine including a support, a tire-form, power-operated means for effecting movement of the support toward and away from the tire-form, element-sustaining members mounted on the support in juxtaposition to the form, presser-sustaining elements on said members, presser-devices carried by said elements and engagingly related to the tire-form, means for rotating said presser-devices, means for actuating said element-sustaining members whereby the presser-devices are given an angular positioning movement in relation to the form simultaneously with their rotative movement, and power-operated means for varying the movement of said sustaining members whereby the degree of their relative angularity may be varied.

43. A tire-making machine including a support, a tire-form, power-operated means for effecting movement of the support toward and away from the tire-form, transversely-spaced element-sustaining members mounted on the support in juxtaposition to the form, slidable presser-sustaining elements on said members, presser-devices carried by said elements and engagingly related to the tire-form, means for rotating said presser-devices, means for actuating said element-sustaining members whereby the presser-devices are given an angular positioning movement in relation to the form simultaneously with their rotative movement, and power-operated means for varying the movement of said sustaining members whereby the degree of their relative angularity may be varied.

44. A tire-making machine including a support, a tire-form, power-operated means for effecting movement of the support toward and away from the tire-form, element-sustaining members mounted on the support in juxtaposition to the form, presser-sustaining elements on said members, presser-devices carried by said elements and engagingly related to the tire-form, means for rotating said presser-devices, and power-operated means for actuating said element-sustaining members whereby the presser-devices are given an angular positioning movement in relation to the form simultaneously with their rotative movement.

45. A tire-making machine including a support, a tire-form, power-operated means for effecting movement of the support toward and away from the tire-form, transversely-spaced element-sustaining members mounted on the support in juxtaposition to the form, means for shifting said members relatively, slidable presser-sustaining elements on said members, presser-devices carried by said elements and engagingly related to the tire-form, means for rotating said presser-devices, and power-operated means for actuating said element-sustaining members whereby the presser-devices are given an angular positioning movement in relation to the form simultaneously with their rotative movement.

46. A tire-making machine including a support, a tire-form, power-operated means for effecting movement of the support toward and away from the tire-form, element-sustaining members mounted on the support in juxtaposition to the form, presser-sustaining elements on said members, presser-devices carried by said elements and engagingly related to the tire-form, means for bodily rotating said presser-devices, pressure-fluid operated means for actuating said presser-devices, and means for actuating said element-sustaining members whereby the presser-devices are given an angular positioning movement in relation to the form simultaneously with their rotative movement.

47. A tire-making machine including a support, a tire-form, power-operated means for effecting movement of the support toward and away from the tire-form, element-sustaining members mounted on the support in juxtaposition to the form, presser-sustaining elements on said members, presser-devices carried by said elements and engagingly related to the tire-form, co-acting means on said members and elements for bodily rotating said presser-devices, and means for automatically actuating said element-sustaining members whereby the presser-devices are given an angular positioning movement in relation to the form simultaneously with their rotative movement.

48. A tire-making machine including a support, bracket-members mounted thereon, presser-sustaining cross-heads slidably disposed on the bracket-members, fabric-pressers rotatably mounted in said heads and having a rack-and-pinion engagement with said bracket-members whereby each presser may be rotated on an approximately vertical axis, a rock-shaft journaled in the bracket-members and actuatable to control the relative angular position of the presser-members, operating-connections between said shaft and the cross-heads, and power-operated means for effecting movement for said support in a plurality of directions.

49. A tire-making machine including a support, transversely-shiftable bracket-members mounted thereon, presser-sustaining cross-heads slidably disposed on the bracket-members, fabric-pressers rotatably mounted in said heads and having a rack-and-pinion engagement with said bracket-members whereby each presser may be rotated on an approximately vertical axis, a rock-shaft journaled in the bracket-members and actuatable to control the relative angular position of the presser-members, operating-connections between said shaft and the cross-heads, and power-operated means for effecting movement of said support in a plurality of directions.

50. A tire-making machine including a tire-form, a support, presser-devices on the support, means for automatically effecting movement of the support in a plurality of directions in respect to the form, means for maintaining said devices in engagement with the form, means automatically actuatable while said maintaining means is operating for bodily shifting said devices on the support to change their angular relation thereto, and means for guiding said devices during their angle-changing movement.

51. A tire-making machine including a tire-form, a support, presser-devices on the support, means for maintaining said devices in engagement with the form, means actuatable while said maintaining means is operating for bodily shifting said devices on the support to change their angular relation thereto, means for guiding said devices during their angle-changing movement and comprising an irregular engaging surface whereby the movement of the presser-devices may be predeterminately varied at different stages.

52. A tire-making machine including a tire-form, a support, presser-devices on the support, means for maintaining said devices in engagement with the form, means actuatable while said maintaining means is operating for bodily shifting said devices on the support to change their angular relation thereto, means for guiding said devices during their angle-changing movement and comprising an irregular engaging surface whereby the movement of the presser-devices may be predeterminately varied at different stages, and means for changing the relative position of the engaging surface for such variation of movement.

53. A tire-making machine including a tire-form, a support, presser-devices on the support, means for maintaining said devices in engagement with the form, means actuatable while said maintaining means is operating for bodily shifting said devices on the support to change their angular relation thereto, means for guiding said devices during their angle-changing movement and comprising an irregular engaging surface whereby the movement of the presser-devices may be predeterminately varied at different stages, and a surface-engaging instrumentality having a traversing engagement with said irregular engaging-surface.

54. A tire-making machine including a tire-form, a support, presser-devices on the support, means for maintaining said devices in engagement with the form, means actuatable while said maintaining means is operating for bodily shifting said devices on the support to change their angular relation thereto, means for guiding said devices during their angle-changing movement and comprising an irregular engaging surface whereby the movement of the presser-devices may be predeterminately varied at different stages, a surface-engaging instrumentality having a traversing engagement with said irregular engaging-surface, and means for changing the inclination of said surface predeterminately to effect such variation in the movement of the presser-device.

55. A tire-making machine including a tire-form, a support, presser-devices on the support, means for maintaining said devices in engagement with the form, means made active while said maintaining means is operating for bodily shifting said devices on the support to change their angular relation thereto, and a guiding-device for controlling the angle-changing means including a cam-instrumentality co-operating therewith.

56. A tire-making machine including a tire-form, a support, presser-devices on the support, means for maintaining said devices in engagement with the form, means made active while said maintaining-means is operating for bodily shifting said devices on the support to change their angular relation thereto, and a guiding-device for controlling the angle-changing means including a cam-instrumentality co-operating therewith and actuatable into any of a plurality of operative positions for under-bead and over-bead operations.

57. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and actuatable into any of a plurality of operative positions for under-bead and over-bead operations, and independent means for governing the predetermined position thereof for said under-bead and over-bead operations, respectively.

58. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and actuatable into any of a plurality of operative positions for under-bead and over-bead operations, and independent means for governing the predetermined position thereof for said under-bead and over-bead operations, respectively, each of such governing means being separately adjustable to change the angle of said cam-instrumentality for one of said operations without disturbing the adjustment of the other means for the other operation.

59. A tire-making machine including a tire-form, a support, presser-devices on the support, means for maintaining said devices in engagement with the form, means made active while said maintaining-means is operating for bodily shifting said devices on the support to change their angular relation thereto, and a guiding-device for controlling the angle-changing means including a cam-instrumentality co-operating therewith and comprising a relatively stationary member and a movable member connected thereto.

60. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and comprising a relatively stationary member and a movable member connected thereto, and means for locking the movable member in one position and for limiting its movement when actuated into a different position.

61. A tire-making machine including a tire-form, a support, presser-devices on the support, means for maintaining said devices in engagement with the form, means made active while said maintaining-means is operating for bodily shifting said devices on the support to change their angular relation thereto, and a guiding-device for controlling the angle-changing means including a cam-instrumentality co-operating therewith and comprising a relatively stationary member and a movable member connected thereto, said movable member having a plurality of roller-engaging cam-portions.

62. A tire-making machine including a tire-form, a support, presser-devices on the support, means for maintaining said devices in engagement with the form, means made active while said maintaining-means is operating for bodily shifting said devices on the support to change their angular relation thereto, and a guiding-device for controlling the angle-changing means including a cam-instrumentality co-operating therewith and comprising a relatively stationary member and a movable member connected thereto, said movable member having a plurality of roller-engaging cam-portions, one inclined to the other.

63. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and comprising a relatively stationary member and a movable member connected thereto, said movable member having a plurality of roller-engaging cam-portions, one inclined to the other, and means for locking the movable member in one position and for limiting its movement when actuated into a different position whereby the relative positions of said portions are changed.

64. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and comprising a relatively stationary member and a movable member connected thereto, said movable member having a plurality of roller-engaging cam-portions, one inclined to the other, means for locking the movable member in one position and for limiting its movement when actuated into a different position whereby the relative positions of said portions are changed, a roller-carrying arm having engagement with said cam-portions, and a rock-shaft connecting with and acting under the influence of said roller.

65. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and comprising a relatively stationary member and a movable member connected thereto, said movable member having a plurality of roller-engaging cam-portions, one inclined to the other, means for locking the movable member in one position and for limiting its movement when actuated into a different position whereby the relative positions of said portions are changed, a roller-carrying arm having engagement with said cam-portions, a rock-shaft connecting with and acting under the influence of said roller, and a cross-head connected to and operated by the rock-shaft.

66. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and comprising a relatively stationary member and a movable member connected thereto, said movable member having a plurality of roller-engaging cam-portions, one inclined to the other, means for locking the movable member in one position and for limiting its movement when actuated into a different position whereby the relative positions of said portions are changed, a roller-carrying arm having engagement with said cam-portions, a rock-shaft connecting with and acting under the influence of said roller, a cross-head connected to and operated by the rock-shaft, and means carried by said cross-head for sustaining one of said presser-devices.

67. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-instrumentality co-operating therewith and comprising a relatively stationary member and a movable member connected thereto, said movable member having a plurality of roller-engaging cam-portions, one inclined to the other, means for locking the movable member in one position and for limiting its movement when actuated into a different position whereby the relative positions of said portions are changed, a roller-carrying arm having engagement with said cam-portions, a rock-shaft connecting with and acting under the influence of said roller, a cross-head connected to and operated by the rock-shaft, means carried by said cross-head for sustaining one of said presser-devices, and means for effecting rotative movement of the presser-device on a vertical axis while said cross-head is actuated and whereby said presser-device is bodily shifted while rotating on its axis.

68. A tire-making machine including a tire-form, a support, presser-devices on the support, means for maintaining said devices in engagement with the form, means made active while said maintaining-means is operating for bodily shifting said devices on the support to change their angular relation thereto, and a guiding-device for controlling the angle-changing means including a cam-structure co-operating therewith and comprising a sustaining-member, a movable member connected thereto, and a locking-device for holding said movable member in one of its plurality of operative positions.

69. A tire-making machine including a tire-form, a support, presser-devices on the support, means for maintaining said devices in engagement with the form, means made active while said maintaining-means is operating for bodily shifting said devices on the support to change their angular relation thereto, and a guiding-device for controlling the angle-changing means including a cam-structure co-operating therewith and comprising a sustaining-member, a movable member connected thereto, a locking-device for holding said movable member in one of its plurality of operative positions, and a limiting-device for predetermining the limit of movement of said movable member for a second of its plurality of operative positions.

70. A tire-making machine including a tire-form, a support, presser-devices on the support, means for maintaining said devices in engagement with the form, means made active while said maintaining-means is operating for bodily shifting said devices on the support to change their angular relation thereto, a guiding-device for controlling the angle-changing means including a cam-structure co-operating therewith and comprising a sustaining-member, a movable member connected thereto, a locking-device for holding said movable member in one of its plurality of operative positions, a limiting-device for predetermining the limit of movement of said movable member for a second of its plurality of operative positions, an adjustable element carried by said movable member and co-operating with said locking-device, and an adjusting limit-stop on said limiting-device.

71. A tire-making machine including a tire-form, a support, presser-devices on the support, means for maintaining said devices in engagement with the form, means for changing the angular relation of said devices to the form comprising a cam-structure provided with a cam-way and consisting of a relatively stationary member, a movable member connected thereto and having a plurality of roller-engaging surfaces angulated to each other, and a controlling device movable in said cam-way and actuated by its engagement with said surfaces and connecting with said presser-devices to operate them.

72. A tire-making machine including a tire-form, a support, presser-devices on the support, means for maintaining said devices in engagement with the form, means for changing the angular relation of said devices to the form comprising a cam-structure provided with a cam-way and consisting of a relatively stationary member, a movable member connected thereto and having a plurality of roller-engaging surfaces angulated to each other, a controlling device movable in said cam-way and actuated by its engagement with said surfaces, a rock-shaft connecting with said controlling-device, cross-heads upon which said presser-devices are mounted, and connections between said cross-heads and the rock-shaft.

73. A tire-making machine including a tire-form, a support, presser-devices on the support, means for maintaining said devices in engagement with the form, means for changing the angular relation of said devices to the form comprising a cam-structure provided with a cam-way and consisting of a relatively stationary member, a movable member connected thereto and having a plurality of roller-engaging surfaces angulated to each other, a controlling-device movable in said cam-way and actuated by its engagement with said surfaces, a rock-shaft connecting with said controlling-device, cross-heads upon which said presser-devices are mounted, connections between said cross-heads and the rock-shaft, a locking-device adapted to engage said movable member to hold it in one of its positions and to be engaged by said controlling-device when said movable member is actuated into a different position and thereby cause said controlling-device to operate said rock-shaft, and an adjustable member-limiting device adapted to be engaged by said movable member.

74. A tire-making machine including a tire-form, a support, presser-devices on the support, means for maintaining said devices in engagement with the form, means for changing the angular relation of said devices to the form comprising a cam-structure provided with a cam-way and consisting of a relatively stationary member, a movable member connected thereto and having a plurality of roller-engaging surfaces angulated to each other, a controlling-device movable in said cam-way and actuated by its engagement with said surfaces, a rock-shaft connecting with said controlling-device, cross-heads upon which said presser-devices are mounted, connections between said cross-heads and the rock-shaft, a locking-device adapted to engage said movable member to hold it in one of its positions and to be engaged by said controlling-device when said movable member is actuated into a different position and thereby cause said controlling-device to operate said rock-shaft, an adjustable member-limiting device adapted to be engaged by said movable member, and co-operating means carried by said presser-devices and said cross-heads for effecting a rotative movement of said pressing-members.

75. A tire-making machine including a support, presser-devices on the support, and means for changing the degree of angularity of said presser-devices relatively comprising a cam-structure which includes a relatively stationary member formed with a roller-engaging surface, a movable member pivoted to the stationary member and having at least two roller-engaging surfaces angulated to each other, a locking-device juxtaposed to said pivoted member, a connecting member carried by said pivoted member and adapted to be engaged by said locking-device to maintain the pivoted member in one of its operative positions, and a member-limiting stop disposed in the path of movement of said pivoted member, and means for changing the relation between said pivoted member and said locking-device.

76. A tire-making machine including a support, presser-devices on the support, and means for changing the degree of angularity of said pressing-members relatively comprising a cam-structure which includes a relatively stationary member formed with a roller-engaging surface, a movable member pivoted to the stationary member and having at least two roller-engaging surfaces angulated to each other, a locking-device juxtaposed to said pivoted member, a connecting member carried by said pivoted member and adapted to be engaged by said locking-device to maintain the pivoted member in one of its operative positions, and a member-limiting stop disposed in the path of movement of said pivoted member, and means for changing the relation between said pivoted member and said locking-device, comprising a roller adapted to traverse the surfaces of said stationary and pivoted members and also said locking-device alternately.

77. A tire-making machine including a support, presser-devices on the support, and means for changing the degree of angularity of said pressing-members relatively comprising a cam-structure adjustably mounted on the support and which includes a relatively stationary member formed with a roller-engaging surface, a movable member pivoted to the stationary member and having at least two roller-engaging surfaces angulated to each other, a locking-device juxtaposed to said pivoted member, a connecting member carried by said pivoted member and adapted to be engaged by said locking device to maintain the pivoted member in one of its operative positions, a member-limiting stop disposed in the path of movement of said pivoted member, and means for changing the relation between said pivoted member and said locking-device, comprising a roller adapted to traverse the surfaces of said stationary and pivoted members and also said locking-device alternately.

78. A tire-making machine including a support, presser-devices on the support, and means for changing the degree of angularity of said pressing-members relatively comprising a cam-structure which includes a relatively stationary member formed with a roller-engaging surface, a movable member pivoted to the stationary member and having at least two roller-engaging surfaces angulated to each other, a locking-device juxtaposed to said pivoted member, a connecting member carried by said pivoted member and adapted to be engaged by said locking-device to maintain the pivoted member in one of its operative positions, a member-limiting stop disposed in the path of movement of said pivoted member, means for changing the relation between said pivoted member and said locking-device, comprising a roller adapted to traverse the surfaces of said stationary and pivoted members and also said locking-device alternately, and a carriage movably mounted on said support and adapted to carry said roller.

79. In a tire-making machine, a tire-form, a support, a carriage movably mounted on the support, presser-devices carried on and positionable by said carriage in relation to the form, means for effecting an initial positioning of said presser-devices in relation to the support, and means for changing the angular relation of said presser-devices to the form including a cam-structure mounted on the support and consisting of a relatively stationary member having a roller-engaging surface and a movable member pivoted on the stationary member having at least two roller-engaging surfaces, one of which is inclined to the horizontal, a bracket straddling the movable member, an adjusting screw threaded through said bracket and adapted to be engaged by said pivoted member and operating to predetermine the relative positions of the surfaces of said pivoted member, a pendant element adjustably mounted on said pivoted member, a locking-device pivoted on said support and adapted to engage with said pendant element, a rock-shaft journaled in said carriage, an arm fast on the rock-shaft, a roller journaled on the arm and adapted to engage the surfaces of said stationary and pivoted members of the cam-structure, cross-heads slidably mounted on said carriage, actuating rods connecting said rock-shaft with said cross-heads, and means for rotatably supporting said presser-devices in said cross-heads.

80. In a tire-making machine, a tire-form, a support, a carriage movably mounted on the support, presser-devices carried on and positionable by said carriage in relation to the form, means for effecting an initial positioning of said presser-devices in relation to the support, and means for changing the angular relation of said presser-devices to the form including a cam-structure mounted on the support and consisting of a relatively stationary member having a roller-engaging surface and a movable member pivoted on the stationary member and having at least two roller-engaging surfaces, one of which is inclined to the horizontal, a bracket straddling the movable member, an adjusting screw threaded through said bracket and adapted to be engaged by said pivoted member and operating to predetermine the relative positions of the surfaces of said pivoted member, a pendant element adjustably mounted on said pivoted member, a locking-device pivoted on said support and adapted to engage with said pendant element and provided with a cam-surface, a rock-shaft journaled in said carriage, an arm fast on the rock-shaft, a roller journaled on the arm and adapted to engage the surfaces of said stationary and pivoted members of the cam-structure and also the cam-surface of the locking-device, cross-heads slidably mounted on said carriage, actuating rods connecting said rock-shaft with said cross-heads, and means for rotatably supporting said presser-devices in said cross-heads.

81. In a tire-making machine, a tire-form, a support, a carriage movably mounted on the support, presser-devices carried on and positionable by said carriage in relation to the form, means for effecting an initial positioning of said presser-devices in relation to the support, and means for changing the angular relation of said presser-devices to the form including a cam-structure mounted on the support and consisting of a relatively stationary member having a roller-engaging surface and a movable member pivoted on the stationary member and having at least two roller-engaging surfaces, one of which is inclined to the horizontal, a bracket straddling the movable member, an adjusting screw threaded through said bracket and adapted to be engaged by said pivoted member and operating to predetermine the relative positions of the surfaces of said pivoted member, a pendant element adjustably mounted on said pivoted member, a locking-device pivoted on said support and adapted to engage with said pendant element and provided with a cam-surface, a rock-shaft journaled in said carriage, an arm fast on the rock-shaft, a roller journaled on the arm and adapted to engage the surfaces of said stationary and pivoted members of the cam-structure and also the cam-surface of the locking-device, cross-heads slidably mounted on said carriage, actuating rods connecting said rock-shaft with said cross-heads, means for rotatably supporting said presser-devices in said cross-heads, and means for actuating said locking-device to cause it to engage and disengage from said pendant element.

82. In a tire-making machine, a tire-form, a support, a carriage movably mounted on the support, presser-devices carried on and positionable by said carriage in relation to the form, means for effecting an initial positioning of said presser-devices in relation to the support, and means for changing the angular relation of said presser-devices to the form including a cam-structure mounted on the support and consisting of a relatively stationary member having a roller-engaging surface and a movable member pivoted on the stationary member and having at least two roller-engaging surfaces, one of which is inclined to the horizontal, a bracket straddling the movable member, an adjusting screw threaded through said bracket and adapted to be engaged by said pivoted member and operating to predetermine the relative positions of the surfaces of said pivoted member, a pendant element adjustably mounted on said pivoted member, a locking-device pivoted on said support and adapted to engage with said pendant element and provided with a cam-surface, a rock-shaft journaled in said carriage, an arm fast on the rock-shaft, a roller journaled on the arm and adapted to engage the surfaces of said stationary and pivoted members of the cam-structure and also the cam-surface of the locking-device, cross-heads slidably mounted on said carriage, actuating rods connecting said rock-shaft with said cross-heads, means for rotatably supporting said presser-devices in said cross-heads, and automatically-operated means for actuating said locking-device to cause it to engage and disengage from said pendant element.

83. In a tire-making machine, a tire-form, a support, a carriage movably mounted on the support, presser-devices carried on and positionable by said carriage in relation to the form, means for effecting an initial positioning of said presser-devices in relation to the support, and means for changing the angular relation of said presser-devices to the form including a cam-structure mounted on the support and consisting of a relatively stationary member having a roller-engaging surface and a movable member pivoted on the stationary member and having at least two roller-engaging surfaces, one of which is inclined to the horizontal, a bracket straddling the movable member, an adjusting screw threaded through said bracket and adapted to be engaged by said pivoted member and operating to predetermine the relative positions of the surfaces of said pivoted member, a pendant element adjustably mounted on said pivoted member, a locking-device pivoted on said support and adapted to engage with said pendant element and provided with a cam-surface, a rock-shaft journaled in said carriage, an arm fast on the rock-shaft, a roller journaled on the arm and adapted to engage the surfaces of said stationary and pivoted members of the cam-structure and also the cam-surface of the locking-device, cross-heads slidably mounted on said carriage, actuating rods connecting said rock-shaft with said cross-heads, means for rotatably supporting said presser-devices in said cross-heads, and automatically-operated means for actuating said locking-device to cause it to engage and disengage from said pendant element, including a controlling-shaft and a roller-carrying arm mounted on the shaft and adapted to engage said locking-device.

84. In a tire-making machine, a tire-form, a support, a carriage movably mounted on the support, presser-devices carried on and positionable by said carriage in relation to the form, means for effecting an initial positioning of said presser-devices in relation to the support, and means for changing the angular relation of said presser-devices to the form including a cam-structure mounted on the support and consisting of a relatively stationary member having a roller-engaging surface and a movable member pivoted on the stationary member and having at least two roller-engaging surfaces, one of which is inclined to the horizontal, a bracket straddling the movable member, an adjusting screw threaded through said bracket and adapted to be engaged by said pivoted member and operating to predetermine the relative positions of the surfaces of said pivoted member, a pendant-element adjustably mounted on said pivoted member, a locking-device pivoted on said support and adapted to engage with said pendant-element and provided with a cam-surface, a rock-shaft journaled in said carriage, an arm fast on the rock-shaft, a roller journaled on the arm and adapted to engage the surfaces of said stationary and pivoted members of the cam-structure and also the cam-surface of the locking-device, cross-heads slidably mounted on said carriage, actuating rods connecting said rock-shaft with said cross-heads, means for rotatably supporting said presser-devices in said cross-heads, means for actuating said locking-device to cause it to engage and disengage from said pendant-element, a roller-engaging block mounted on the carriage and underlying said cam-structure, and a cam-way between the block and the roller-engaging surfaces of the stationary and movable members of the cam-structure.

85. In a tire-making machine, a tire-form, a support, a carriage movably mounted on the support, presser-devices carried on and positionable by said carriage in relation to the form, means for effecting an initial positioning of said presser-devices in relation to the support, and means for changing the angular relation of said presser-devices to the form including a cam-structure mounted on the support and consisting of a relatively stationary member having a roller-engaging surface and a movable member pivoted on the stationary member and having at least two roller-engaging surfaces, one of which is inclined to the horizontal, a bracket straddling the movable member, an adjusting-screw threaded through said bracket and adapted to be engaged by said pivoted member and operating to predetermine the relative positions of the surfaces of said pivoted member, a pendant-element adjustably mounted on said pivoted member, a locking-device pivoted on said support and adapted to engage with said pendant-element and provided with a cam-surface, a rock-shaft journaled in said carriage, an arm fast on the rock-shaft, a roller journaled on the arm and adapted to engage the surfaces of said stationary and pivoted members of the cam-structure and also the cam-surface of the locking-device, cross-heads slidably mounted on said carriage, actuating rods connecting said rock-shaft with said cross-heads, means for rotatably supporting said presser-devices in said cross-heads, means for actuating said locking-device to cause it to engage and disengage from said pendant-element, a roller-engaging block mounted on the carriage and underlying said cam-structure, and a cam-way between the block and the roller-engaging surfaces of the stationary and movable members of the cam-structure, said cam-structure being longitudinally adjustable on the carriage in relation to the block.

86. A tire-making machine including a tire-form, a presser-positioning carriage movable in relation thereto, fabric-manipulating devices mounted on the carriage and positionable thereby in relation to the form, means for effecting movement of the carriage in relation to the form, adjustable means for predetermining the starting position of the carriage with respect to the form, and means controlled by the movement of the carriage for changing the angular relation of the pressing-members with respect to the form.

87. A tire-making machine including a tire-form, a presser-positioning carriage movable in relation thereto, fabric-manipulating devices mounted on the carriage and positionable thereby in relation to the form, means for effecting movement of the carriage in relation to the form, adjustable means engageable by the carriage for predetermining the starting position of the carriage with respect to the form, and means controlled by the movement of the carriage for changing the angular relation of the pressing-members with respect to the form.

88. A tire-making machine including a tire-form, a presser-positioning carriage movable in relation thereto, fabric-manipulating devices mounted on the carriage and positionable thereby in relation to the form, means for effecting movement of the carriage in relation to the form, adjustable means for predetermining the starting position of the carriage with respect to the form, and means dependent upon the starting position of the carriage and controlled by the movement of the carriage for changing the angular relation of the pressing-members with respect to the form.

89. A tire-making machine including a tire-form, a presser-positioning carriage movable in relation thereto, fabric-manipulating devices mounted on the carriage and positionable thereby in relation to the form, means for effecting movement of the carriage in relation to the form, adjustable means for predetermining the starting position of the carriage with respect to the form and predetermining the initial relative position of the manipulating devices in respect to the form, and means controlled by the movement of the carriage for changing the angular relation of the pressing-members with respect to the form.

90. A tire-making machine including a tire-form, a presser-positioning carriage movable in relation thereto, fabric-manipulating devices mounted on the carriage and positionable thereby in relation to the form, means for effecting movement of the carriage in relation to the form, adjustable means for predetermining the starting position of the carriage with respect to the form, and means controlled by the movement of the carriage for changing the angular relation of the pressing-members with respect to the form, the initial actuating position of such means being predetermined by the starting position of the carriage.

91. A tire-making machine including a tire-form, a presser-positioning carriage movable in relation thereto, fabric-manipulating devices mounted on the carriage and positionable thereby in relation to the form, means for effecting movement of the carriage in relation to the form, adjustable means for predetermining the starting position of the carriage with respect to the form, means controlled by the movement of the carriage for changing the angular relation of the pressing-members with respect to the form, the initial actuating position of such means being predetermined by the starting position of the carriage, and means including an adjustable device for limiting the receding movement of the carriage and thereby automatically changing the extent of movement of said angular changing means.

92. A tire-making machine including a tire-form, a presser-supporting carriage movable in relation thereto, means for actuating the carriage with respect to the tire-form, presser-members carried by the carriage and positionable thereby in relation to the tire-form, means adapted to be actuated by the movement of the carriage to change the angular relation of the presser-members with respect to the tire-form and including a cam-device, and means for changing the relation of said carriage to said cam-device whereby the instant of operation of said angular changing means may be varied.

93. A tire-making machine including a tire-form, a carriage movable in relation thereto, presser-members mounted on the carriage and positionable thereby in relation to the tire-form, means for changing the angular relation of the presser-members with reference to the form, and adjustable-devices operative on said means for varying the degree of such angular change.

94. A tire-making machine including a tire-form, a carriage movable in relation thereto, presser-members mounted on the carriage and positionable thereby in relation to the tire-form, means for changing the angular relation of the presser-members with reference to the form, and adjustable-devices operative on said means for varying the degree of such angular change and including a cam-structure juxtaposed to the carriage.

95. A tire-making machine including a tire-form, a carriage movable in relation thereto, presser-members mounted on the carriage and positionable thereby in relation to the tire-form, means for changing the angular relation of the presser-members with reference to the form, adjustable-devices operative on said means for varying the degree of such angular change and including a cam-structure juxtaposed to the carriage, and a support on which the carriage and cam-structure are disposed.

96. A tire-making machine including a tire-form, a carriage movable in relation thereto, presser-members mounted on the carriage and positionable thereby in relation to the tire-form, means for changing the angular relation of the presser-members with reference to the form, adjustable-devices operative on said means for varying the degree of such angular change and including a cam-structure juxtaposed to the carriage, a support on which the carriage and cam-structure are disposed, and means carried by the carriage and co-operating with the cam-structure for actuating said angle-changing means.

97. A tire-making machine including a tire-form, a carriage movable in relation thereto, presser-members mounted on the carriage and positionable thereby in relation to the tire-form, means for changing the angular relation of the presser-members with reference to the form, adjustable devices operative on said means for varying the degree of such angular change and including a cam-structure juxtaposed to the carriage, a support on which the carriage and cam-structure are disposed, and means including a rock-shaft and a roller-carrying arm connected thereto and carried by the carriage and co-operating with the cam-structure for actuating said angle-changing means.

98. A tire-making machine including a tire-form, a carriage movable in relation thereto, presser-members mounted on the carriage and positionable thereby in relation to the tire-form, means for changing the angular relation of the presser-members with reference to the form, adjustable devices operative on said means for varying the degree of such angular change and including a cam-structure juxtaposed to the carriage, a support on which the carriage and cam-structure are disposed, and means including a rock-shaft, a roller-carrying arm connected thereto and a cross-head slidably mounted on the carriage and connected to the rock-shaft and carried by the carriage and co-operating with the cam-structure for actuating said angle-changing means.

99. A tire-making machine including a support, a carriage on the support, a rotatable tire-form supporting-device juxtaposed to the carriage, power-operated means for traversing the carriage on the support in a plurality of directions in relation to the form-supporting device, a power-actuated fabric-pressing member on the carriage and actuatable to effect a predetermined, constant pressure on the form, and means for effecting movement of the member in relation to the form and distinct from the movement of the carriage.

100. A tire-making machine including a support, a carriage thereon, a tire form juxtaposed to the support, power-operated means for advancing the carriage toward the form, power-operated means for returning it to normal position, a pressing-member on the carriage normally out of contact with the form and positionable into contacting relation therewith, power-operated means for actuating the pressing-member in respect to the form and operating to effect a predetermined, constant pressure of the member on the form, and power-actuated mechanism operating while said means are active for varying the angle of engagement of the pressing-member with the form.

101. A tire-making machine including a support, a carriage thereon, a tire-form juxtaposed to the support, power-operated means for advancing the carriage toward the form, power-operated means for returning it to normal position, a pressing-member on the carriage normally out of contact with the form and positionable into contacting relation with the form, means for effecting a predetermined, constant pressure of the pressing member on the form, means for positioning the member in contacting relation to the form, and power-actuated mechanism active during the movement of the carriage for varying the angle of engagement of the member with the form.

102. A tire-making machine including a support, a carriage thereon, a tire-form juxtaposed to the support, power-operated means for advancing the carriage toward the form, power-operated means for returning it to normal position, a pressing-member on the carriage normally out of contact with the form and positionable into contacting relation with the form, independent means operating automatically for pressing the member into contact with the form, and power-actuated mechanism operating irrespective of the position of the carriage in relation to the form for changing the angular relation of the pressing-member with the form.

103. A tire-making machine, including a support, a carriage thereon, a tire-form juxtaposed to the support, power-operated means for advancing the carriage toward the form, power-operated means for returning it to normal position, a pressing-member on the carriage normally out of contact with the form and positionable into contacting relation with the form, means for pressing the member toward the form, and automatic means operating irrespective of the position of the carriage in relation to the form for bodily shifting the member while being pressed toward the form.

104. A tire-making machine including a support, a tire-form, a carriage movable on the support in relation to the tire-form, power-operated means for moving said carriage, fabric-manipulating devices sustained by and positionable by the carriage, power-operated means for positioning said manipulating devices in relation to the tire-form independent of the positioning movement of the carriage, power-operated means for returning the carriage to normal position, and power-operated means for returning the manipulating devices to normal position during the return movement of the carriage.

105. A tire-making machine including a support, a tire-form, a carriage movable on the support in relation to the tire-form, power-operated means for moving said carriage, fabric-manipulating devices sustained by and positionable by the carriage, power-operated means for positioning said manipulating devices in relation to the tire-form independent of the positioning movement of the carriage, power-operated means for returning the carriage to normal position, and power-operated means for returning the manipulating devices to normal position during the return movement of the carriage but independent of the carriage.

106. A tire-making machine including in combination, a support, a carriage thereon, a tire-form juxtaposed to the carriage, power-operated means for traversing the carriage toward and away from the tire-form, pressing-members traveling with the carriage and positionable thereby in relation to the tire-form, automatic means for changing the degree of angularity of the pressing-members with reference to predetermined portions of the surface of the tire-form, and power-operated means for maintaining said pressing-members in contact with the surface of the tire-form.

107. A tire-making machine including a support, a carriage on the support, a tire-form supporting-device juxtaposed to the carriage, and power-operated means for traversing the carriage on the support in a plurality of directions in relation to the form-supporting device.

108. A tire-making machine including a support, a carriage on the support, a tire-form supporting-device juxtaposed to the carriage, power-operated means for traversing the carriage on the support in a plurality of directions in relation to the form-supporting device, and fluid-pressure actuated fabric-pressing means on the carriage.

109. A tire-making machine including a support, a carriage on the support, a tire-form supporting-device juxtaposed to the carriage, power-operated means for automatically traversing the carriage on the support in a plurality of directions in relation to the form-supporting device, a power-actuated fabric-pressing member on the carriage, and means for automatically effecting movement of the member in relation to the form and distinct from the movement of the carriage.

110. A tire-making machine including a support, a carriage thereon, a rotatable tire-form disposed adjacent the support, power-operated means for advancing the carriage toward the form, power-operated means for effecting a receding movement of the carriage away from the form, and a fluid-pressure-operated pressing-device carried by the carriage and positionable thereby toward and away from the form.

111. A tire-making machine including a support, a carriage thereon, a rotatable tire-form disposed adjacent the support, power-operated means for automatically advancing the carriage toward the form, power-operated means for automatically effecting a receding movement of the carriage away from the form, a power-operated pressing-device carried by the carriage and positionable thereby toward and away from the form, and mechanism for automatically bodily shifting said member independently of the carriage.

112. A tire-making machine including a support, a carriage thereon, a rotatable tire-form disposed adjacent the support, power-operated means for automatically advancing the carriage toward the form, means for varying the extent of travel of said carriage, power-operated means for automatically effecting a receding movement of the carriage away from the form, a power-operated pressing-device carried by the carriage and positionable thereby toward and away from the form, and mechanism for automatically bodily shifting said member independently of the carriage.

113. A tire-making machine including a support, a carriage thereon, a rotatable tire-form disposed adjacent the support, power-operated means for advancing the carriage toward the form, means for varying the extent of travel of said carriage, power-operated means for effecting a receding movement of the carriage away from the form, a power-operated pressing-device carried by the carriage and positionable thereby toward and away from the form, mechanism for bodily shifting said member independently of the carriage, and means for varying the instant of such shifting of the member in predetermined relation to the position of the carriage.

114. A tire-making machine including a support, a carriage thereon, a rotatable tire-form disposed in juxtaposition to the form, power-operated means for traversing the carriage both toward and away from the form, a pressing-member carried by the carriage and positionable thereby in relation to the form, and means for automatically effecting a positioning movement of said member in relation to the form distinct from the positioning movement of the carriage.

115. A tire-making machine including a support, a carriage thereon, a rotatable tire-form disposed in juxtaposition to the form, power-operated means for traversing the carriage both toward and away from the form, a pressing-member carried by the carriage and positionable thereby in relation to the form, means for automatically effecting an angular positioning movement of said member in relation to the form distinct from the positioning movement of the carriage, and means for effecting motion of said member toward the form distinct from said positioning-movements.

116. A tire-making machine including a support, a carriage thereon, a rotatable tire-form disposed in juxtaposition to the form, power-operated means for traversing the carriage both toward and away from the form, a pressing-member carried by the carriage and positionable thereby in relation to the form, automatic means for effecting angular movement of said member in relation to the form distinct from the positioning movement of the carriage, and power-operated means for automatically effecting motion of said member toward and away from the form distinct from both the positioning and angular movements of the member.

117. A tire-making machine including a support, a carriage thereon, a rotatable tire-form disposed in juxtaposition to the form, power-operated means for traversing the carriage both toward and away from the form, a pressing-member carried by the carriage and positionable thereby in relation to the form, means for automatically effecting a positioning movement of said member in relation to the form distinct from the positioning movement of the carriage, and power-operated means for effecting a pressing motion of said member toward said form and maintaining it in operative contact therewith.

118. A tire-making machine including a support, a carriage thereon, a rotatable tire-form disposed in juxtaposition to the form, power-operated means for traversing the carriage both toward and away from the form, a pressing-member carried by the carriage and positionable thereby in relation to the form, means for effecting a positioning movement of said member in relation to the form distinct from the positioning movement of the carriage, power-operated means for effecting a pressing motion of said member toward said form and maintaining it in operative contact therewith, and power-operated means for returning said member to normal position.

119. A tire-making machine including a support, a carriage thereon, a rotatable tire-form disposed in juxtaposition to the form, power-operated means for traversing the carriage both toward and away from the form, a pressing-member carried by the carriage and positionable thereby in relation to the form, means for effecting a positioning movement of said member in relation to the form distinct from the positioning movement of the carriage, power-operated means for effecting a pressing motion of said member toward said form and maintaining it in operative contact therewith, and power-operated means for withdrawing said member from contact with the form, said member-positioning means also operating to reposition the pressing-member independent of said withdrawing means.

120. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, automatic means for moving said elements during the member-positioning movement of the carriage for changing the relation of said pressing-members with respect to the tire-form, means for effecting an advancing and receding movement of the pressing-members in relation to their supporting-elements, and power-operated means for effecting a receding movement of the carriage away from the tire-form.

121. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, automatic means for moving said elements during the member-positioning movement of the carriage for changing the relation of said pressing-members with respect to the tire-form, power-operated means for effecting an advancing and receding movement of the pressing-members in relation to their supporting-elements, and power-operated means for effecting a receding movement of the carriage away from the tire-form.

122. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, power-operated means for moving said elements during the member-positioning movement of the carriage for changing the relation of said pressing-members with respect to the tire-form, fluid-pressure operated means for effecting movement of the pressing-members in relation to their supporting elements, and power-operated means for effecting a receding movement of the carriage away from the tire-form.

123. A tire-making machine including a support, a carriage thereon, a rotatable tire-form juxtaposed on the support in relation to the carriage, a pair of pressing-members on the carriage, power-operated means for effecting movement of the carriage to position the pressing-members toward and away from the tire-form, member-sustaining elements carried by the carriage and movable thereon and supporting said pressing-members, power-operated means for moving said elements during the member-positioning movement of the carriage for changing the relation of said pressing-members with respect to the tire-form, fluid-pressure operated means for effecting movement of the pressing-members in relation to their supporting-elements, and means under the control of the operator for effecting actuation of said fluid-pressure operated means.

124. A tire-making machine including a support, a carriage thereon, a rotatable tire-form juxtaposed on the support in relation to the carriage, a pair of pressing-members on the carriage, power-operated means for effecting movement of the carriage to position the pressing-members toward and away from the tire-form, member-sustaining elements carried by the carriage and movable thereon and supporting said pressing-members, power-operated means for moving said elements during the member-positioning movement of the carriage for changing the relation of said pressing-members with respect to the tire-form, fluid-pressure operated means for effecting movement of the pressing-members in relation to their supporting-elements, means under the control of the operator for effecting actuation of said fluid-pressure operated means, and automatic means for arresting operation of said pressure means.

125. A tire-making machine including a support, a carriage thereon, a tire-form arranged in juxtaposition to the support, a pair of juxtaposed fabric-pressing members carried by the carriage, power-operated means for effecting movement of the carriage to position the pressing-members in proximity to the tire-form, member-sustaining elements movable on the carriage and on which said pressing-members are rotatably sustained, means for effecting a sliding movement of said elements to advance said pressing-members toward the form, mechanism deriving motion from said sliding movement of the elements to rotate said pressing-members, means for thrusting said members toward the form, and power-operated means for effecting a receding movement of the carriage away from the tire-form.

126. A tire-making machine including a support, a carriage thereon, a rotatable tire-form disposed adjacent the support, means for rotating the form, means for traversing the carriage toward the form during the rotation thereof, power-operated means for effecting a receding movement of the carriage away from the form, a pressing-device positionable by the carriage in relation to the form, means for effecting a pressing movement of the device while said carriage is traveling toward the form, and means for withdrawing the device from the form in predetermined relation to the receding movement of the carriage.

127. A tire-making machine including a support, a carriage thereon, a tire-form juxtaposed to the support, power-operated means for advancing the carriage toward the form, means for arresting such advancing movement of the carriage, power-operated means for returning it to normal position, a pressing-member on the carriage normally out of contact with the form, and independent means for pressing the member into contact with the form and for automatically changing such contacting relation.

128. A tire-making machine including a support, a carriage thereon, a tire-form juxtaposed to the support, power-operated means for advancing the carriage toward the form, means for arresting such advancing movement of the carriage, power-operated means for returning it to normal position, means for arresting such returning movement of the carriage, a pressing-member on the carriage normally out of contact with the form, and independent power-actuated means for pressing the member into contact with the form and for changing such contacting relation, such power-actuated means becoming active in advance of the action of said arresting means.

129. A tire-making machine including a support, a carriage thereon, a tire-form juxtaposed to the support, power-operated means for advancing the carriage toward the form, means for arresting such advancing movement of the carriage, power-operated means for returning it to normal position, a pressing-member on the carriage normally out of contact with the form, means for automatically maintaining the member with a predetermined pressure in contact with the form, and independent means for pressing the member into contact with the form and for automatically changing such contacting relation.

130. A tire-making machine including a support, a carriage thereon, a tire-form juxtaposed to the support, power-operated means for advancing the carriage toward the form, means for arresting such advancing movement of the carriage, power-operated means for returning it to normal position, means for arresting such returning movement of the carriage, a pressing-member on the carriage normally out of contact with the form and positionable into contacting relation with the form, means for pressing the member with a constant, predetermined pressure against the form, and means for automatically bodily shifting the member while being pressed toward the form.

131. A tire-making machine including a support, a carriage thereon, a tire-form juxtaposed to the support, power-operated means for advancing the carriage toward the form, means for arresting such advancing movement of the carriage, power-operated means for returning it to normal position, means for arresting such returning movement of the carriage, a pressing-member on the carriage normally out of contact with the form, means for pressing the member toward the form, means for bodily shifting the member while being pressed toward the form, and means for moving said member away from the form.

132. A tire-making machine including a support, a carriage thereon, a tire-form juxtaposed to the support, power-operated means for advancing the carriage toward the form, means for arresting such advancing movement of the carriage, power-operated means for returning it to normal position, means for arresting such returning movement of the carriage, a pressing-member on the carriage normally out of contact with the form, means for pressing the member toward the form, means for bodily shifting the member while being pressed toward the form, means for moving said member away from the form, and means for withdrawing said member from contact with the form.

133. A tire-making machine including a support, a carriage thereon, a rotatable tire-form juxtaposed thereto, means for traversing the carriage toward the form, means for automatically arresting the carriage at a predetermined point in its travel, power-operated means for returning the carriage to starting position, a plurality of fabric-pressing members mounted on the carriage and positionable thereby in juxtaposition to the tire-form, and independent means for effecting movement of each pressing-member toward the form and beyond the point that results from the travel of the carriage.

134. A tire-making machine including a support, a carriage thereon, a rotatable tire-form juxtaposed thereto, means for traversing the carriage toward the form, means for automatically arresting the carriage at a predetermined point in its travel, power-operated means for returning the carriage to starting position, a plurality of fabric-pressing members mounted on the carriage and positionable thereby in juxtaposition to the tire-form, independent means for effecting movement of each pressing-member toward the form and beyond the point that results from the travel of the carriage, and means for bodily shifting each member relatively to the form and to each other.

135. A tire-making machine including a support, a carriage thereon, a rotatable tire-form juxtaposed thereto, means for traversing the carriage toward the form, means for automatically arresting the carriage at a predetermined point in its travel, power-operated means for returning the carriage to starting position, a plurality of fabric-pressing members mounted on the carriage and positionable thereby in juxtaposition to the tire-form, independent means for effecting movement of each pressing-member toward the form and beyond the point that results from the travel of the carriage, means for bodily shifting each member relatively to the form and to each other, and means for returning each member to normal position.

136. A tire-making machine including a support, a carriage thereon, a rotatable tire-form juxtaposed thereto, means for traversing the carriage toward the form, means for automatically arresting the carriage at a predetermined point in its travel, power-operated means for returning the carriage to starting position, a plurality of fabric-pressing members mounted on the carriage and positionable thereby in juxtaposition to the tire-form, independent means for effecting movement of each pressing-member toward the form and beyond the point that results from the travel of the carriage, means for bodily shifting each member relatively to the form and to each other and for bodily reshifting each member away from the form, and means for withdrawing it to normal position independently of such reshifting motion.

137. A tire-making machine including a support, a carriage thereon, a rotatable tire-form disposed adjacent the support, power-operated means for advancing the carriage toward the form, means for varying the extent of travel of said carriage, power-operated means for effecting a receding movement of the carriage away from the form, a power-operated pressing-device carried by the carriage and positionable thereby toward and away from the form, mechanism for bodily shifting said member independently of the carriage, means for varying the instant of such shifting of the member in predetermined relation to the position of the carriage, and means for arresting the movement of the carriage in predetermined relation to a position of the pressing-member with respect to a point on the tire-form.

138. A tire-making machine including a support, a tire-form, power-operated means for effecting movement of the support toward and away from the tire-form, spaced element-sustaining members mounted on the support in juxtaposition to the form, presser-sustaining elements on said members, presser-devices carried by said elements and engagingly related to the tire-form, means for rotating said presser-devices, fluid-pressure operated means for actuating said presser-devices, means for operating said element-sustaining members whereby the presser-devices are given an angular positioning movement in relation to the form simultaneously with their rotative movement, and a carriage upon which said element-sustaining members are mounted and whereby, also, said presser-devices are positioned in relation to the tire-form.

139. A tire-making machine including a support, a carriage thereon, a rotatable tire-form disposed adjacent the support, driving mechanism for rotating the form and for advancing the carriage toward the form, means for controlling the operation of said driving-mechanism whereby the rotation of the form and advance movement of the carriage may be started at the will of the operator, automatic means for arresting the carriage irrespective of the movement of the form, power-operated means for returning the carriage to starting position, and power-operated fabric-pressing instrumentalities carried by the carriage and positionable thereby in relation to the tire-form.

140. A tire-making machine including a tire-form, means for supplying tire-material thereto, means for initially rotating said tire-form at slow speed, a carriage juxtaposed to the tire-form, means for advancing the carriage toward the tire-form, means for rotating the tire-form at high speed during the advancing movement of the carriage, fabric-pressing mechanism carried by the carriage and positionable thereby in operative relation to the tire-form and comprising fabric-pressing members, means for projecting said members toward the form and for maintaining them in contact with the fabric on the form during the advancing movement of the carriage, and power-operated means for effecting a receding movement of the carriage away from the form.

141. A tire-making machine including a tire-form, means for supplying tire-material thereto, means for initially rotating said tire-form at slow speed, a carriage juxtaposed to the tire-form, means for advancing the carriage toward the tire-form, means for rotating the tire-form at high speed during the advancing movement of the carriage, fabric-pressing mechanism carried by the carriage and positionable thereby in operative relation to the tire-form and comprising fabric-pressing members, means for projecting said members toward the form and for maintaining them in contact with the fabric on the form during the advancing movement of the carriage, power-operated means for effecting a receding movement of the carriage away from the form, and means for effecting a withdrawal of said pressing-members away from the form during the receding movement of the carriage.

142. A tire-making machine including a support, a carriage thereon, a tire-form juxtaposed to the support, manually-operated means for adjusting the carriage-support in relation to the form, power-operated means for advancing the carriage toward the form, means for arresting such advancing movement of the carriage, power-operated means for returning it to normal position, means for arresting such returning movement of the carriage, a pressing-member on the carriage normally out of contact with the form, means for pressing the member toward the form, means automatically operated for bodily shifting the member while being pressed toward the form and for bodily reshifting said member away therefrom, means for moving said member away from the form, and means for withdrawing said member from contact with the form.

143. A tire-making machine including a support, a carriage thereon, a tire-form juxtaposed to the support, power-operated means for advancing the carriage toward the form, means for arresting such advancing movement of the carriage, power-operated means for returning it to normal position, a pressing-member on the carriage normally out of contact with the form, controllable means for positioning the member in contacting relation to the form, independent means for pressing the member into contact with the form and for changing such contacting relation, means for guiding the member as it traverses fabric on the form, and means for bodily shifting the member while being pressed toward the form.

144. A tire-making machine comprising a tire-form, means for pressing tire-fabric upon the form comprising pressing-members having an advancing radial movement with respect to the form, power-operated means for effecting such advancing movement, means for effecting an angular bodily movement of the pressing-members during their engagement with the form, means for positioning a bead upon the fabric-covered form, and means for controlling the radial and angular movement of the pressing-member in respect to the form after the bead has been placed thereon.

145. A tire-making machine comprising a tire-form, means for supplying tire-material thereto, means for pressing tire-fabric upon the form comprising pressing-members having an advancing radial movement with respect to the form, power-operated means for effecting such advancing movement, means for effecting an angular bodily movement of the pressing-members during their engagement with the form, means for positioning a bead upon the fabric-covered form, and means for controlling the radial and angular movement of the pressing-member in respect to the form after the bead has been placed thereon.

146. A tire-making machine comprising a tire-form, means for pressing tire-fabric upon the form comprising pressing-members having an advancing radial movement with respect to the form, power-operated means for effecting such advancing movement, means for effecting an angular bodily movement of the pressing-members during their engagement with the form, means for positioning a bead upon the fabric-covered form, means for controlling the radial and angular movement of the pressing-member in respect to the form after the bead has been placed thereon, and power-operated means for effecting a receding movement of the pressing members.

147. A tire-making machine including a support, a carriage adapted to travel thereon, power-operated means for effecting an advancing movement and a receding movement of the carriage, and means for automatically arresting the carriage at any of a plurality of predetermined points and comprising stop-members, a support common to the stop-members and adapted to position one or the other in operative relation to the carriage, and means carried by the carriage and adapted to engage one or the other of the stop-members.

148. A tire-making machine including a support, a carriage adapted to travel thereon, power-operated means for effecting an advancing movement and a receding movement of the carriage, and means for automatically arresting the carriage at any of a plurality of predetermined points and comprising adjustable stop-members, a support common to the stop-members and adapted to position one or the other in operative relation to the carriage, and means carried by the carriage and adapted to engage one or the other of the stop-members.

149. A tire-making machine including a support, a traveling carriage on the support, means for effecting an advancing movement of the carriage on the support including a feed-screw, a clamping-nut engageable with the feed-screw, and a control-lever for operating said clamping-nut, and means for automatically arresting the advancing movement of the carriage including a stop-carrying shaft, and carriage-stops mounted thereon and positionable thereby whereby one or the other of said stops will be engaged by said control-lever to effect disconnection of said clamping-nut from the feed-screw.

150. A tire-making machine including a support, a traveling carriage on the support, means for effecting an advancing movement of the carriage on the support including a feed-screw, a clamping-nut engageable with the feed-screw, and a control-lever for operating said clamping-nut, said control-lever being provided with an abutment-portion, and means for automatically arresting the advancing movement of the carriage including a stop-carrying shaft, and carriage-stops mounted thereon and positionable thereby into the path of travel of said abutment-portion whereby one or the other of said stops will be engaged by said control-lever to effect disconnection of said clamping-nut from the feed-screw.

151. A tire-making machine including a support, a traveling carriage on the support, means for effecting an advancing movement of the carriage on the support including a feed-screw, a clamping-nut engageable with the feed-screw, and a control-lever for operating said clamping-nut, said control-lever being provided with an abutment-portion, and means for automatically arresting the advancing movement of the carriage including a stop-carrying shaft, carriage-stops mounted thereon and positionable thereby into the path of travel of said abutment-portion, one of said stops being relatively longer than the other whereby, when it is positioned in the path of travel of said abutment-portion of the control-lever the carriage will be arrested in advance of the instant that such arresting action would be effected if the shorter of the stops is in engaging position with said abutment-portion.

152. A tire-making machine including a support, a traveling carriage on the support, means for effecting an advancing movement of the carriage on the support including a feed-screw, a clamping-nut engageable with the feed-screw, and a control-lever for operating said clamping-nut, said control-lever being provided with an abutment-portion, and means for automatically arresting the advancing movement of the carriage including a stop-carrying shaft, carriage-stops mounted thereon and positionable thereby into the path of travel of said abutment-portion, one of said stops being relatively longer than the other whereby, when it is positioned in the path of travel of said abutment-portion of the control-lever the carriage will be arrested in advance of the instant that such arresting action would be effected if the shorter of the stops is in engaging position with said abutment-portion, said stops including adjusting-screws whereby the instant of their arresting action may be varied.

153. In a tire-making machine, a support, a carriage mounted thereon, means for effecting an advancing movement of the carriage on the support including a feed-screw and driving-mechanism therefor, a carriage control-lever, means for connecting the carriage to the feed-screw and controlled by said lever, means for automatically arresting the advancing movement of the carriage including a plurality of carriage-stops, one of which occupies a position in relation to the control-lever and engageable thereby, means for positioning another of the carriage-stops out of the path of said lever and automatic means for returning the carriage toward starting position.

154. In a tire-making machine, a support, a carriage traveling thereon, means for effecting an advancing movement of said carriage on the support including a feed-screw and means for operating the screw, means for connecting the carriage to the feed-screw, a control-lever for operating said connecting means, and means for automatically arresting the movement of the carriage including a control-shaft, two stops mounted thereon and one normally out of the path of the lever, and means for operating said shaft to position the stops in relation to the lever.

155. In a tire-making machine, a support, a carriage traveling thereon, means for effecting an advancing movement of said carriage on the support including a feed-screw and means for operating the screw, means for connecting the carriage to the feed-screw, a control-lever for operating said connecting means, means for automatically arresting the movement of the carriage including a control-shaft, two stops mounted thereon and one normally out of the path of the lever, means for operating said shaft to position the stops in relation to the lever, such operation of the shaft positioning one of the stops in the path of travel of the control-lever and simultaneously displacing the other stop away from that path.

156. In a tire-making machine, a support, a carriage mounted thereon, means for effecting movement of the carriage on the support including a feed-screw, means for connecting the carriage to the feed-screw, means for automatically arresting the movement of the carriage, and means for shifting said feed-screw axially to change the point of engagement of said carriage with the feed-screw.

157. In a tire-making machine, a support, a carriage thereon, means for effecting an advancing movement of the carriage on the support and including a feed-screw and means for operating the same, a clamping-nut carried by the carriage and engageable with the feed-screw, a control-lever for operating the clamping-nut to engage the same with and disengage it from the feed-screw and formed with an abutment-portion, and means for automatically arresting movement of the carriage including a control-shaft, a plurality of carriage-stops mounted thereon and positionable thereby in the path of travel of said abutment-portion, and means for changing the relative position of said carriage-stops in relation to said abutment-portion of the control-lever.

158. In a tire-making machine, a support, a carriage thereon, means for effecting an advancing movement of the carriage on the support and including a feed-screw and means for operating the same, a clamping-nut carried by the carriage and engageable with the feed-screw, a control-lever for operating the clamping-nut to engage the same with and disengage it from the feed-screw and formed with an abutment-portion, and means for automatically arresting movement of the carriage including a control-shaft, a plurality of carriage-stops mounted thereon and positionable thereby in the path of travel of said abutment-portion, and means for changing the relative position of said carriage-stops in relation to said abutment-portion of the control-lever, said carriage-stops being of relatively different dimensions whereby one, when in active position, will engage the abutment-portion at a different instant than said abutment-portion would engage another of the carriage-stops when it is in active engaging position.

159. In a tire-making machine, a support, a carriage thereon, means for effecting an advancing movement of the carriage on the support and including a feed-screw and means for operating the same, a clamping-nut carried by the carriage and engageable with the feed-screw, a control-lever for operating the clamping-nut to engage the same with and disengage it from the feed-screw and formed with an abutment-portion, and means for automatically arresting movement of the carriage including a control-shaft, a plurality of carriage-stops mounted thereon and positionable thereby in the path of travel of said abutment-portion, and means for changing the relative position of said carriage-stops in relation to said abutment-portion of the control-lever, said carriage-stops being of relatively different dimensions whereby one, when in active position, will engage the abutment-portion at a different instant than said abutment-portion would engage another of the carriage-stops when it is in active engaging position, each stop carrying an adjustable screw for varying the instant of engagement therewith of the abutment-portion.

160. In a tire-making machine, a support, a traveling structure thereon, automatic means for effecting advancing and receding movements of the structure on the support, means for arresting the advancing and receding movements of the support at predetermined points, fabric-manipulating devices on the structure, means for supplying and controlling the flow of pressure-medium to the fabric-manipulating devices, and a plurality of devices for operating said controlling-devices in predetermined relation to the arrest of said structure in its advancing and receding movements.

161. In a tire-making machine, a tire-form, a carriage movable in relation thereto, means for effecting an advancing movement of the carriage, means for automatically arresting the carriage at a predetermined point in relation to the form, fabric-manipulating devices on the carriage, means for supplying a pressure-medium to the devices, a controlling-device therefor, and means disposed in proximity to the carriage-arresting means to operate said controlling device in predetermined relation to the instant of arrest of the advancing movement of the carriage.

162. In a tire-making machine, a tire-form, a presser-sustaining carriage movable in relation to the form, means for effecting an advancing movement of the carriage in relation to the form, means for arresting said carriage at either of at least two predetermined points for long and short travels thereof in relation to the form, means for positioning said arresting means, fabric-manipulating devices on the carriage, means for supplying a pressure-medium to said devices, a control-device therefor, an actuating-device for said control-device, and means operated simultaneously with the carriage-arresting means for positioning said actuating-device to operate said control-device in predetermined relation to the instant of arrest of movement of said carriage according to whether it is having its long or its short travel.

163. In a tire-making machine, a tire-form, a carriage movable in relation thereto, means for effecting an advancing movement of the carriage in relation to the tire-form, fabric-manipulating devices carried by the carriage and positionable thereby with respect to the form, means for supplying a pressure-fluid to said manipulating-devices, a manually and automatically operated control-device thereof, means for automatically arresting movement of the carriage in predetermined relation to the tire-form, a stop-device movable in relation to the carriage for predetermining its instant of arrest for either a long or short travel, a controlling-member for positioning said device, an actuatable instrumentality connecting with said pressure-medium control-device, and means for positioning said actuatable instrumentality.

164. In a tire-making machine, a tire-form, a carriage movable in relation thereto, means for effecting an advancing movement of the carriage toward the form, means for automatically arresting the advancing movement of the carriage in relation to the form, fabric-manipulating devices carried by the carriage, means for supplying a pressure-medium to the fabric-manipulating devices, a valve for controlling the flow of the pressure-medium to the manipulating-devices, means for operating said valve including a valve-controlling shaft, an actuatable member connected therewith, a member-positioning device, and a control-shaft for actuating said positioning-device.

165. In a tire-making machine, a tire-form, a carriage movable in relation thereto, means for effecting an advancing movement of the carriage toward the form, means for automatically arresting the advancing movement of the carriage in relation to the form, fabric-manipulating devices carried by the carriage, means for supplying a pressure-medium to the fabric-manipulating devices, a valve for controlling the flow of the pressure-medium to the manipulating-devices, means for operating said valve including a valve-controlling shaft, an actuatable member connected therewith, a member-positioning device, a control-shaft for actuating said positioning-device, and a plurality of engaging-devices carried by the carriage and engageable with said actuatable member.

166. In a tire-making machine, a tire-form, a carriage thereon, means for effecting movement of the carriage in relation to the form, means for arresting said carriage at predetermined points in relation to the form and including a stop-device, a control-shaft upon which said device is mounted, fabric-manipulating devices carried by the carriage, means for supplying a pressure-medium to the manipulating-devices, means for controlling the flow of said pressure-medium including a valve, and means for operating said valve including a valve-operating shaft, an actuatable member connecting therewith, a member-positioning device carried by the control-shaft which carries the carriage stop-device, and stop-members carried by the carriage and engageable with the actuatable-member.

167. In a tire-making machine, a tire-form, a carriage thereon, means for effecting movement of the carriage in relation to the form, means for arresting said carriage at predetermined points in relation to the form and including a stop-device, a control-shaft upon which said device is mounted, fabric-manipulating devices carried by the carriage, means for supplying a pressure-medium to the manipulating-devices, means for controlling the flow of said pressure-medium including a valve, and means for operating said valve including a valve-operating shaft, an actuatable member connecting therewith, a member-positioning device carried by the control-shaft which carries the carriage stop-device, and operable thereby to position the actuatable member in one or another of a plurality of planes, and stop-members carried by the carriage in relatively different horizontal planes and engageable with said actuatable member according to its position.

168. In a tire-making machine, a tire-form, a carriage thereon, means for effecting movement of the carriage in relation to the form, means for arresting said carriage at predetermined points in relation to the form and including a stop-device, a control-shaft upon which said device is mounted, fabric-manipulating devices carried by the carriage, means for supplying a pressure-medium to the manipulating-devices, means for controlling the flow of said pressure-medium including a valve, means for operating said valve including a valve-operating shaft, an actuatable member connecting therewith, a member-positioning device carried by the control-shaft which carries the carriage stop-device, and operable thereby to position the actuatable member in one or another of a plurality of planes, and stop-members carried by the carriage in relatively different horizontal planes and engageable with said actuatable member according to its position, and independent means for rocking said valve-control shaft.

169. In a tire-making machine, a support, a carriage thereon, means for effecting a traveling movement of the carriage on the support, means for automatically arresting the movement of the carriage at any of a plurality of predetermined points and including a control-shaft, a stop-device carried thereby, and means carried by the carriage and engageable with the stop-device for arresting movement of the carriage, fabric-manipulating devices on the carriage, means for supplying a pressure-medium to the devices, a valve for controlling flow of the medium to the manipulating devices, a valve-controlling shaft, an actuatable member carried thereby and adapted to be actuated during the movement of the carriage to close the valve, and a member-positioning device mounted on said control-shaft and adapted to position said actuatable member in synchronism with the positioning of said carriage-stop device.

170. In a tire-making machine, a support, a carriage thereon, means for effecting a traveling movement of the carriage on the support, means for automatically arresting the movement of the carriage at any of a plurality of predetermined points and including a control-shaft, a stop-device carried thereby, and means carried by the carriage and engageable with the stop-device for arresting movement of the carriage, fabric-manipulating devices on the carriage, means for supplying a pressure-medium to the devices, a valve for controlling flow of the medium to the manipulating-devices, a valve-controlling shaft, an actuatable member carried thereby and adapted to be actuated during the movement of the carriage to close the valve, a member-positioning device mounted on said control-shaft and adapted to position said actuatable member in synchronism with the positioning of said carriage-stop-device, and engaging members on the carriage adapted to engage with and operate said actuatable member.

171. In a tire-making machine, a support, a carriage thereon, means for effecting a traveling movement of the carriage on the support, means for automatically arresting movement of the carriage at any of a plurality of predetermined points and including a control-shaft, a stop-device carried thereby, and means carried by the carriage and engageable with the stop-device for arresting movement of the carriage, fabric-manipulating devices on the carriage, means for supplying a pressure-medium to the devices, a valve for controlling flow of the medium to the manipulating-devices, a valve-controlling shaft, an actuatable member carried thereby and adapted to be actuated during the movement of the carriage to close the valve, a member-positioning device mounted on said control-shaft and adapted to position said actuatable member in synchronism with the positioning of said carriage-stop-device, and adjustable engaging-members on the carriage adapted to engage with and operate said actuatable member.

172. In a tire-making machine, a tire-form, a support arranged in juxtaposition thereto, fabric-manipulating devices on the support, means for controlling the positioning of said fabric-manipulating devices in relation to the form, a bead-placing device mounted on the support, means for positioning said placing device in relation to the form, and mechanism actuated by said positioning means for permitting return of the bead-placing device to an inactive position.

173. In a tire-making machine, a tire-form, a support arranged in juxtaposition thereto, fabric-manipulating-devices on the support, means for controlling the positioning of said fabric-manipulating devices in relation to the form, a bead-placing device mounted on the support and normally occupying an inactive position, means for positioning said placing device in relation to the form including a motor connected therewith, and mechanism actuated by said positioning means for permitting return of the bead-placing device to its inactive position.

174. In a tire-making machine, a tire-form, a support arranged in juxtaposition thereto, fabric-manipulating devices on the support, means for controlling the positioning of said fabric-manipulating devices in relation to the form, a bead-placing device mounted on the support and normally occupying an inactive position, means for positioning said placing device in relation to the form including a motor connected therewith, and mechanism under the control of the operator and actuated by said positioning means for permitting return of the bead-placing device to its inactive position.

175. In a tire-making machine, a tire-form, a support arranged in juxtaposition thereto, fabric-manipulating devices on the support and positionable in relation to the form, means for changing the angular relation of the fabric-manipulating devices with respect to the form and including a control-shaft, a bead-placing device mounted on the support and normally occupying an inactive position in relation to the form, means for actuating said bead-placing device into an active position relatively to the form, means for maintaining the device in such active position, and means operated by said control-shaft for releasing said maintaining means to permit the bead-placing device to return to its inactive position.

176. In a tire-making machine, a tire-form, a support arranged in juxtaposition thereto, fabric-manipulating devices on the support and positionable in relation to the form, means for changing the angular relation of the fabric-manipulating devices with respect to the form and including a control-shaft, a bead-placing device mounted on the support and normally occupying an inactive position in relation to the form, means for actuating said bead-placing device into an active position relatively to the form, means for maintaining the device in such active position, means operated by said control-shaft for releasing said maintaining means to permit the bead-placing device to return to its inactive position, and fabric-trimming mechanism carried by said bead-placing device and positionable thereby in relation to the tire-form.

177. In a tire-making machine, a tire-form, a support juxtaposed thereto, fabric-manipulating devices mounted on the support and positionable in relation to the form, means for changing the relation of said manipulating devices in relation to the form including a control-shaft, a bead-placing device juxtaposed to the form and normally occupying an inactive position in relation thereto, means for elevating said bead-placing device into an active position relatively to the form including a rotatable member, a weight-motor connecting therewith, means for operating the weight-motor, a locking-device for engaging said rotatable member, and means actuated by said control-shaft to operate said locking-device and thereby release the bead-placing device and permit it to return to inactive position.

178. In a tire-making machine, a tire-form, a support juxtaposed thereto, fabric-manipulating devices mounted on the support and positionable in relation to the form, means for changing the relation of said manipulating devices in relation to the form including a control-shaft, a bead-placing device juxtaposed to the form and normally occupying an inactive position in relation thereto, means for elevating said bead-placing device into an active position relatively to the form including a rotatable member, a weight-motor connecting therewith, means for operating the weight-motor, a locking-device for engaging said rotatable member, means actuated by said control-shaft to operate said locking-device and thereby release the bead-placing device and permit it to return to inactive position, and means for cushioning shock incident to the return of said bead-placing device to its said inactive position.

179. In a tire-making machine, a support, a carriage traveling thereon, means for effecting movement of the carriage on the support, means for arresting movement of the carriage, fabric-manipulating devices on the carriage, means for supplying a pressure-medium to the fabric-manipulating devices, a valve for controlling flow of the medium to the manipulating devices, a carriage-stop-device mounted in the path of travel of the carriage, a valve-operating device actuated during the traveling movement of the carriage, means for changing the relation of the fabric-manipulating devices relatively, and a control-member common to said carriage-stop-device, to said valve-operating device and to said position-changing means.

180. In a tire-making machine, a support, a carriage traveling thereon, means for effecting movement of the carriage on the support, means for arresting movement of the carriage, fabric-manipulating devices on the carriage, means for supplying a pressure-medium to the fabric-manipulating devices, a valve for controlling flow of the medium to the manipulating-devices, a carriage-stop-device mounted in the path of travel of the carriage, a valve-operating device actuated during the traveling movement of the carriage, means for changing the relation of the fabric-manipulating devices relatively, a bead-placing device arranged on said support, a locking-device for maintaining said bead-placing device in position, and a control-member common to said carriage-stop-device, to said valve-operating device, to said position-changing means, and to said locking-device.

181. In a tire-making machine including a support, a fabric-manipulating device carried thereby, a fluid-pressure operated means for actuating said device in one direction, means for returning the device to normal position, and adjustable means for varying the length of stroke of said device.

182. A tire-making machine including a support, a tire-form juxtaposed thereto, a fabric-manipulating device carried by the support, fluid-pressure operated means for actuating said device in relation to the form and having an operating stroke of predetermined length, and adjustable means for varying the length of that stroke at the will of the operator.

183. In combination a carriage, a slow-speed mechanism for moving said carriage in one direction, means for automatically releasing said carriage therefrom, quick return mechanism for moving said carriage in the opposite direction, a pair of fabric shaping devices, pivotal supports for said fabric shaping devices supported on the carriage and movable towards and from each other, and means for automatically varying the angular position of said fabric shaping devices.

184. A tire-making machine including a support, a tire-form juxtaposed thereto, a carriage movable in relation to the form, means for effecting an advancing movement of the carriage toward the form, means for automatically effecting a receding movement of the carriage away from the form, a fabric-manipulating device movable with the carriage and adapted to be also actuated independently thereof, and means for automatically effecting a change of angularity of the device with respect to the form during the movement of the carriage.

185. A machine of the character described comprising a core upon which a tire may be built, means for placing tire fabric and bead cores thereon, a single mechanism adapted to form the tire fabric on the core and over the bead cores, and means for automatically guiding the mechanism over the bead-cores.

186. A machine of the character described comprising a core upon which a tire may be built, means for placing tire fabric and bead cores thereon, and mechanism for forming the fabric on the core both under and over the bead cores, said mechanism comprising a device adapted to move radially with respect to the core, forming elements carried by said device and arranged to engage the material at an angle thereto, and means for automatically maintaining a predetermined angle of engagement throughout the radial movement.

187. A machine of the character described comprising a core upon which a tire may be built, means for placing tire fabric and bead cores thereon, and mechanism for forming the fabric on the core both under and over the bead cores, said mechanism comprising a device adapted to move radially with respect to the core, forming elements carried by said device and arranged to engage the material at an angle thereto, means for automatically stopping said radial movement at a predetermined point on the core for an initial cycle of operation, means for resetting the device for a second cycle of operation, and automatic means for effecting a continued movement of the reset-device not only to but beyond the base of the bead cores.

188. A machine of the character described comprising a core upon which a tire may be built, means for stretching tire material onto the periphery of the core, means for placing bead cores thereon, and mechanism for forming the fabric on the sides of the core both under and over the bead cores, said mechanism comprising a device adapted to move radially with respect to the core, forming elements carried by said device and arranged to engage the material at an angle thereto, means for automatically stopping said radial movement at a predetermined point on the core for an initial cycle of operation, means for resetting the device for a second cycle of operation, and automatic means for effecting a continued movement of the reset-device not only to but beyond the base of the bead cores.

189. A machine of the character described comprising a core upon which a tire may be built, means for placing tire fabric and bead cores thereon, a roll adapted to form the tire fabric on the core and over the bead cores, and a cam-device associated with the roll for automatically guiding it over the bead-cores.

190. A machine of the character described comprising a core upon which a tire may be built, means for placing tire fabric and bead cores thereon, and mechanism for forming the fabric on the core both under and over the bead cores, said mechanism including a device adapted to move radially with respect to the core, forming rolls carried by said device and arranged to engage the material at an angle thereto, and means for automatically maintaining a predetermined, varying angle of engagement throughout the radial movement.

191. A machine of the character described comprising a core upon which a tire may be built, means for placing tire fabric and bead cores thereon, a single mechanism adapted to move radially with respect to the core and arcuately in a plane at a predetermined angle to the plane of the core for forming the tire fabric on the core both under and over the bead cores, and means for automatically controlling the arcuate movement of the mechanism.

192. A machine of the character described comprising a core upon which a tire may be built, means for placing tire fabric and bead cores thereon, a device arranged to engage differently lying portions of the material at a different working angle for forming the fabric on the core both under and over the bead cores, and automatic means for varying the working angle of the device in respect to said different portions of the material.

193. A machine of the character described comprising a core upon which a tire may be built, means for placing tire fabric and bead cores thereon, a pair of devices arranged to engage differently lying portions of the material at a relatively differently working angle for forming the fabric on the core both under and over the bead cores, and means for automatically varying the working angle of both devices simultaneously in respect to the said different portions of the material.

194. A machine of the character described comprising a core upon which a tire may be built, means for placing tire fabric and bead cores thereon, a single mechanism for forming the tire fabric on the core both under and over the bead cores, said mechanism comprising a pair of pivoted arms mounted to move radially with respect to the core, that portion of the arms nearer the core being of curved formation, bracket arms fitted to slide on the curved portions of said arms, forming elements carried by the bracket arms and adapted to be moved laterally toward and away from the core by swinging the first-mentioned arms on their pivots, and means deriving action from the radial movement of said mechanism for positively swinging each of said arms on its pivot.

195. A machine of the character described comprising a core upon which a tire may be built, means for placing tire fabric and bead cores thereon, a single mechanism for forming the tire fabric on the core both under and over the bead cores, said mechanism having both advancing and receding movements in respect to the core and comprising a pair of pivoted arms mounted to move radially with respect to the core, that portion of the arms nearer the core being of curved formation, bracket arms fitted to slide on the curved portions of said arms, forming elements carried by the bracket arms, and adapted to be moved laterally toward and away from the core by swinging the first-mentioned arms on their pivots, and means deriving action from the radial movement of said mechanism for positively and simultaneously swinging both of said arms on their pivots during both the advancing and receding movements of the mechanism.

196. A tire-making machine including a support, a presser-supporting carriage thereon, a rotatable tire form juxtaposed thereto, automatic means for traversing the carriage both toward and away from the form, a power-operated presser carried by the carriage and positionable thereby in relation to the form, and automatic means for effecting a plurality of positioning movements of the presser in relation to the form distinct from the positioning movement of the carriage.

197. A tire-making machine including a support, a presser-supporting carriage thereon, a rotatable tire form juxtaposed thereto, automatic means for traversing the carriage both toward and away from the form, a power-operated presser carried by the carriage and positionable thereby in relation to the form, and automatic means operable during the positioning movement of the carriage for effecting a plurality of positioning movements of the presser in relation to the form distinct from the positioning movement of the carriage.

198. A tire-making machine including a support, a carriage thereon, a rotatable tire form juxtaposed thereto, automatic means for traversing the carriage both toward and away from the form, a pressing member carried by the carriage and positionable thereby in relation to the form, automatic means for effecting a positioning movement of the member in relation to the form distinct from the positioning movement of the carriage, and automatic means for effecting motion of said member both toward and away from the form distinct from both of such positioning movements.

199. A tire-making machine including a support, a presser-sustaining carriage thereon, a rotatable tire form juxtaposed thereto, automatic means for traversing the carriage both toward and away from the form, a pressing member carried by the carriage and positionable thereby in relation to the form, means for effecting the positioning movement of the member in relation to the form distinct from the positioning movement of the carriage, power-operated means for effecting a pressing motion of said member toward the form and maintaining it with a predetermined pressure in contact therewith, and power-operated means for withdrawing the member from contact with the form.

200. A tire-making machine including a support, a presser-sustaining carriage thereon, a rotatable tire form juxtaposed thereto, automatic means for traversing the carriage both toward and away from the form, a pressing member carried by the carriage and positionable thereby in relation to the form, means for effecting the positioning movement of the member in relation to the form distinct from the positioning movement of the carriage, power-operated means for effecting a pressing motion of said member toward the form and maintaining it with a predetermined pressure in contact therewith, power-operated means for withdrawing the member from contact with the form, and independent means for repositioning the member at starting position.

201. In combination with a carriage and mechanism for moving said carriage in one direction, of means for automatically releasing said carriage therefrom, quick-return mechanism for moving said carriage in the opposite direction, a pair of fabric-shaping devices, pivotal supports for said fabric-shaping devices supported on the carriage and movable towards and from each other, and automatic means rendered active by movement of the carriage in either direction for varying the angular position of said fabric-shaping devices during movement of the carriage.

202. A tire-making machine including a tire-core structure, a fabric-manipulating structure, power-operated means for effecting an advancing movement of one of the structures in relation to the other, a second power-operated means for effecting a receding movement of the advanced structure away from the other, fabric-pressing members carried by one of said structures and having an engaging relation with the other, and mechanism for actuating said pressing-members including means rendered active by movement of the movable structure for automatically advancing said members in one direction, and means for automatically effecting a receding movement thereof.

203. A tire-making machine including a tire-core structure, a fabric-manipulating structure, power-operated means for effecting an advancing movement of one of the structures in relation to the other, a second power-operated means for effecting a receding movement of the advanced structure away from the other, fabric-pressing members carried by one of said structures and having an engaging relation with the other, means for actuating said pressing-members including means for automatically advancing said members in one direction, means for automatically effecting a receding movement thereof, and means rendered active by movement of the movable structure for automatically changing the degree of relative angularity of said members during their advancing movement.

204. A tire-making machine including a support, a pressing-member positioning-structure thereon, a tire-form structure mounted adjacent the support, power-operated means for changing the relation between said structures whereby advancing and receding movements of one of the structures toward and away from the other are positively effected, a fabric-pressing instrumentality carried and automatically positionable both radially and angularly in respect to the form, and means rendered active by movement of the advancing structure in either direction for effecting such automatic positioning of said instrumentality.

205. A tire-making machine including a support, a pressing-member positioning-structure thereon, a tire-form structure mounted adjacent the support, power-operated means for changing the relation between said structures whereby advancing and receding movements of one of the structures with respect to the other are positively effected, means for automatically disconnecting the moving structure from the power-operating means and thereby effecting an arresting movement of the advancing structure in predetermined relation to the other, a fabric-pressing instrumentality carried and positionable by the advancing structure in definite relation to the other structure, and independent power-operated means for automatically operating said instrumentality, such automatic means becoming active during the changing of relation between said structures.

206. A tire-making machine including a tire-form, a support movable in relation thereto, power-operated means for moving said support, fabric-manipulating devices carried by the support and positionable thereby in relation to the tire-form, power-operated means for moving said devices toward the tire-form independent of the positioning movement of the support and becoming active during the support's positioning movement, power-operated means for returning said devices to normal position, and power-operated means for returning the support to normal position.

207. A tire-making machine including a support, a carriage thereon, a tire-form juxtaposed to the support, power-operated means for advancing the carriage toward the form, power-operated means for returning it to normal position, a pressing-member on the carriage normally out of contact with the form and positionable into contacting relation with the form, and independent power-operated means for pressing the member into contact with the form and during movement of the carriage for simultaneously changing such contacting relation.

208. A tire-making machine, including a support, a carriage thereon, a tire-form juxtaposed to the support, power-operated means for automatically advancing the carriage toward the form, power-operated means for automatically returning it to normal position, a pressing-member on the carriage normally out of contact with the form and positionable into contacting relation with the form, power-operated means for automatically pressing the member toward the form, and power-operated means for bodily shifting the member automatically while being pressed toward the form and while the carriage is traveling toward the same; whereby interposition of human agency for controlling action of the carriage and pressing member is avoided.

209. A tire-making machine including a support, a carriage thereon, a rotatable tire-form disposed in juxtaposition to the form, power-operated means for automatically traversing the carriage both toward and away from the form, a pressing-member carried by the carriage and positionably thereby in relation to the form, power-operated means for automatically effecting a positioning movement of said member in relation to the form distinct from the positioning movement of the carriage, and automatic means for effecting motion of said member toward the form distinct from but during both of said positioning-movements; whereby interposition of human agency for controlling action of the carriage and pressing member is avoided.

210. A tire-making machine including a support, a carriage thereon, a tire-form juxtaposed to the support, power-operated means for advancing the carriage toward the form, automatic means for arresting such advancing movement of the carriage, power-operated means for returning it to normal position, a pressing-member on the carriage normally out of contact with the form, power-operated means for pressing the member toward the form, and automatic means deriving actuation from and during movement of the carriage for bodily shifting the member while being moved toward and away from the form.

211. A tire-making machine including a tire-form, mechanism for forming tire material on the form comprising a plurality of pressing-members adapted to have an advancing radial movement with respect to the form and engageable therewith, power-operated means for advancing said pressing members toward the form and maintaining them thereagainst, power-operated means for automatically effecting a receding movement of said members away from the form, and power-operated means for returning said members radially with respect to the form to normal position, the said three power-operated means being independently operable.

212. The combination of a support, a rotatable form, a movable carriage shiftable in relation to the form, roller-sustaining means on the movable carriage, a fabric-roller carried by the sustaining means and bodily shiftable thereon, power-operated means operative to move the movable carriage automatically relative to the form, means becoming active during movement of the carriage to move the sustaining means automatically relative to the form during the movement of the movable carriage, and means for automatically moving the roller on the sustaining means and relatively to said form during the movement of both the sustaining means and carriage.

In testimony whereof, I have affixed my signature in presence of two witnesses.

JOHN J. CONVERY.

Witnesses:
A. N. JOHNSON,
HELEN A. MCCARTHY.